United States Patent
Johnson et al.

(10) Patent No.: US 11,793,274 B2
(45) Date of Patent: Oct. 24, 2023

(54) GARMENT HAVING A DEGRADABLE COMPONENT

(71) Applicant: PUMA SE, Herzogenaurach (DE)

(72) Inventors: Charles Johnson, Nuremberg (DE); Matthias Hartmann, Forchheim (DE)

(73) Assignee: PUMA SE, Herzogenaurach (DE)

( * ) Notice: Subject to any disclaimer, the term of this patent is extended or adjusted under 35 U.S.C. 154(b) by 0 days.

(21) Appl. No.: 17/119,303

(22) Filed: Dec. 11, 2020

(65) Prior Publication Data

US 2021/0093044 A1    Apr. 1, 2021

Related U.S. Application Data

(63) Continuation of application No. 16/378,555, filed on Apr. 8, 2019, now Pat. No. 11,478,046, which is a continuation-in-part of application No. PCT/EP2018/077968, filed on Oct. 13, 2018.

(51) Int. Cl.
| | |
|---|---|
| A43B 23/02 | (2006.01) |
| A43B 13/02 | (2022.01) |
| A43B 7/06 | (2006.01) |
| B32B 27/12 | (2006.01) |
| B32B 27/08 | (2006.01) |
| B32B 3/28 | (2006.01) |
| D06M 16/00 | (2006.01) |

(Continued)

(52) U.S. Cl.
CPC .......... *A43B 23/0235* (2013.01); *A41D 31/30* (2019.02); *A43B 7/00* (2013.01); *A43B 23/0225* (2013.01); *B32B 3/28* (2013.01); *B32B 27/08* (2013.01); *B32B 27/12* (2013.01); *D06M 16/00* (2013.01); *B32B 2255/26* (2013.01); *B32B 2307/716* (2013.01); *C08L 2201/06* (2013.01)

(58) Field of Classification Search
CPC ............ A43B 23/0235; A43B 23/0225; A43B 13/026; A43B 13/00; A43B 7/06; A43B 7/005; B32B 3/28; B32B 2307/7163; B32B 2307/71716
See application file for complete search history.

(56) References Cited

U.S. PATENT DOCUMENTS

| | | | |
|---|---|---|---|
| 2,240,599 A | 5/1941 | Amberg | |
| 4,063,371 A * | 12/1977 | Batra | A43B 13/223 36/3 B |
| 4,092,221 A | 5/1978 | Schlichting, Jr. | |

(Continued)

FOREIGN PATENT DOCUMENTS

| | | |
|---|---|---|
| WO | 2010006442 A1 | 1/2010 |
| WO | 2020074109 A1 | 4/2020 |

OTHER PUBLICATIONS

International Search Report and Written Opinion of the International Searching Authority from corresponding PCT Application No. PCT/IB2020/053031, dated Aug. 28, 2020 (11 pages).

(Continued)

*Primary Examiner* — Joanna Pleszczynska
(74) *Attorney, Agent, or Firm* — Quarles & Brady LLP

(57) ABSTRACT

An article of footwear is provided that includes a sole structure and an upper attached to the sole structure. The upper includes an exterior layer and a base layer, and the exterior layer includes a biodegradable layer and a biologically active agent capable of biodegrading the biodegradable layer.

21 Claims, 30 Drawing Sheets

(51) Int. Cl.
  *A41D 31/30* (2019.01)
  *A43B 7/00* (2006.01)

(56) References Cited

U.S. PATENT DOCUMENTS

| | | | | |
|---|---|---|---|---|
| 6,376,213 | B1* | 4/2002 | Oda | C12N 1/205 |
| | | | | 435/142 |
| 8,741,597 | B2* | 6/2014 | Orenga | C12Q 1/14 |
| | | | | 435/36 |
| 8,745,892 | B2* | 6/2014 | Polegato Moretti | A43B 7/06 |
| | | | | 36/3 R |
| 2003/0199095 | A1 | 10/2003 | Yuyama et al. | |
| 2005/0031733 | A1 | 2/2005 | Domingues et al. | |
| 2005/0204449 | A1 | 9/2005 | Baron et al. | |
| 2006/0257908 | A1* | 11/2006 | Rui | G01N 1/28 |
| | | | | 435/6.16 |
| 2008/0053556 | A1* | 3/2008 | Lin | D04H 13/00 |
| | | | | 139/383 R |
| 2013/0130399 | A1 | 5/2013 | Mills et al. | |
| 2013/0269592 | A1 | 10/2013 | Heacock et al. | |
| 2014/0065311 | A1* | 3/2014 | Moseley | A41D 19/0082 |
| | | | | 427/380 |
| 2015/0346513 | A1 | 12/2015 | Heacock | |
| 2015/0370320 | A1 | 12/2015 | Connor | |
| 2016/0135543 | A1 | 5/2016 | Anceresi et al. | |
| 2017/0027482 | A1 | 2/2017 | Zilberstein et al. | |
| 2017/0066583 | A1 | 3/2017 | Kimbrough | |
| 2017/0082573 | A1 | 3/2017 | Vingerhoets et al. | |
| 2017/0169692 | A1 | 6/2017 | Parra et al. | |
| 2017/0322163 | A1 | 11/2017 | Heacock | |
| 2018/0104017 | A1 | 4/2018 | Heacock | |
| 2019/0145849 | A1 | 5/2019 | Jensen | |
| 2019/0285577 | A1 | 9/2019 | Swager et al. | |
| 2020/0113287 | A1 | 4/2020 | Johnson et al. | |
| 2020/0156839 | A1 | 5/2020 | Abramov | |

OTHER PUBLICATIONS

Shah et al., "Degradation of polyurethane by novel bacterial consortium isolated from soil," Annals of Microbiology, 58(3):381-386 (2008).

Yoshida et al., "A bacterium that degrades and assimilates poly(ethylene terephalate)," Science, Mar. 11, 2016, 351(6278):1196-1199.

Anonymous: "Puma Biodesign: Breathing Shoes", , Apr. 17, 2018 (Apr. 17, 2018), Retrieved from the Internet: URL:https://vimeo.com/265128805 [retrieved on Jun. 15, 2020].

Anna Winston: "Puma and MIT Design Lab envision a future of selfadapting, per-media-lab-puma-future-s", May 24, 2018 (May 24, 2018), XP055594193, Retrieved from the Internet: URL:https://www.dezeen.com/2018/05/24/mit-media-lab-pumafuture-sportswear-design/ [retrieved on Jun. 5, 2019].

Shah Aamer Ali et al: "Microbial degradation of aliphatic and aliphatic-aromatic co-polyesters", Applied Microbiology and Biotechnology, Springer Berlin Heidelberg, Berlin/Heidelber vol. 98, No. 8, Feb. 13, 2014 (Feb. 13, 2014), pp. 3437-3447, XP035328980, ISSN: 0175-7598, DOI: 10.1007/S00253-014-5558-1 [retrieved on Feb. 13, 2014].

International Search Report and Written Opinion issued in corresponding International Application No. PCT/IB2020/053028, dated Jun. 29, 2020, 15 pages.

International Search Report and Written Opinion issued in corresponding International Application No. PCT/EP2018/077968, dated Jun. 13, 2019, 11 pages.

International Preliminary Report on Patentability (Form IPEA/409) of International Application No. PCT/EP2018/077968, dated Feb. 22, 2021, 19 pages.

Nigam, P. S. (Aug. 23, 2013). Microbial enzymes with special characteristics for biotechnological applications. Biomolecules. Retrieved Feb. 1, 2022, from https://www.ncbi.nlm.nih.gov/pmc/articles/PMC4030947/ (Year: 2013).

Jerry, D. C. T., Mohammed, T., & Mohammed, A. (2017). Yeast-generated CO2: A convenient source of carbon dioxide for Mosquito trapping using the BG-sentinel® traps. Asian Pacific Journal of Tropical Biomedicine. Retrieved Feb. 1, 2022, from https://www.sciencedirect.com/science/article/pii/S2 (Year: 2017).

Hedge et al. "A comparative review of footwear-based wearable systems", Electronics, 2016, vol. 5, issue 3, 48 (Year: 2016).

Catenacci, T., "These new shoes designed by Puma and MIT Lab can tell how you're feeling", CNBC news article, published Jun. 6, 2018, https://www.cnbc.com/2018/06/05/puma-mit-shoes-can-breathe.htlml (Year: 2018).

Low, JH et al. "A pressure-redistributing insole using solft sensors and actuators", 2015 IEEE International Conference on Robotics and Automation (ICRA), 2015, pp. 2926-2930 (Year: 2015).

* cited by examiner

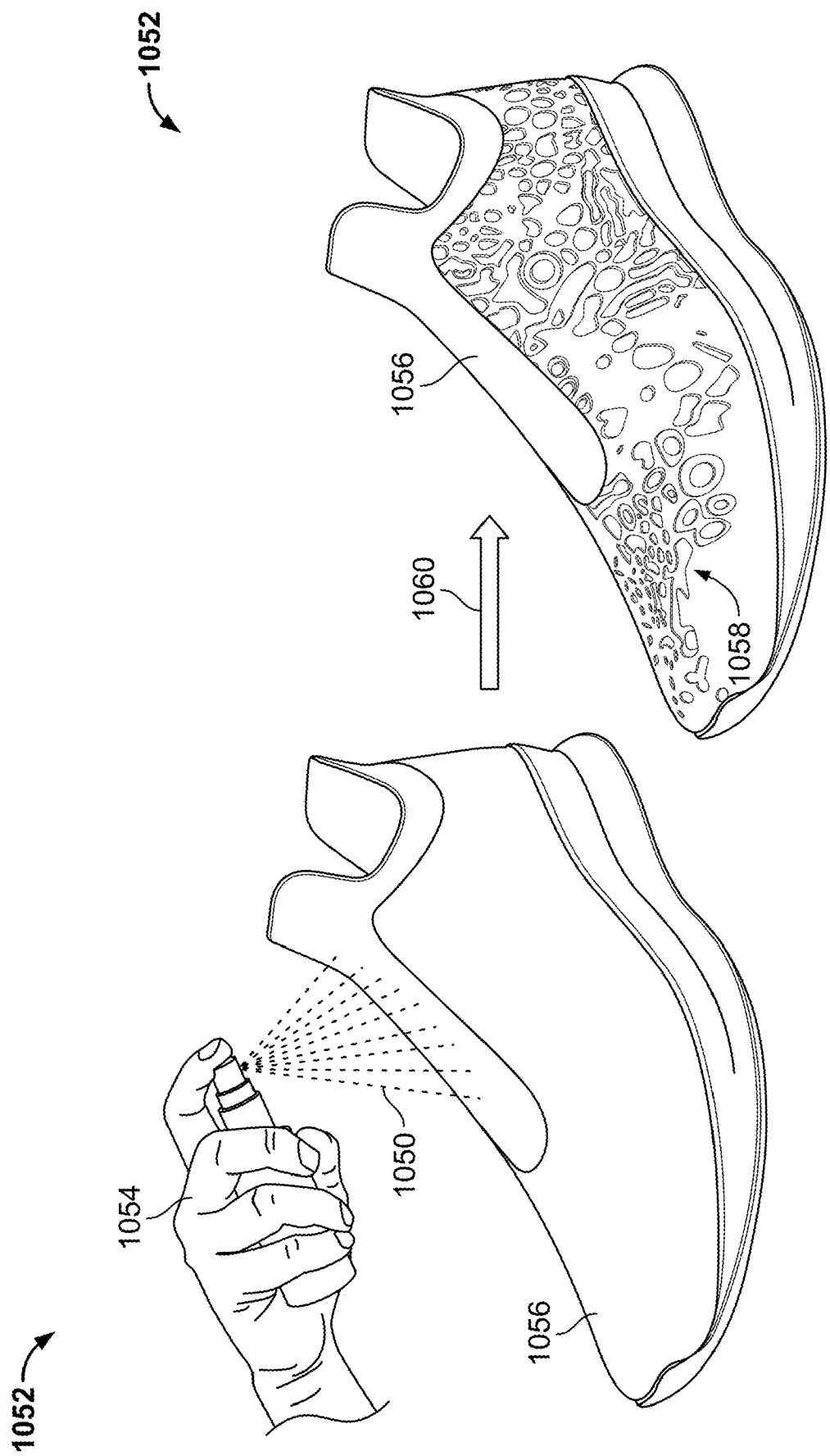

GARMENT HAVING A DEGRADABLE COMPONENT

CROSS REFERENCE TO RELATED APPLICATIONS

This application is a continuation of U.S. application Ser. No. 16/378,555, filed Apr. 8, 2019; which is a continuation-in-part of International Application No. PCT/EP2018/077968, filed Oct. 13, 2018, which applications are incorporated herein by reference in their entirety.

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure relates generally to an article, such as an article of footwear, that includes a degradable portion. In particular, the present disclosure relates to an article with a biodegradable portion that reacts and adapts to a user.

2. Description of the Background

Many consumers desire articles or products that are unique, or specific to their particular use. For instance, many consumers desire articles of footwear having a sole structure that fits their particular gait, an upper with a particular degree of breathability or level of air flow, and/or a shoe having a unique aesthetic appearance. Further, many consumers desire articles of footwear or articles of clothing that are dynamic and adapt to the user. However, creating such articles or products specific to each individual user can be expensive and time consuming, which is typically undesirable for both a consumer and a manufacturer.

For example, some consumers may desire an article of footwear or article of clothing having a particular degree of aeration. But deciding where to include openings or apertures on the article of footwear or article of clothing to provide optimal aeration through the article may depend on the individual using the article and the circumstances of use thereof.

Manufacturers usually provide a variety of products that aim to provide a wide variety of options for a consumer. In addition, many manufacturers allow consumers to customize articles prior to purchasing the article in an effort to provide a unique product for the consumer. However, typically these products usually take longer to manufacture and are more expensive. With respect to articles of footwear or clothing, adding a bespoke or custom option may significantly increase costs for a manufacturer, which can disincentivize the offering due to a large price difference between off-the-shelf goods and customized products. Many articles of clothing and footwear are produced in large volume, thus, significant inefficiencies can result when certain articles are required to be customized.

Many consumers also desire articles or products that are dynamic, or articles that alter in appearance, which provide a user with an experience while the article changes or evolves. In some instances, the dynamic nature of an article or product may alter a user's mood or feeling (e.g., a lamp that changes colors to set a mood), may provide the user with a surprise (e.g., a scratch off ticket that indicates a lottery prize), or may indicate a state of the article (e.g., a light indicating a low battery state). However, producing or manufacturing articles or products that incorporate these dynamic features, and incorporating these dynamic features in such a way that provides an enjoyable experience for a user, may be difficult.

A need therefore exists for systems and methods to allow for customizable articles, including articles of footwear and clothing, that are customized based on one or more factors that may be controlled or may be controllable by an end user. Further, a need exists for systems and methods to allow for articles, including articles of footwear and clothing, that are dynamic and articles that provide for a user experience.

SUMMARY

An article of footwear, as described herein, may have various configurations. The article of footwear may have an upper and a sole structure connected to the upper.

In one aspect, the article of footwear includes an upper that includes an exterior layer and a base layer. The exterior layer includes a biologically active agent and a biodegradable layer. Further, the biologically active agent is capable of biodegrading the biodegradable layer.

In related aspects, the exterior layer further includes an intermediate layer and a top layer, and the intermediate layer may comprise a pattern of patches. In some embodiments, the article of footwear further comprises an instep layer and a collar layer. The exterior layer may extend upwardly from the sole structure along a forefoot region, a midfoot region, and a heel region to a boundary. The boundary may extend around a periphery of the upper and through each of the forefoot region, the midfoot region, and the heel region. In particular embodiments, the biodegradable layer may include poly(ethylene terephthalate) and the biologically active agent may include *Ideonella sakaiensis*. Further, the instep layer and the collar layer may extend upwardly from the boundary.

In another aspect, the article of footwear includes a sole structure and an upper attached to the sole structure. The upper includes a biodegradable layer and a biologically active agent capable of biodegrading the biodegradable layer. The upper may further include a top layer having the biodegradable layer, a base layer, and an intermediate layer positioned between the top layer and the base layer. In some aspects, the intermediate layer is obstructed by the top layer in a first state, and the intermediate layer is at least partially visible in a second state, wherein the biodegradable layer is at least partially biodegraded in the second state. The biodegradable layer may be positioned along a portion of the top layer to allow for degradation of a pattern within the top layer or, in other aspects, the biodegradable layer may be positioned along a portion of the top layer to allow for degradation of a trademark within the top layer. In some embodiments, the article of footwear may also include a first color in the first state and, after the biodegradable layer is consumed, the article of footwear may further include a second color different than the first color in the second state. In further aspects, the base layer may include a non-biodegradable substrate, and the article of footwear may further comprise a tightening member to tighten the article of footwear around a wearer's foot. In particular embodiments, the biodegradable layer may include polycaprolactone and the biologically active agent is selected from the group consisting of: *Bacillus brevis*; *Clostridium botulinum*; *C. acetobutylicum*; *Amycolatopsis* sp.; *Fusarium solani; Aspergillus flavus; Pseudozyma japonica* Y7-09; *R. depolymerans* strain TB-87; *Leptothrix* sp. strain TB-71; *P. antarctica* JCM 10317; and *Cryptococcus* sp. strain S2.

In a further aspect, an article is provided that includes a sole structure, and an upper that is attached to the sole structure and includes a biologically active agent, wherein the biologically active agent emanates carbon dioxide.

Other aspects of the article of footwear, including features and advantages thereof, will become apparent to one of ordinary skill in the art upon examination of the figures and detailed description herein. Therefore, all such aspects of the article of footwear are intended to be included in the detailed description and this summary.

BRIEF DESCRIPTION OF THE DRAWINGS

FIG. 1 is an exploded perspective view of a composite material that includes a composite substrate and a material layer;

FIG. 2 is a top plan view of the composite material of FIG. 1;

FIG. 3A is a cross-sectional view of the composite material of FIG. 2, taken along line 3-3 thereof, according to a first aspect;

FIG. 3B is a cross-sectional view of the composite material of FIG. 2, taken along line 3-3 thereof, according to a second aspect;

FIG. 3C is a cross-sectional view of the composite material of FIG. 2, taken along line 3-3 thereof, according to a third aspect;

FIG. 4A is a top plan view of a composite material in an initial state of biodegradation;

FIG. 4B is a top plan view of a composite material in a first intermediate state of biodegration;

FIG. 4C is a top plan view of a composite material in a second intermediate state of biodegradation;

FIG. 5A is a top plan view of a composite material in an initial state of biodegradation;

FIG. 5B is a top plan view of a composite material in a first intermediate state of biodegradation;

FIG. 5C is a top plan view of a composite material in a second intermediate state of biodegradation;

FIG. 6 is a perspective view of an article of footwear incorporating the composite material of FIG. 1;

FIG. 7 is a lateral side elevational of the article of footwear of FIG. 6;

FIG. 8A is a top plan view of the article of footwear of FIG. 6;

FIG. 8B is a top plan view of the article of footwear of FIG. 6, with an upper removed and a user's skeletal foot structure overlaid thereon;

FIG. 9 is a perspective view of another embodiment of the article of footwear of FIG. 6;

FIG. 10 is an exploded view of the article of footwear of FIG. 6;

FIG. 11 is an exploded view of an article of footwear incorporating the composite material of FIG. 1, according to another aspect of the present disclosure;

FIG. 12 is an exploded view of an article of footwear incorporating the composite material of FIG. 1, according to yet another aspect of the present disclosure;

FIG. 13A is a perspective view of the article of footwear of FIG. 6;

FIG. 13B is a perspective view of the article of footwear of FIG. 13A after undergoing a first amount of biodegradation;

FIG. 14A is a side view of a user wearing the article of footwear of FIG. 6, wherein the article of footwear is at an initial state of biodegradation;

FIG. 14B is a side view of a user wearing the article of footwear of FIG. 6, wherein the article of footwear is at a first intermediate state of biodegradation;

FIG. 14C is a side view of a user wearing the article of footwear of FIG. 6, wherein the article of footwear is at a second intermediate state of biodegradation;

FIG. 15A is a side view of a user wearing an article of footwear incorporating the composite material of FIG. 1, according to an embodiment of the present disclosure;

FIG. 15B is a side view of the user of FIG. 15A, after the article of footwear thereof has undergone a first amount of biodegradation;

FIG. 16A is a side view of a user wearing an article of footwear incorporating the composite material of FIG. 1, according to an embodiment of the present disclosure;

FIG. 16B is a side view of the user of FIG. 16A, after the article of footwear thereof has undergone a first amount of biodegradation;

FIG. 17A is a side view of a user wearing an article of footwear having the composite material of FIG. 1, according to another embodiment of the present disclosure;

FIG. 17B is a side view of the user of FIG. 17A, after the article of footwear thereof has undergone a first amount of biodegradation;

FIG. 18 is a top view of an exemplary heat map of an upper of an article of footwear;

FIG. 19A is a top view of another exemplary heat map of an upper of an article of footwear;

FIG. 19B is a top view of yet another exemplary heat map of an upper of an article of footwear;

FIG. 20A is a perspective view of an article of footwear incorporating the composite material of FIG. 1, according to another aspect of the present disclosure;

FIG. 20B is a perspective view of the article of footwear of FIG. 20A after undergoing a first amount of biodegradation;

FIG. 21A is a perspective view of an article of footwear incorporating components of the composite material of FIG. 1, according to yet another aspect of the present disclosure;

FIG. 21B is a perspective view of the article of footwear of FIG. 21A after undergoing a first amount of biodegradation;

FIG. 22 is a side view of a user wearing a pair of articles having the composite material of FIG. 1;

FIG. 23A is a front view of an article incorporating the composite material of FIG. 1, according to an embodiment of the present disclosure;

FIG. 23B is a front view of the article of FIG. 23A after the article has undergone a first amount of biodegradation;

FIG. 24A is a front view of an article incorporating the composite material of FIG. 1, according to another embodiment of the present disclosure;

FIG. 24B is a front view of the article of FIG. 24A after the article has undergone a first amount of biodegradation;

FIG. 25A is a front view of an article incorporating the composite material of FIG. 1, according to yet another embodiment of the present disclosure;

FIG. 25B is a front view of the article of FIG. 25A after the article has undergone a first amount of biodegradation;

FIG. 26A is a front view of another article incorporating the composite material of FIG. 1, according to an embodiment of the present disclosure;

DETAILED DESCRIPTION OF THE DRAWINGS

Figure 1:
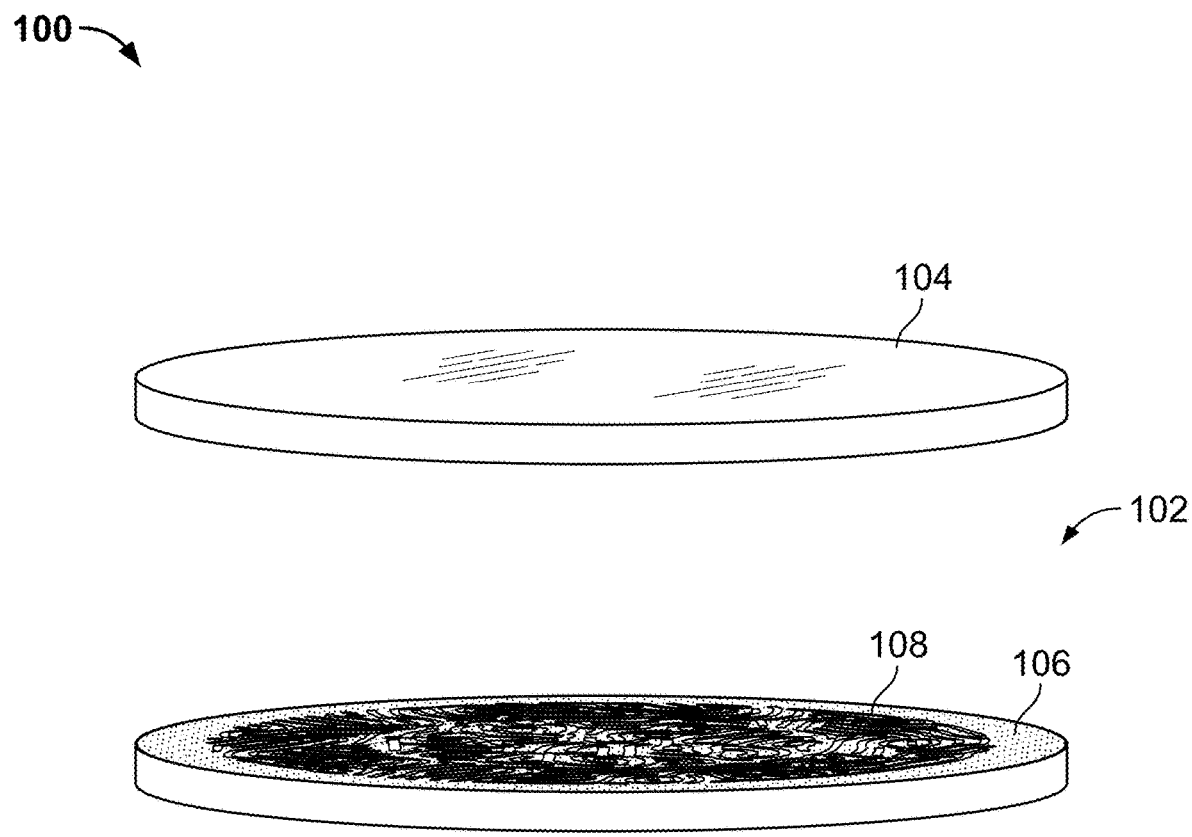

The following discussion and accompanying figures disclose various embodiments or configurations of a composite material that may be used or incorporated into an article, such as an article of footwear or shoe. As will be further discussed herein, concepts or aspects of the composite material may be applied to or incorporated into articles of footwear, articles of clothing, accessories, athletic equipment, or any article that may use a fabric or textile material.

For example, concepts of the composite material may be applied to or incorporated into articles of footwear that are considered athletic articles of footwear or sports shoes, such as running shoes, tennis shoes, basketball shoes, cross-training shoes, football shoes, golf shoes, hiking shoes, hiking boots, ski or snowboard boots, soccer shoes or cleats, walking shoes, track cleats, or any athletic article of footwear utilizing an upper. The concepts associated with embodiments of the present disclosure may also be applied to a wide range of other footwear and footwear styles, such as non-athletic articles of footwear, including dress shoes, sandals, loafers, slippers, or heels.

In addition to footwear, particular concepts described herein may also be applied and incorporated in other types of apparel or other athletic equipment, including articles of clothing (e.g., shirts, shorts, pants, hats, socks, calf sleeves, headbands, wristbands, arm sleeves, gloves, etc.), helmets, padding or protective pads, and shin guards. Even further, particular concepts described herein may be incorporated in insoles, cushions, backpack straps, golf clubs (e.g., a golf club grip), or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The terms "weight percent," "wt-%," "percent by weight," "% by weight," and variations thereof, as used herein, refer to the concentration of a substance or component as the weight of that substance or component divided by the total weight, for example, of the composition or of a particular component of the composition, and multiplied by 100. It is understood that, as used herein, "percent," "%," and the like may be synonymous with "weight percent" and "wt-%."

The terms "degrade," "degradable," and "degradation," as used herein, refer to a material, composition, component of or portion of an article, such as an article of footwear for example, that is capable of being decomposed chemically or biologically following activation by a given stimulus or stimuli, or exposure to, an active agent that promotes decomposition at a rate more rapid than if the material, composition, component of or portion of the article of footwear were left to decompose without the stimuli or active agent.

The terms "biodegrade," "biodegradable," and "biodegradation," as used herein, refer to a material, composition, component of or portion of an article, such as an article of footwear for example, that is capable of being decomposed biologically. Further, the terms "biodegrade," "biodegradable," and "biodegradation," as used herein, refer to the decomposition of an organic material, composition, component of or portion an article, such as an article of footwear for example, by a microorganism (e.g., a bacteria, a fungi, a microalgae, etc.). The terms "biodegrade," "biodegradable," and "biodegradation" may also encompass all stages of biodegradation, including biodeterioration (i.e., a surface-level degradation that modifies the mechanical, physical, or chemical nature or property of a material, composition, or component), biofragmentation (e.g., a process during which chemical bonds within a material or composition are cleaved or broken), and/or assimilation (i.e., the process during which the products of biofragmentation are integrated into or consumed by microbial cells).

Further, the terms "biodegrade," "biodegradable," and "biodegradation," as used herein, refer to a material, composition, component of or portion of an article, such as an article of footwear for example, that is capable of being decomposed biologically following activation by a given biological stimulus or stimuli, and/or exposure to a biologically active agent, that promotes decomposition at a rate more rapid than if the material, composition, component of or portion of the article of footwear were left to decompose without the biologically active agent. As will be further discussed herein, many factors may determine the rate of biodegradation, including, but not limited to, light, water, oxygen, and/or temperature variations.

Degradation or biodegradation may be identified based on an alteration in the properties of the polymer or material such as reduction in molecular weight, loss of mechanical strength, loss of surface properties, the breakdown of the material into fragments, a change in the color or shade of color of the material, a change in the weight of the material, change in flexibility of the material, change in toughness of the material, or release of one or more small molecules from the polymer, material, or article (e.g., article of footwear, article of clothing, etc.) including, but not limited to, $CO_2$, $CH_4$, and $H_2O$. As such, an emission (or passive emanation) of molecules (e.g., $CO_2$, $CH_4$, and $H_2O$) may be an indication of biodegradation. In other embodiments, degradation or biodegradation may be identified based on the formation of apertures through a material. For example, in particular embodiments, degradation or biodegradation of a material may be identified based on the formation of apertures having an area between about 1 mm$^2$ and about 20,000 mm$^2$, between about 100 mm$^2$ and about 10,000 mm$^2$, or between about 200 mm$^2$ and about 1,000 mm$^2$.

Figure 2:
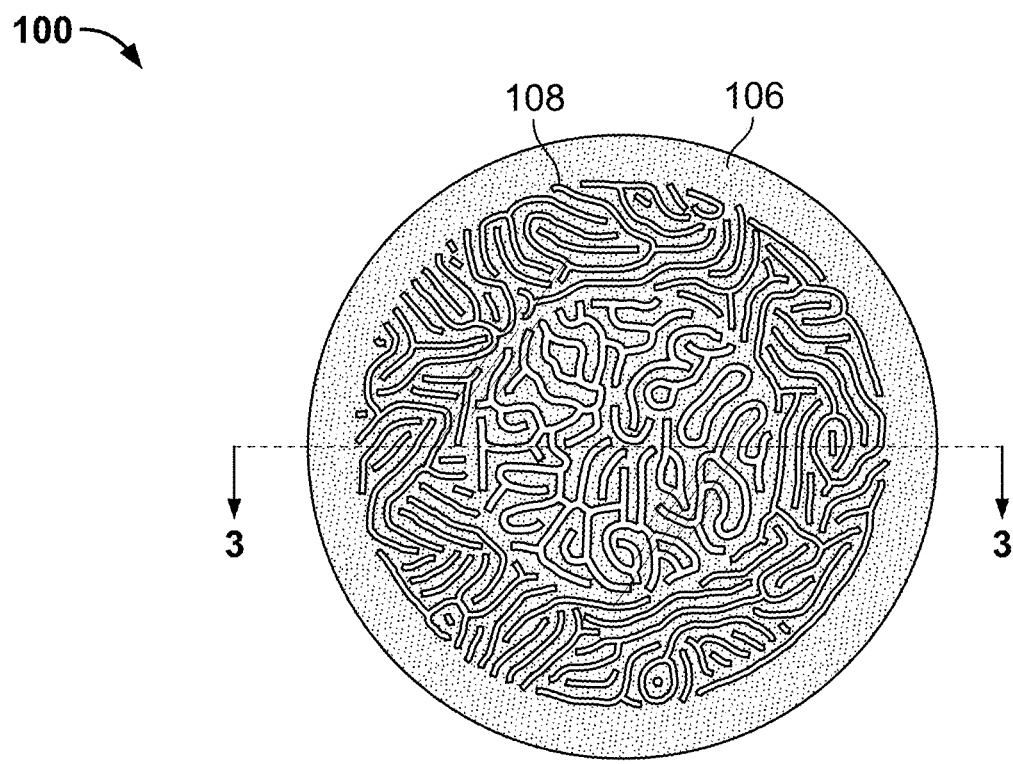

FIGS. 1-3 depict an exemplary embodiment of a composite material 100 that may be incorporated into an article (such as an article of footwear or clothing), which may include a composite substrate or fabric 102 and a material layer 104. As will be further discussed herein, the composite material 100 may include a biologically active agent, and/or a film-like layer of bacteria or fungi formed by assembly of a matrix of extracellular polymeric substances that promote cell-to-cell adhesion of bacteria or fungi. The composite substrate 102 may also promote cell adsorption onto a surface, such as the surface of a polymer or material to be degraded, such as the material layer 104, for example. In this way, the composite material 100 may be introduced into an article, e.g., an article of footwear, an article of clothing, a piece of fabric incorporated into an article, a textile material, etc., with a medium that promotes the growth and survival of the bacteria or fungi, and maintains the composite substrate 102 and the composite material 100. In other aspects, as will be further discussed herein, the composite material 100 may be introduced into an article on its own. As shown in FIG. 1, the material layer 104 may be a transparent or semi-transparent layer. In other embodiments, the material layer 104 may be an opaque or non-transparent layer, as will be further discussed herein.

Figure 3A:
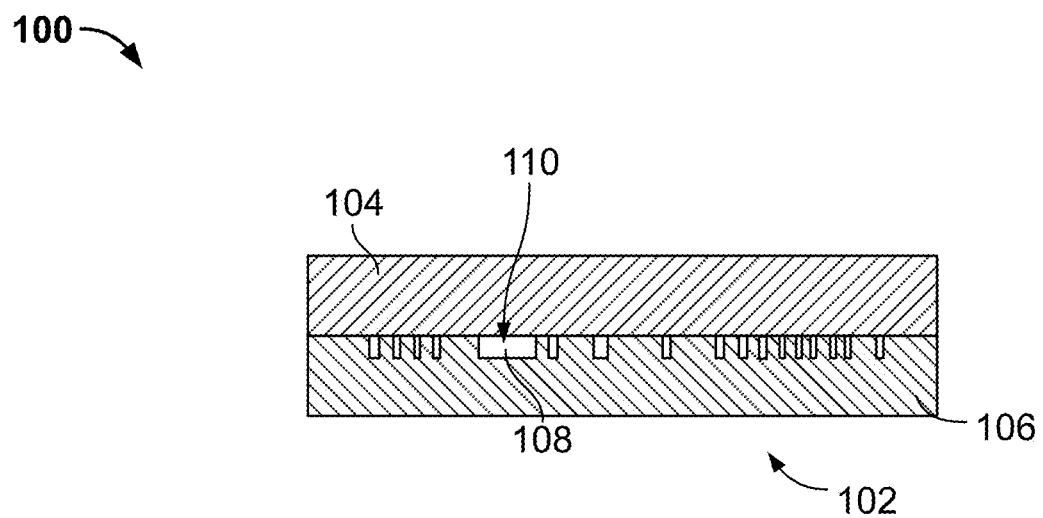
Figure 3B:
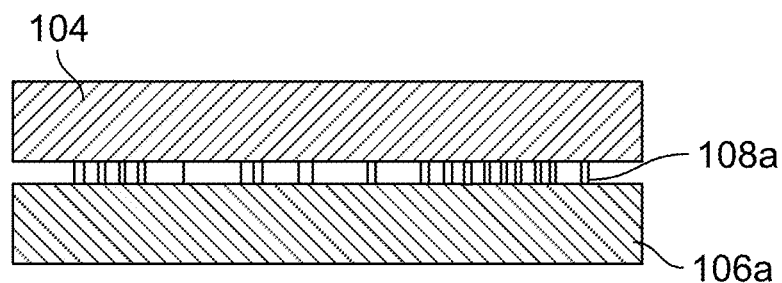
Figure 3C:
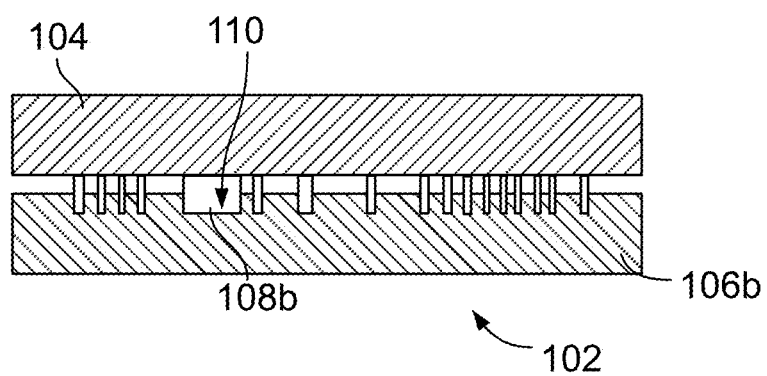

Still referring to FIGS. 1-3, the material layer 104 may engage, be placed upon, or placed adjacent a composite substrate 102. The composite substrate 102 may be a composite material that includes a substrate or base layer 106 and a biodegradable material or biodegradable medium 108 applied to or incorporated into the substrate 106. For example, as shown in FIG. 3A, the composite substrate 102 may include a substrate 106 and a biodegradable material 108 positioned within one or more cavities 110, or, as shown in FIG. 3B, the composite fabric 102 may include a substrate 106a and a biodegradable material 108a positioned thereon. In further embodiments, as shown in FIG. 3C, the composite substrate 102 may include a substrate 106b and a biodegradable material 108b thereon and therein. Alternatively, as will be further discussed herein, the composite material 100 may comprise the composite substrate 102 alone, and may not include a material layer 104. In the embodiments the biodegradable material 108 is provided in a plurality of cavities 110, the cavities 110 may have an upper opening having a width greater than about 1 mm, between about 1 mm to about 30 mm, or between about 3 mm and about 10 mm.

In certain aspects, the biodegradable material or biodegradable medium 108 is integrated in gelatin that is within the caverns or cavities 110, or on the substrate 106. In further aspects, the biodegradable material or biodegradable medium 108 is an encapsulated medium that includes one or more microorganisms (e.g., a bacteria, a fungi, a microalgae, etc.), as well as nutrients that may be metabolized by the microorganisms. In such embodiments, the microorganisms of the biodegradable material or biodegradable medium 108 may be sealed or contained within the biodegradable material or biodegradable medium 108. And, upon activation, the microorganisms of the biodegradable material or biodegradable medium 108 may be released to a surrounding environment. For example, in some embodiments, a thin layer of a low molecular weight biodegradable polymer may extend over a top end of the cavities 110 and seal the biodegradable material 108 therein.

As will be further discussed herein, a stimulus or stimuli may be applied to the biodegradable material or biodegradable medium 108 to cause activation and, thereby, the release of the one or more microorganisms from the biodegradable material or biodegradable medium 108. For example, in the instance a thin layer of a low molecular weight biodegradable polymer extends over a top end of the cavities 110, and seals the biodegradable material 108 therein, a stimulus or stimuli may first cause the biodegradation of the low molecular weight biodegradable polymer and, resultantly, the release of the microorganisms. Such stimulus or stimuli may be an amount of pressure, a level of humidity, an amount of heat, etc. The biodegradable material or biodegradable medium 108 may include one or more nutrients, as noted above, to maintain survival of the microorganisms therein and, more particularly, maintain survival of the microorganisms until a stimulus or stimuli is applied to the biodegradable encapsulation, biodegradable material, or biodegradable medium 108. In some embodiments, the biodegradable medium 108 may contain a stimulus or stimuli therein (e.g., an amount of water therein) that provides activation or the release of the microorganisms from the biodegradable medium 108 without a further stimulus or stimuli.

In some embodiments, such as the embodiment shown in FIGS. 1 and 2, the biodegradable material 108 may be applied to, bonded to, positioned within, or positioned on the substrate 106 as a pattern and, in particular, a pattern of discrete patches. More particularly, as will be further discussed herein, the biodegradable material 108 may be applied to, bonded to, positioned within, or positioned on the substrate 106 in a way that is ornamental or visually pleasing (such as a pattern, an image, a geometric shape, etc.), in a way that forms a particular shape (such as a trademark, brand mark, bar code, general geometric shape, etc.), or in a way that provides a particular function once degraded (such as a pattern that provides apertures for optimal or desired airflow through the article to which the composite material is applied, a pattern that provides a visual indication as to a condition of the article to which the composite material is applied, a pattern that alters a state of the article to which the composite material is applied to provide an indication as to a condition of the article to which the composite material is applied, etc.), and/or combinations thereof.

As noted above, the biodegradable material 108 may be a film-like layer of bacteria or fungi formed by assembly of a matrix of extracellular polymeric substances that promote cell-to-cell adhesion of bacteria or fungi, and may include a biologically active agent. More particularly, the biodegradable material 108 may include a biologically active agent that biodegrades at least a portion of the composite material 100, such as the biodegradable material 108 itself, the material layer 104, and/or the substrate 106.

Figure 4A:
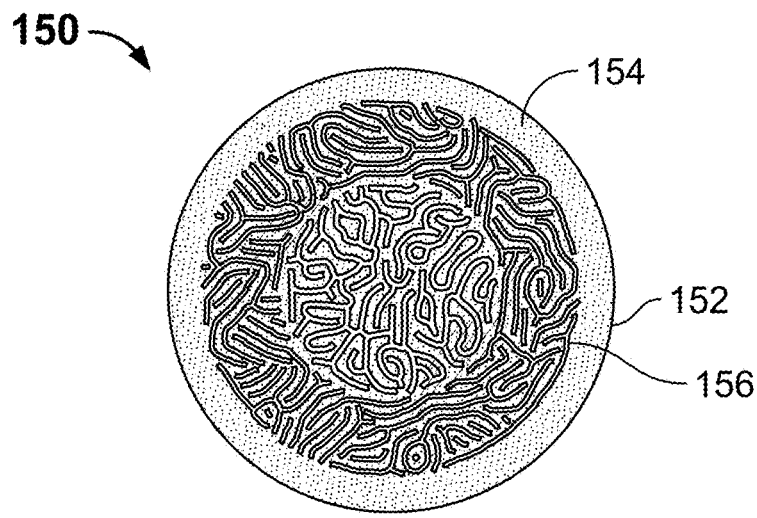
Figure 4B:
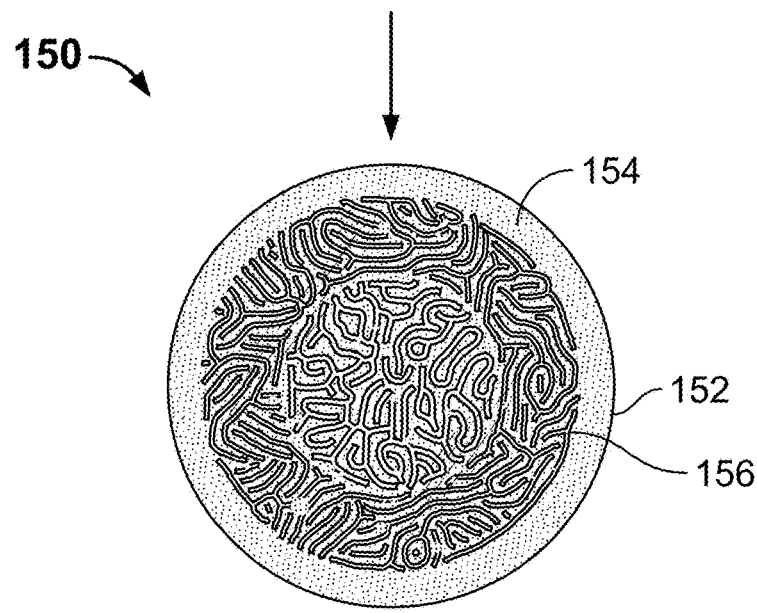
Figure 4C:
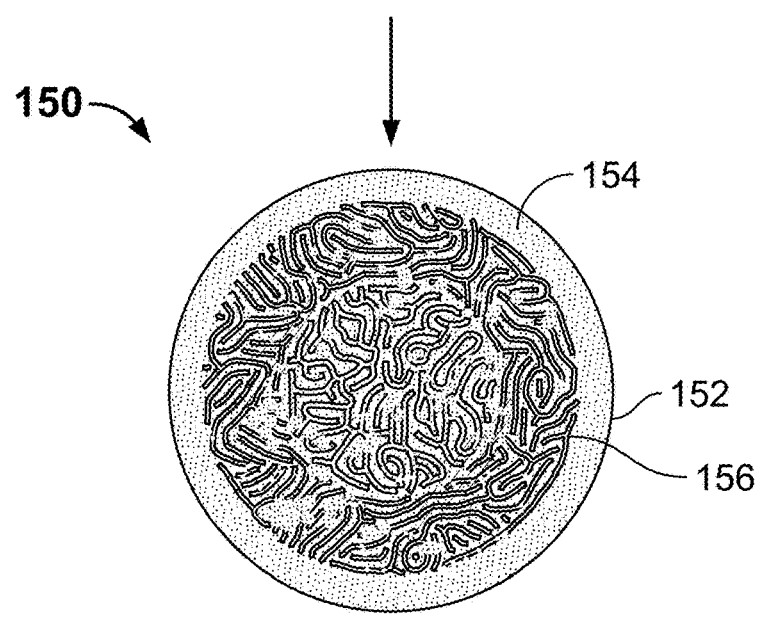

FIGS. 4A-4C depict a composite material 150, similar to the composite material 100, which includes a material layer 152, a substrate 154, and a biodegradable portion 156, in an initial state of biodegradation (see FIG. 4A), in a first intermediate state of biodegradation (see FIG. 4B), and in a second intermediate state of biodegradation (see FIG. 4C). More particularly, FIG. 4A depicts a composite material 150 having a substrate 154 and a biodegradable material 156, neither of which have undergone biodegradation; FIG. 4B depicts the composite material 150 after portions of the biodegradable material 156 have undergone biodegradation; and FIG. 4C depicts the composite material 150 after portions of the biodegradable material 156 have undergone further biodegradation.

Figure 5A:
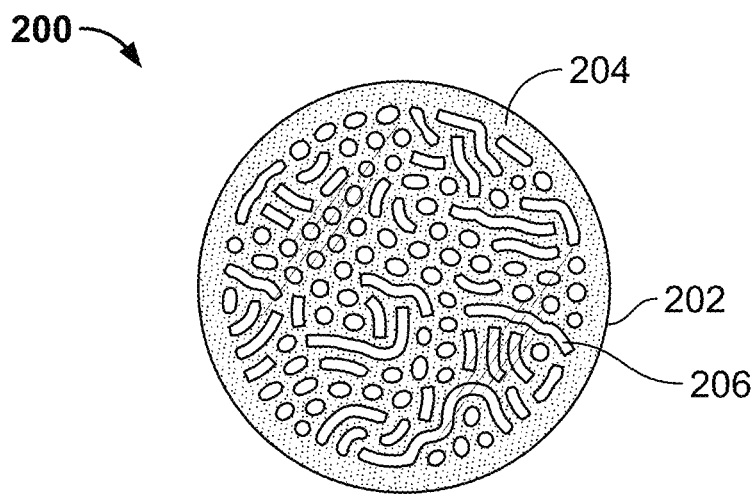
Figure 5B:
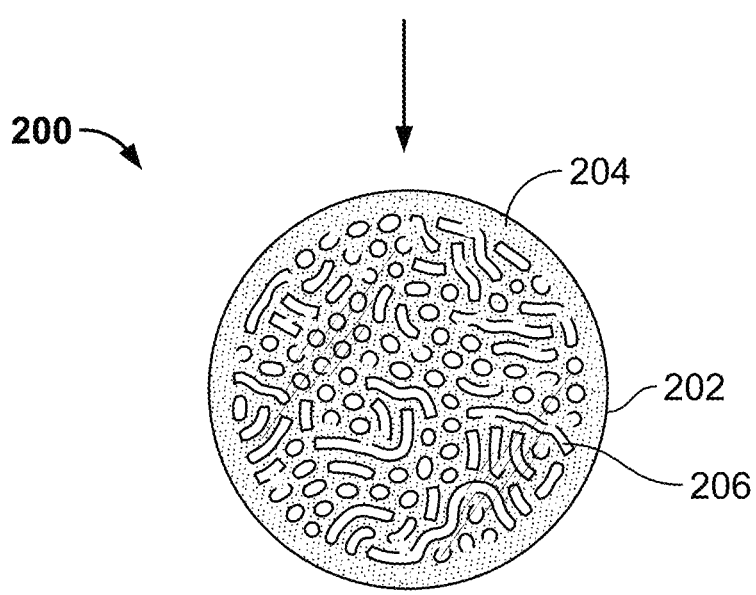
Figure 5C:
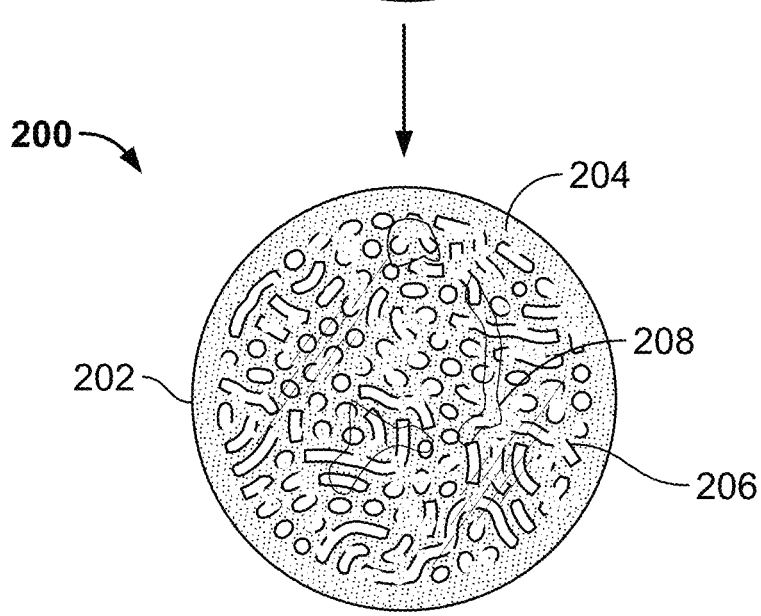

As noted herein, in some embodiments, the biodegradable material 108 may be applied to, bonded to, positioned within, or positioned on the substrate 106 as a pattern. FIGS. 5A-5C depict a composite material 200, similar to the composite material 100, that includes a material layer 202, a substrate 204, and a biodegradable portion 206 in a pattern different from that of FIGS. 4A-4C. Still referring to FIGS. 5A-5C, FIG. 5A depicts the composite material 200 in an initial state (i.e., a state without biodegradation), FIG. 5B depicts the composite material 200 in a first state of biodegradation and after which portions of the biodegradable material 206 have undergone biodegradation, and FIG. 5C depicts the composite material 200 in a second state of biodegradation and after which portions of the biodegradable material 206 and the material layer 202 have undergone biodegradation. In particular, the material layer 202 has been degraded by the biologically active agent within the biodegradable material 206, such that one or more apertures 208 are formed through the material layer 202.

Biologically active agents used in the biodegradation of materials, compositions, components of, and portions of the composite material 100 (which may be incorporated into an article, such as an article of footwear for example) described herein may be, but are not limited to, microorganisms such as a bacteria, an actinobacteria, a proteobacteria, a bacteroidetes, a fungi, a yeast, an algae, or a protozoa.

Suitable microorganisms for use in the biodegradation of materials, compositions, components of, and portions of the composite material of an article, e.g., an article of footwear, described herein are known and used in the art, see for example, Yoshida et al. ("A bacterium that degrades and assimilates poly(ethylene terephthalate)," Science, 2016, 351(6278):1196-1199), Pathak and Navneet ("Review on the current status of polymer degradation: a microbial approach," Bioresources and Bioprocessing, 2017, 4:15), Shah et al. ("Microbial degradation of aliphatic and aliphatic-aromatic co-polyesters," Appl Microbiol Biotechnol, 2014, 98:3437-3447), and Abdel-Motaal et al. ("Biodegradation of ploy (ε-caprolactone) (PCL) film and foam plastic by *Pseudozyma japonica* sp. nov., a novel cutinolytic ustilaginomycetous yeast species," 3 Biotech, 2014, 4:507-512), all of which are incorporated in their entirety herein by reference.

In some aspects, the microorganism to be chosen as the biologically active agent for the composite material 100 may be matched to the material, compositions, or portion of the article, or article of footwear designed to be degraded or biodegraded. For example, the biologically active agent for the composite material 100 may be matched with the particular material used to construct the biodegradable portion 108 of the composite substrate 102 or the particular material used to construct the material layer 104. For instance, the microorganisms *Ideonella sakaiensis* may be used to degrade poly(ethylene terephthalate) (PET) plastic material. As such, in an instance where an article, such as an article of footwear or article of clothing, includes a composite material 100 having a material layer 104, or biodegradable material 108, composed of poly(ethylene terephthalate), the biodegradable material 108 may include *Ideonella sakaiensis* as a biologically active agent therein, if the material layer 104 or biodegradable material 108 is designed to be degraded or biodegraded by the biodegradable material 108.

As another example, the biologically active agent for the biodegradable material 108 may be selected based on the particular portion of an article, or particular location along the article, to which the composite material 100 is applied. For instance, as will be further discussed herein, it may be desired that a particular portion of an article of clothing that experiences higher body temperature, such as an armpit region of an article of clothing, may degrade or biodegrade quicker or may have a faster speed of degradation or biodegradation, than another portion of an article of clothing that experiences a lower body temperature or another portion of an article of clothing that provides support or stability to the article of clothing, such as a neck or hip region of an article of clothing.

Suitable and exemplary microorganisms and the corresponding material they are known to degrade are provided in Table 1 below.

TABLE 1

Biologically active agents for biodegradation of a component of or a portion of an article of footwear.

| Microorganisms | Materials |
| --- | --- |
| *Ideonella sakaiensis*; *Ideonella sakaiensis* strain 201-F6; *Thermobifida alba* Est119; *T. cellulosilytica* DSM44535 | poly(ethylene terephthalate) (PET) |
| *Pseudomonas putida* | Naphthalene |
| *Pseudomonas putida* | Polystyrene |
| *Pseudomonas putida*; *Comamonas acidovorans* TB-35; *Curvularia senegalensis*; *Fusarium solani*; *Aureobasidium pullulans*; *Cladosporium* sp.; *Trichoderma* DIA-T spp.; | Polyurethane |

TABLE 1-continued

Biologically active agents for biodegradation of a component of or a portion of an article of footwear.

| Microorganisms | Materials |
| --- | --- |
| Trichoderma sp.; Pestalotiopsis microspora Brevibacillus borstelensis; Comamonas acidovorans TB-35; Pseudomonas chlororaphis; P. aeruginosa; P. fluorescens; Rhodococcus erythropolis; R. rubber; R. rhodochrous; Staphylococcus cohnii; S. epidermidis; S. xylosus; Streptomyces badius; S. setonii; S. viridosporus; Bacillus amyloliquefaciens; B. brevis; B. cereus; B. circulans; B. circulans; B. halodenitrificans; B. mycoides; B. pumilus; B. sphaericus; B. thuringiensis; Arthrobacter paraffineus; A. viscosus; Acinetobacter baumannii; Microbacterium paraoxydans; Nocardia asteroids; Micrococcus luteus; M. lylae; Lysinibacillus xylanilyticus; Aspergillus niger; A. versicolor; A. flavus; Cladosporium cladosporioides; Fusarium redolens; Fusarium spp. AF4; Penicillium simplicissimum YK; P. simplicissimum; P. pinophilum; P. frequentans; Phanerochaete chrysosporium; Verticillium lecanii; Glioclodium virens; Mucor circinelloides; Acremonium Kiliense; Phanerochaete chrysosporium | Polyethylene |
| Pseudomonas fluorescens B-22; P. putida AJ; P. chlororaphis; Ochrobactrum TD; Aspergillus niger | Polyvinyl chloride |
| Pseudomonas lemoignei; Alcaligenes faecalis; Schlegelella thermodepolymerans; Aspergillus fumigatus; Penicillium spp.; Penicillium funiculosum; Ilyobacter delafieldii; B. thuringiensis; Alcaligenes faecalis Clostridium botulinum; C. acetobutylicum; Streptomyces sp. SNG9; B. thuringiensis | Poly(3-hydroxybutyrate) (PHB)

Poly(3-hydroxybutyrate-co-3-hydroxyvalerate) (PHBV) |
| Bacillus brevis; Clostridium botulinum; C. acetobutylicum; Amycolatopsis sp.; Fusarium solani; Aspergillus flavus; Pseudozyma japonica Y7-09; R. depolymerans strain TB-87; Leptothrix sp. strain TB-71; P. antarctica JCM 10317; Cryptococcus sp. strain S2; Penicillium roquefort; Amycolatopsis sp.; Bacillus brevis; Rhizopus delemar | Polycaprolactone (PCL)

Polylactic acid |
| R. depolymerans strain TB-87; Leptothrix sp. strain TB-71; | Poly(ethylene succinate) (PES) |
| Streptomyces coelicolor 1A; Pseudomonas citronellolis | Poly(cis-1,4-isoprene) |
| R. depolymerans strain TB-87; P. antarctica JCM 10317; A. oryzae RIB40 | Poly(butylene succinate) (PBS) |
| R. depolymerans strain TB-87; Leptothrix sp. strain TB-71; P. antarctica JCM 10317 | Poly(butylene succinate-co-adipate) (PBSA) |
| Leptothrix sp. strain TB-71; P. antarctica JCM 10317; Cryptococcus sp. strain S2; Paenebacillus amylolyticus; | Poly(L-lactic acid) (PLA) |
| R. depolymerans strain TB-87; Leptothrix sp. strain TB-71; | Poly(butylene adipate-co-terephthalate) (PBAT) |
| R. depolymerans strain TB-87; Leptothrix sp. strain TB-71; | Poly(butylene succinate-co-terephthalate) (PBST) |
| R. depolymerans strain TB-87; Leptothrix sp. strain TB-71; | Poly(butylene succinate/terephthalate/ isophthalate-co-lactate) (PBSTIL) |
| T. fusca; T lanuginosus; | Poly(trimethylene terephthalate) (PTT) |
| P. lemoignei | Polyhydroxyvalerate (PHV) |
| P. fluorescens | Polyhydroxyoctanoate (PHO) |

In some embodiments, biologically active agents used in the biodegradable portion 108 and used in the biodegradation of materials, compositions, components of and portions of the composite material 100 of an article, such as an article of footwear, described herein may be a recombinant microorganism genetically engineered to express one or more metabolic enzymes from a microorganism known to be active in the biodegradation of a material or composition. For example, the biologically active agents used in the biodegradable portion 108 may be a microorganism genetically engineered to express one or more metabolic enzymes that cause hydrolysis of a biopolymer during a process of biodeterioration, fragmentation of the biopolymer during a process of biofragmentation, and absorption or consumption of the fragments of the biopolymer during a process of assimilation. In further embodiments, the biologically active agents used in the biodegradable portion 108 and used in the biodegradation of materials, composition, components of and portions of the composite material 100 of an article, such as an article of footwear, may be a microorganism engineered to excrete an organic acid as a metabolite by means of microbial metabolism by the microorganism.

For example, the biologically active agent may be a microorganism genetically engineered to express poly(ethylene terephthalate) hydrolase (Genbank accession number GAP38373.1), mono(2-hydroxyethyl)terephthalic acid hydrolase (Genbank accession number GAP38911.1), terephthalic acid-1,2-dioxygenase, 1,2-dihydroxy-3,5-cyclohexadiene-1,4-dicarboxylate dehydrogenase, PCA 3,4-dioxygenase, or combinations thereof, from *Ideonella sakaiensis*. Metabolic enzymes or other genes of interest for use in genetically engineering a recombinant microorganism for use as a biologically active agent may include, but are not limited to, esterases, lipases, proteases, PHA depolymerases, cutinases, monooxygenases, dioxygenases, hydrolases, dehydrogenases, carrinoid-dependent enzymes, and an alginate-producing gene to enhance biofilm formation (e.g., algC). Even further, the biologically active agent may be a microorganism that excretes or releases an organic acid, such as lactate, acetate, $H_2SO_4$.

Still further, in some embodiments, the biologically active agent used in, or encapsulated within, the biodegradable portion 108 may be metabolic enzymes or organic acids produced by a microorganism, but the biodegradable portion 108 may not contain the microorganism itself.

The biologically active agents used in the biodegradable portion 108 and used in the biodegradation of materials, compositions, components of and portions of an article, such as an article of footwear for example, described herein may be contained in or delivered to an article in any medium suitable for survival and growth of the biologically active agents.

For example, the medium may be in any form including, but not limited to, a gel, a hydrogel, a liquid, a cream, an oil, a foam, a paste, a powder, or a film. Components of the medium may include, but are not limited to, agar, agarose, peptone, polypeptone, glucose, yeast extract, malt extract, polyethylene glycol, salts (e.g., sodium hydrogen carbonate ($NaHCO_3$), ammonium sulfate (($NH_4)_2SO_4$), calcium carbonate ($CaCO_3$), magnesium sulfate ($MgSO_4$), and sodium chloride (NaCl)), buffers (e.g., phosphate buffer, Tris buffer, sodium acetate buffer, and citrate buffer), vitamins (e.g., thiamine, niacin, aminobenzoic acid, pyridoxal-HCl, panthothenate, biotin, and vitamin B12), trace elements, water, solvents (e.g., methanol and ethanol), or combinations thereof.

The pH of the medium may be adjusted to support the growth and survival of the biologically active agent. For example, the pH may be, but is not limited to, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, or 11.0. The medium may also include a low-crystallinity or low-density polymer such as, but not limited to, low-density polyethylene (LDPE), low-crystallinity PET film, low molecular weight polycaprolactine film, p-nitrophenyl butyrate, and p-nitrophenyl palmitate. In some embodiments, the medium includes a low-crystallinity (e.g., 1.9%) PET film to support the survival and growth of the microorganism selected as the biologically active agent.

One or more additives may also be added to the medium, the biodegradable portion 108, or other portion of the composite material 100 to tune the degradability or biodegradability of the material, composition, component of or portion of the article to which the composite material 100 or biodegradable portion 108 is applied. Additives may include, but are not limited to, benzophenone, polyhydroxyalkanoate (PHA) polyesters, or another type of additive.

Additionally, the composite material 100 and, more particularly, the substrate 106 or the material layer 104 may include a polymer material. The polymer material to be used in an article, such as an article of footwear, may include an organic filler such as, but not limited to, eggshell, coconut, abaca, kenaf, seaweed, rice straw, sisal, coffee husk, corn stover, wood shavings, and sawdust. The inclusion of an organic filler(s) in the polymer material may enhance the degradation or biodegradation, or may allow for the tuning of the timing and/or degree of degradation or biodegradation. For example, as previously discussed herein, it may be desired that a particular portion of an article of clothing that experiences higher body temperature, such as an armpit region of an article of clothing, may degrade quicker or may have a faster speed of degradation, than another portion of an article of clothing that experiences a lower body temperature or another portion of an article of clothing that provides support or stability to the article of clothing, such as a neck or hip region of an article of clothing. As such, in one particular embodiment, an armpit region of an article of clothing may be composed of a composite material 100 with an organic filler and a neck region of an article of clothing may be composed of a composite material 100 that lacks an organic filler, so that the armpit region of the article of clothing degrades quicker than the neck region thereof.

In other embodiments, an article having a uniform rate of degradation or biodegradation may be desired and, in such embodiments, the article may include organic fillers to provide uniform degradation or biodegradation. For example, portions that are warmer or portions of an article that experience higher body temperatures may degrade or biodegrade at a faster rate than other areas of the article, such as areas that experience lower body temperatures. As such, areas that degrade or biodegrade at a slower rate may include an organic filler to accelerate the rate of degradation or biodegradation thereof to a rate that is approximately equal to the area or portion of the article that experiences a faster rate of degradation or biodegradation.

As discussed above, in some embodiments, the biologically active agent may be introduced into an article, such as an article of footwear, as a biofilm. As used herein, the term "biofilm" refers to a film-like layer of bacteria or fungi formed by assembly of a matrix of extracellular polymeric substances which promote cell-to-cell adhesion of bacteria or fungi. A biofilm, such as the composite substrate 102, may promote cell adsorption onto a surface, such as the surface of a polymer or material to be degraded. The composite material 100 may be introduced into an article, such as an article of footwear, on its own or it may be introduced with a medium that promotes the growth and survival of the bacteria or fungi as well as maintenance of the composite material 100, and the biodegradable portion 108 thereof. In some embodiments, one or more dyes may be added to the composite material 100 (or the components thereof) to visualize biofilm formation and growth or to color the composite material 100 (or components thereof) for use in an article, such as an article of footwear. More particularly, the biodegradable portion or biodegradable medium 108 may contain a dye and, upon activation by a stimulus or stimuli, the dye may be released from the biodegradable portion or biodegradable medium 108 and into or onto a surrounding environment. For example, the biodegradable medium 108 may be a sealed encapsulation that includes a biologically active agent and a dye and, upon activation by a stimulus or stimuli, may release the dye to a surrounding substrate or fabric (e.g. the substrate 106) and alter the color or appearance of the surrounding substrate or fabric.

Optionally, the medium containing the biologically active microorganism may be embedded within or on the composite material 100, such as a part of a nano-filler within the composite material 100, the composite substrate 102, or the biodegradable portion 108, for example. In further embodiments, the medium containing the biologically active microorganism may be contained within one of more cavities within an article (e.g., the cavities 110). Even further, the medium containing the biologically active microorganism may be remote from an article and may be applied to the article by a user. For example, in some embodiments discussed herein, the medium containing the biologically active microorganism may be a fluid spray or aerosol composition and, when desired, may be applied, sprayed, or otherwise distributed on an article by a user.

In some embodiments, a stimulus or stimuli may be used to prompt, accelerate, or deaccelerate degradation. For example, in some aspects, the stimulus or stimuli used to prompt or accelerate degradation or biodegradation may include, but are not limited to, variations in temperature (such as increases or decreases in heat), sweat, light, UV light, a change in pressure, a change in humidity, a change in pH, exposure to a liquid (e.g., water, salt water, acidic solution, basic solution), exposure to a gas (e.g., $CO_2$, $NH_3$, $O_2$), or a solvent.

The stimulus or stimuli may prompt, accelerate, or decelerate degradation or biodegradation after a single exposure by one or more stimulants or stimuli, or the degradation or biodegradation may be tuned to respond after repeated exposure to the stimulus, stimuli, or a group of stimuli. In one aspect, the stimulus or stimuli may be body heat or sweat from the user. In another aspect, the stimulus or stimuli may be an environmental stimulus or stimuli, such as exposure to one or more natural elements including weather conditions, humidity, or pressure and the degradation may be tuned to respond to an environmental stimulus or stimuli after a particular threshold is reached or period of time has elapsed. In yet another aspect, the stimulus or stimuli may be a variation in temperature and the degradation may be tuned to respond to the temperature or change in temperature after a particular threshold is reached or a period of time has elapsed. In still another aspect, the stimulus or stimuli may be light of a given wavelength, such as UV light, visible light, or infrared radiation, or it may be a broad spectrum of light, and the degradation may be tuned to respond to the light after a particular threshold is reached or a period of time has elapsed.

In some particular embodiments, degradation or biodegradation is activated at temperature between about 30° C. and about 80° C. (e.g., 25° C., 30° C., 35° C., 40° C., 45° C., 50° C., 55° C., 60° C., 65° C., 70° C., 75° C., 80° C. or 85° C.) In some embodiments, degradation or biodegradation is activated at a humidity between about 20% relative humidity and about 100% relative humidity (e.g., 15%, 20%, 25%, 30%, 35%, 40%, 45%, 50%, 55%, 60%, 65%, 70%, 75%, 80%, 85%, 90%, 95%, or 100%). In some embodiments, the degradation or biodegradation is less active or completely inactivated at temperatures below 30° C., below 25° C., below 20° C., below 15° C., below 10° C., below 5° C. or below 0° C. In some embodiments, the degradation or biodegradation is less active or completely inactivated at a humidity below 20%, below 15%, below 10%, below 5%, or below 2%.

It should be understood that the timing and duration of the degradation or biodegradation of the material, composition, or portion of an article, such as an article of footwear, may be tuned or controlled based on a variety of factors. For example, the particular materials used for the composite material 100, the materials used for the composite substrate 102, including materials used for the substrate 106 and/or the biodegradable portion 108, including materials used for the biologically active microorganism, the medium containing the biologically active microorganism, additives, organic fillers, etc., and the materials used for the material layer 104 may be chosen to provide an article having a particular degree or particular speed of biodegradation. In further embodiments, an article (and the timing and duration of the degradation thereof) may be tuned or controlled based on the particular use of the article and/or the particular use of an article that may include the article having the biodegradable portion. For instance, an article of footwear may include a component thereof, e.g., a portion of an upper of the article of footwear, that is tuned to biodegrade after a predetermined time of use (e.g., after traveling about 150 kilometers, after traveling about 300 kilometers, after traveling about 400 kilometers, after traveling about 500 kilometers, after traveling about 600 kilometers, after traveling about 700 kilometers, after traveling about 800 kilometers, after traveling about 900 kilometers, or after traveling about 1000 kilometers). In one aspect, a component of an article of footwear utilized for low mileage or small distances, such as a racing flat, may be tuned to degrade or visually alter after a predetermined distance of between about 150 kilometers and about 500 kilometers of usage. In another aspect, a component of an article of footwear utilized for high mileage or longer distances, such as a training shoe, may be tuned to degrade or visually alter after a predetermined distance of between about 500 kilometers and about 800 kilometers of usage. As such, and as will be further discussed herein, the portion of the article of footwear incorporating the biodegradable portion may provide an indication as to when the article of footwear should be replaced or after the user has completed a task (e.g., the completion of a marathon).

In other aspects, the timing and duration of the degradation or biodegradation of a material, composition, or portion of an article, such as an article of footwear or article of clothing, may be tuned or controlled based on a predetermined rate of biodegradation that provides an article of footwear or article of clothing, for example, that includes a variety of ornamental or aesthetic appearances over the lifetime thereof. For instance, an article of footwear or an article of clothing, or a component thereof, may be tuned to biodegrade after a predetermined time (e.g., after 12 hours, after 24 hours, after 2 days, after 3 days, after 4 days, after 5 days, after 6 days, after a week, after two weeks, after three weeks, after four weeks, after a month, after 2 months, after 3 months, after 6 months, after a year, etc.) to provide a new and ornamental appearance. For example, as will be further discussed herein, an article of footwear or article of clothing may change in appearance (e.g., color, shape, texture, etc.) after a predetermined time of use and, thereby, provide an article that continuously changes in style.

In further aspects, the timing and duration of the degradation or biodegradation of a material, composition, or portion of an article, such as an article of footwear or article of clothing, may be tuned or controlled based on a predetermined rate of biodegradation. For instance, an article of footwear or an article of clothing may include a component thereof that is tuned to biodegrade after a predetermined time (e.g., after 12 hours, after 24 hours, after 2 days, after 3 days, after 4 days, after 5 days, after 6 days, after a week, after two weeks, after three weeks, after four weeks, after a month, after 2 months, after 3 months, after 6 months, after a year, etc.). In particular embodiments, an article of footwear or an article of clothing may include a component thereof that is tuned to biodegrade after a predetermined time and, resultantly, provide an indication as to whether the user thereof receives a prize or wins a contest. In one particular aspect, an article of footwear or an article of clothing may be tuned to biodegrade after a predetermined time between about 1 week and about a month, and resultantly display an indication (e.g., indicia, a color, text, etc.) that the user of the article of footwear or clothing receives a prize or wins a contest (e.g., a sweepstakes).

In even further aspects, the timing and duration of the degradation or biodegradation of a material, composition, or portion of an article, such as an article of footwear or article of clothing, may be tuned or controlled so that biodegradation is only possible for a predetermined amount of time. For instance, an article of footwear or an article of clothing may include a component thereof that is tuned to biodegrade for only a predetermined amount of time (e.g., after 12 hours, after 24 hours, after 2 days, after 3 days, after 4 days, after 5 days, after 6 days, after a week, after two weeks, after three weeks, after four weeks, after a month, after 2 months, after 3 months, after 6 months, after a year, etc.), and then cease to biodegrade thereafter. For example, an article of footwear or clothing may include a biodegradable portion 108 and/or material layer 104 having a biologically active microorganism with a lifetime of a predetermined length (e.g., a week, a month, a year, etc.), which allows the biodegradable portion 108 or the material layer 104 to biodegrade for that predetermined length of time, but cease to biodegrade thereafter. As such, the biodegradable portion (e.g., the biodegradable portion 108 and/or the material layer 104) of the article of footwear or article of clothing may provide an indication as to the extent of wear, exercise, or activity during that predetermined length of time (e.g., the more a user exercises, the more the article biodegrades).

In still further aspects, the timing and duration of the degradation or biodegradation of a material, composition, or portion of an article, such as an article of footwear or article of clothing, may be tuned or controlled so that biodegradation provides an indication of environmental exposure for a user. For example, as discussed herein, the degradation or biodegradation of an article may be prompted or accelerated based on environmental factors, including, but not limited to variations in temperature, light, UV light, a change in pressure, a change in humidity, a change in pH, exposure to a liquid (e.g., water, salt water, acidic solution, basic solution), and/or exposure to a gas (e.g., $CO_2$, $NH_3$, $O_2$). Therefore, according to one aspect of the present disclosure, an article of footwear or article of clothing may degrade or biodegrade after a certain amount of exposure to $CO_2$, for example, and/or may degrade or biodegrade when there are heightened amounts of $CO_2$ in the atmosphere.

As will be further discussed herein, numerous modifications to the present invention will be apparent to those skilled in the art in view of the foregoing description. Accordingly, this description, and the aforementioned examples, are to be construed as illustrative only and are presented for the purpose of enabling those skilled in the art to make and use embodiments of the present disclosure, and to teach the best mode of carrying out same.

Figure 6:
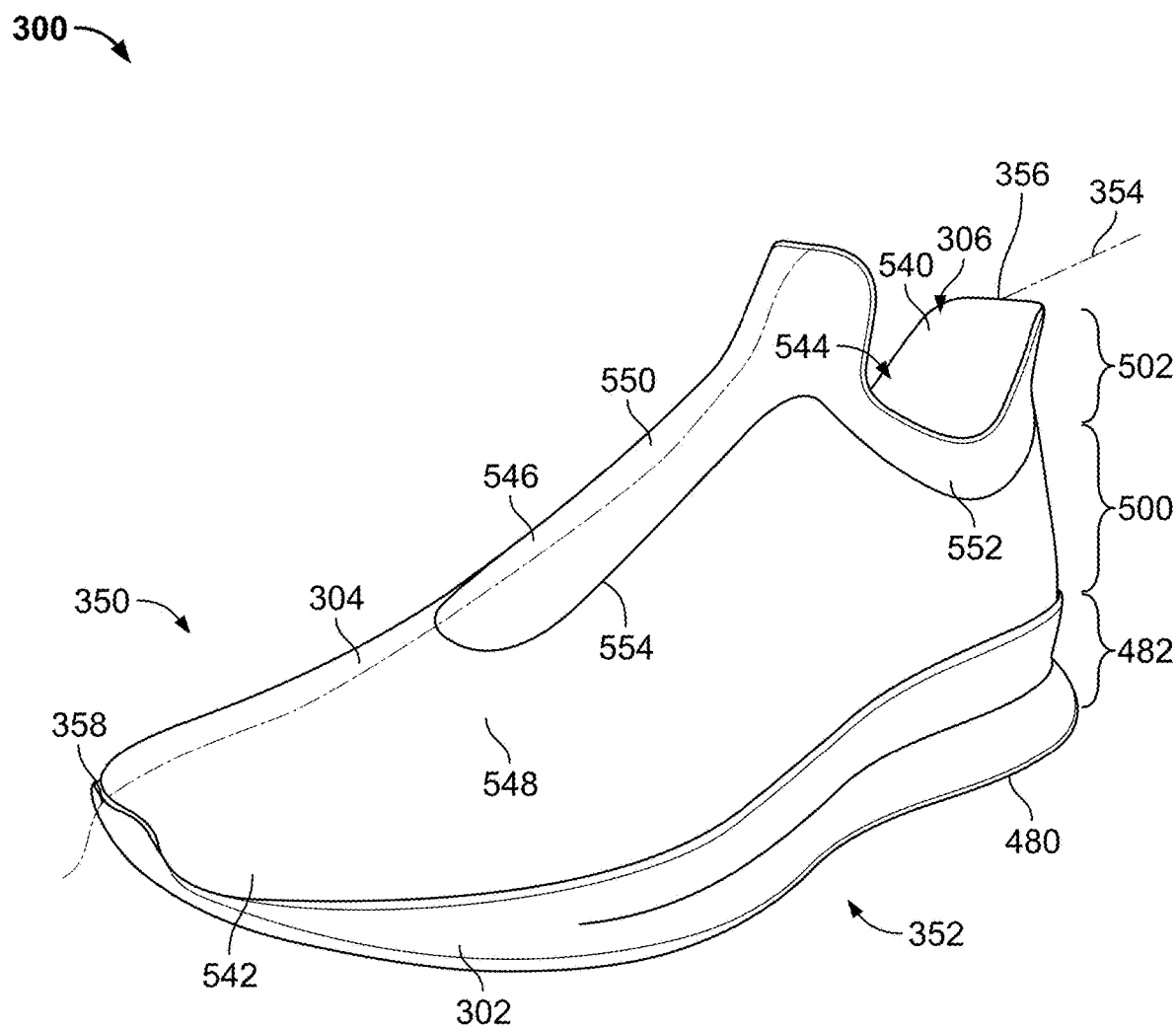
Figure 7:
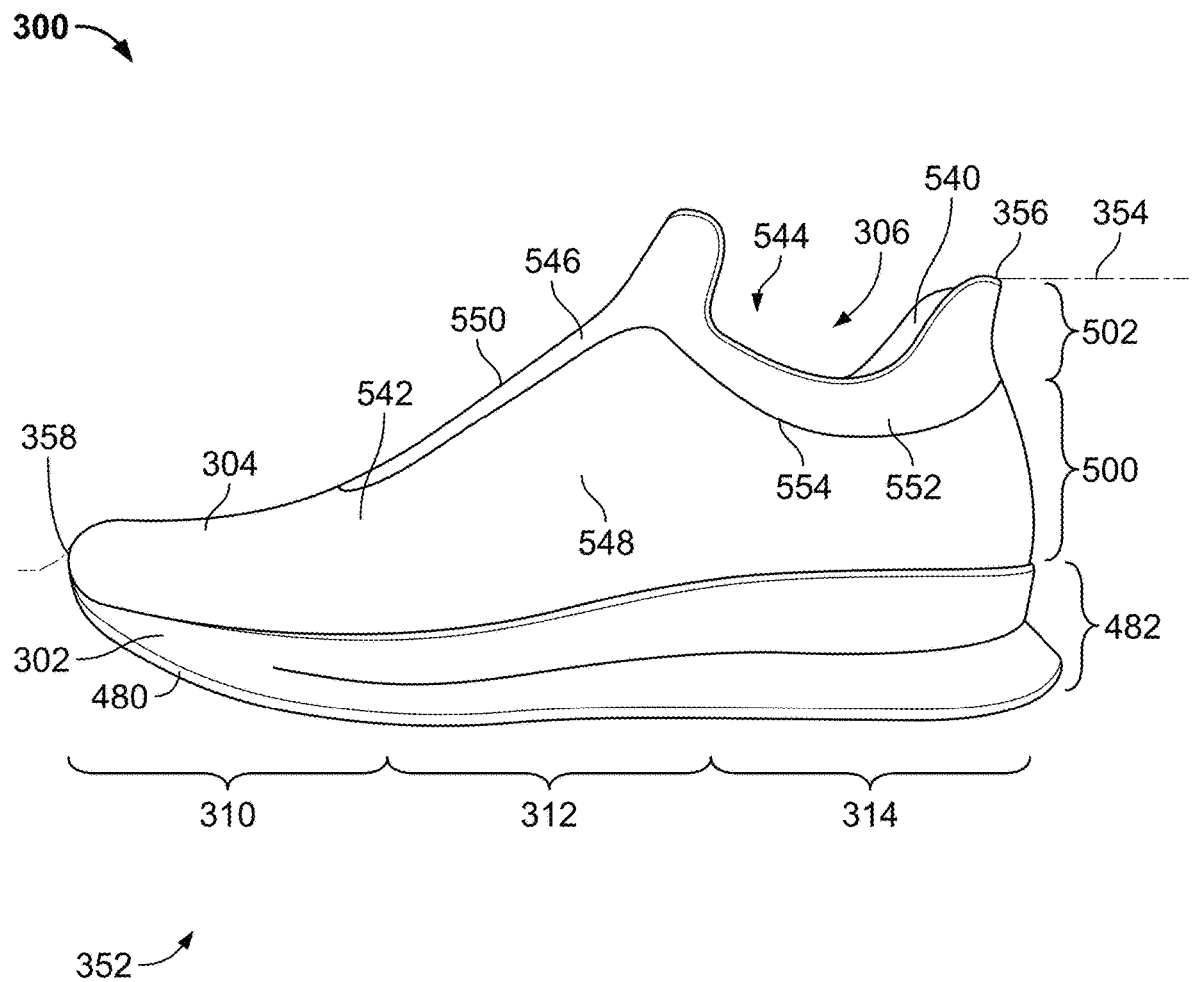

FIGS. 6-8 depict an exemplary embodiment of an article of footwear 300 that may include the composite material 100, or individual components thereof. In this embodiment, the article of footwear 300 includes a sole structure 302 and an upper 304, which may be attached to the sole structure 302 and together may define an interior cavity 306 into which a foot may be inserted.

Figures 8A, 8B:
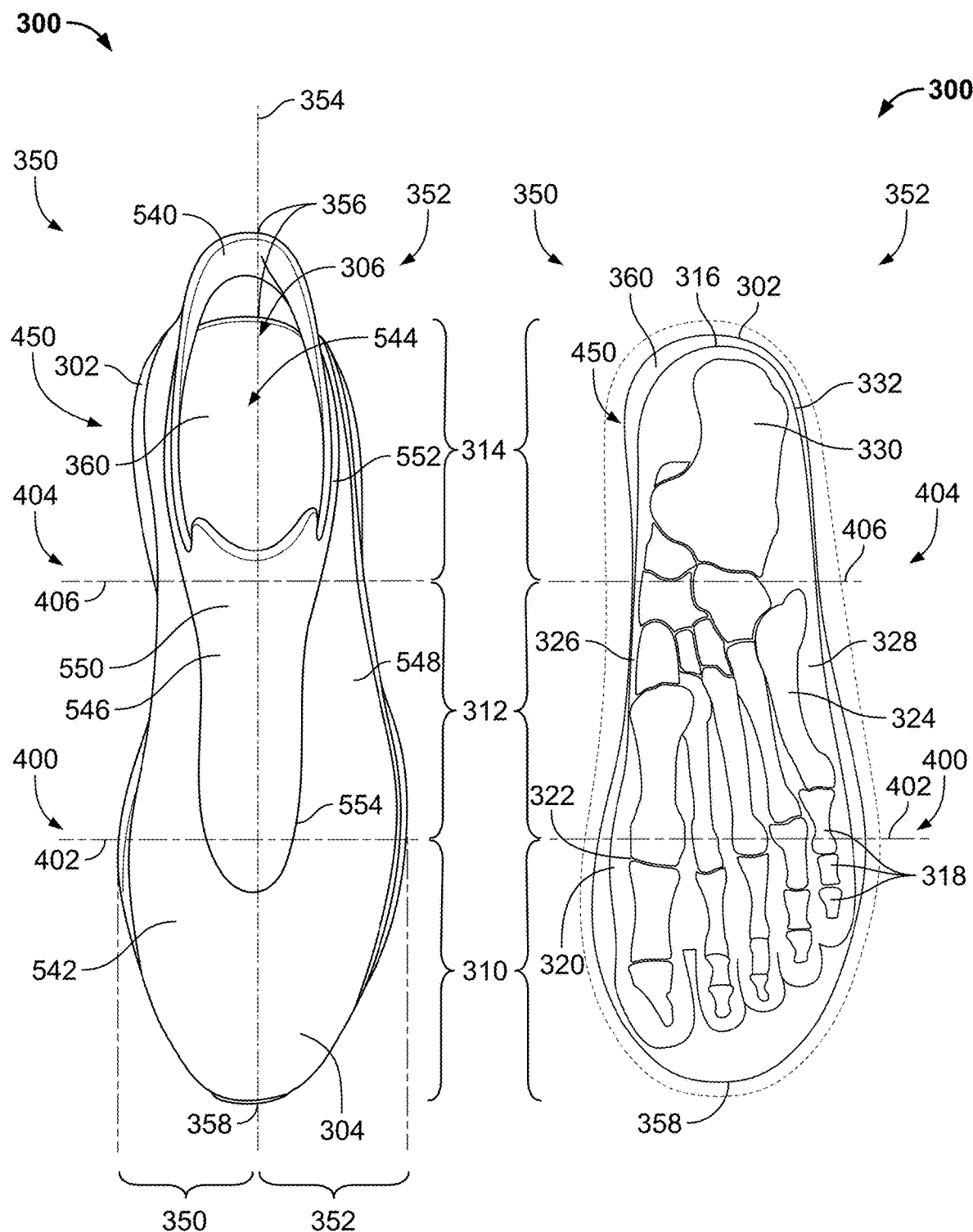

In order to provide points of reference and specifically referring to FIG. 8A, the article of footwear 300 may be defined by a forefoot region 310, a midfoot region 312, and a heel region 314 (see FIGS. 7, 8A, and 8B). Referring to FIGS. 8A and 8B, the forefoot region 310 may generally correspond with portions of the article of footwear 300 that encase portions of a foot 316 that include the toes or phalanges 318, the ball of the foot 320, and joints 322 that connect the metatarsals 324 of the foot 316 with the toes or phalanges 318. The midfoot region 312 is proximate to the forefoot region 310 and adjoins the forefoot region 310. The midfoot region 312 generally corresponds with portions of the article of footwear 300 that encase the arch of a foot 316, along with the bridge 328 of the foot 316. The heel region 314 is proximate to the midfoot region 312 and adjoins the midfoot region 312. The heel region 314 generally corresponds with portions of the article of footwear 300 that encase rear portions of the foot 316, including the heel or calcaneus bone 330, the ankle 332, and/or the Achilles tendon (not shown).

Referring back to FIGS. 6-8, the article of footwear 300 also includes a medial side 350 and a lateral side 352. In particular, the lateral side 352 corresponds to an outside portion of the article of footwear 300 and the medial side 350 corresponds to an inside portion of the article of footwear 300. As such, a left article of footwear and a right article of footwear have opposing lateral and medial sides, such that the medial sides 350 are closest to one another when a user is wearing the articles of footwear 300, while the lateral sides 352 are defined as the sides that are farthest from one another while being worn. As will be discussed in greater detail below, the medial side 350 and the lateral side 352 adjoin one another along a longitudinal central plane or axis 354 of the article of footwear 300. As will be further discussed herein, the longitudinal central plane or axis 354 may demarcate a central intermediate axis between the medial side 350 and the lateral side 352 of the article of footwear 300. Put differently, the longitudinal plane or axis 354 may extend between a rear, distal end 356 of the article of footwear 300 and a front, distal end 358 of the article of footwear 300 and may continuously define a middle of an insole 360, the sole structure 302, and/or the upper 304 of the article of footwear 300, i.e., the longitudinal plane or axis 354 is a straight axis extending through the rear, distal end 356 of the heel region 314 and to the front, distal end 358 of the forefoot region 310.

Certain aspects of the disclosure may refer to portions or elements that are coextensive with one or more of the forefoot region 310, the midfoot region 312, the heel region 314, the medial side 350, and/or the lateral side 352. Further, both the upper 304 and the sole structure 302 may be characterized as having portions within the forefoot region 310, the midfoot region 312, the heel region 314, and on the medial side 350 and the lateral side 352. Therefore, the upper 304 and the sole structure 302, and/or individual portions of the upper 304 and the sole structure 302, may include portions thereof that are disposed within the forefoot region 310, the midfoot region 312, the heel region 314, and on the medial side 350 and the lateral side 352.

Unless otherwise specified herein, and specifically referring to the top plan view of FIGS. 8A and 8B, the forefoot region 310, the midfoot region 312, the heel region 314, the medial side 350, and the lateral side 352 are intended to define boundaries or areas of the article of footwear 300. To that end, although the forefoot region 310, midfoot region 312, heel region 314, medial side 350, and lateral side 352 have been generally defined above, it should be understood that the forefoot region 310, the midfoot region 312, the heel region 310, the medial side 350, and the lateral side 352 may also be characterized as exact sections of the article of footwear 300, in particular embodiments. As such, particular reference to the forefoot region 310, the midfoot region 312, the heel region 314, the medial side 350, and/or the lateral side 352 may be defined in both general terms to provide reference to particular portions of the article of footwear and exact terms to provide discrete boundaries across an article of footwear, such as the article of footwear 300.

For example, it should be understood that numerous modifications may be apparent to those skilled in the art in view of the foregoing description and the composite material 100, and individual components thereof, may be incorporated into numerous articles of footwear. Accordingly, aspects of the article of footwear 300 and components thereof (e.g., the composite material 100 incorporated therein), may be described with reference to general areas or portions of the article of footwear 300, with an understanding the boundaries of the forefoot region 310, the midfoot region 312, the heel region 314, the medial side 350, and/or the lateral side 352 as described herein may vary between articles of footwear.

However, aspects of the article of footwear 300 and individual components thereof, may also be described with reference to exact areas or portions of the article of footwear 300 and the scope of the appended claims herein may incorporate the limitations associated with these boundaries of the forefoot region 310, the midfoot region 312, the heel region 314, the medial side 350, and/or the lateral side 352 discussed herein.

In light of the above, and with continued reference to the top plan view of FIGS. 8A and 8B, the forefoot region 310, the midfoot region 312, the heel region 314, the medial side 350, and the lateral side 352 are shown in greater detail. The forefoot region 310 extends from a toe end or front distal end 358 to a widest portion 400 of a forefoot region 310 of the article of footwear 300. In particular aspects, the forefoot region 310 may extend from a toe end or front distal end 358 to a widest portion of an insole 360, a sole structure 302, and/or an upper 304 of the article of footwear 300. The widest portion 400 may be defined or measured along a line 402 that is perpendicular with respect to the longitudinal, central axis 354 that extends from a front distal end 358 of the forefoot region 310 to a rear distal end 356 of the heel region 314 of the article of footwear 300, which is opposite the front distal end 358 of the forefoot region 310. The widest portion 400 of the article of footwear 300 may also be generally defined by the portion of the article of footwear 300 that encases the portion of the foot 316 at which point a proximal phalanx, or proximal phalange 318, connects to the metatarsal 324 of the foot 316.

The midfoot region 312 extends from the widest portion 400 to a thinnest portion 404 of the article of footwear 300. The thinnest portion 404 of the article of footwear 300 is defined as the thinnest portion of the insole 360, the sole structure 302, and/or the upper 304 of the article of footwear 300, measured across a line 406 that is perpendicular with respect to the longitudinal, central axis 354. The heel region 314 of the article of footwear 300 extends from the thinnest portion 404 of the insole 360, the sole structure 302, and/or the upper 304 of the article of footwear 300 and to the rear distal end 356 of the article of footwear 300.

Still referring to FIGS. 8A and 8B, the medial side 350 begins at the rear distal end 356 and bows outward along an inner side of the article of footwear 300 along the heel region 314 toward the midfoot region 312. The medial side 350 reaches a widest heel portion 450 at which point the medial side 350 bows inward, toward the central, longitudinal axis 354. The medial side 350 extends from the widest heel portion 450 and toward the thinnest portion 404, at which point the medial side 350 enters into the midfoot region 312 (i.e., upon crossing the line 406). From the thinnest portion 404, the medial side 350 bows outward, away from the longitudinal, central axis 354 and toward the widest portion 400, at which point the medial side 350 extends into the forefoot region 310 (i.e., upon crossing the line 402). Once at the widest portion 400, the medial side 350 bows inward toward the front distal end 358, and terminates at a point where the medial side 350 meets the longitudinal, center axis 354.

Continuing to refer to FIGS. 8A and 8B, the lateral side 352 also begins at the rear distal end 356 of the heel region 314 and bows outward along an outer side of the article of footwear 300 along the heel region 314 toward the midfoot region 312. The lateral side 352 reaches the widest heel portion 450, at which point the lateral side 352 bows inward, toward the longitudinal, central axis 354. The lateral side 352 extends from the widest heel portion 450 and toward the thinnest portion 404, at which point the lateral side 352 enters into the midfoot region 312 (i.e., upon crossing the line 406). From the thinnest portion 404, the lateral side 352 bows outward, away from the longitudinal, central axis 354 toward the widest portion 400, at which point the lateral side 352 extends into the forefoot region 310 (i.e., upon crossing the line 402). Once at the widest portion 400, the lateral side 352 bows inward toward the front distal end 358, and terminates at a point where the lateral side 352 meets the longitudinal, center axis 354.

Referring back to FIGS. 6-8, the sole structure 302 is connected or secured to the upper 304 and extends between a foot of a user and the ground when the article of footwear 300 is worn by the user. The sole structure 302 may also include one or more components, which may include an outsole, a midsole, a heel, a vamp, and/or an insole. For example, in some embodiments, a sole structure may include an outsole that provides structural integrity to the sole structure, along with providing traction for a user, a midsole that provides a cushioning system, and an insole that provides support for an arch of a user.

Figure 10:
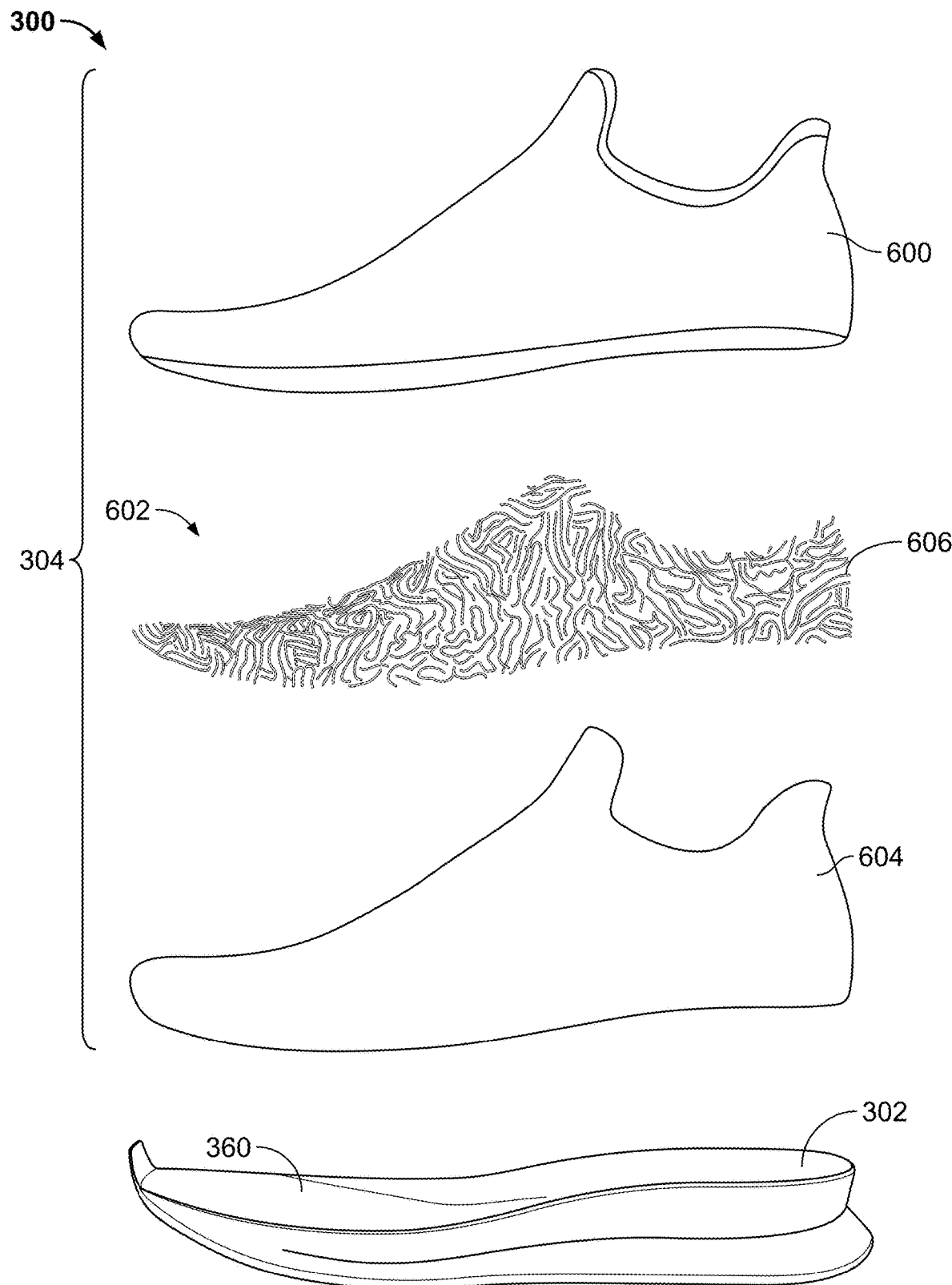

Still referencing FIGS. 6-8 and 10, the sole structure 302 of the present embodiment may be characterized by an outsole region 480, a midsole region 482, and an insole or insole region 360 (see FIG. 8A and FIG. 10). The outsole region 480, the midsole region 482, and the insole region 360, and/or any components thereof, may include portions within the forefoot region 310, the midfoot region 312, and/or the heel region 314. Further, the outsole region 480, the midsole region 482, and the insole region 360, and/or any components thereof, may include portions on the lateral side 352 and/or the medial side 350. The outsole region 480, the midsole region 482, and the insole region 360 are not intended to define precise or exact areas of the sole structure 302. Rather, the outsole region 380, the midsole region 482, and the insole region 360 are generally defined herein to aid in discussion of the sole structure 302 and components thereof.

In other instances, the outsole region 480 may be defined as a portion of the sole structure 302 that at least partially contacts an exterior surface (e.g., the ground), when the article of footwear 300 is worn, the insole region 360 may be defined as a portion of the sole structure 302 that at least partially contacts a user's foot when the article of footwear is worn, and the midsole region 482 may be defined as at least a portion of the sole structure 302 that extends between and connects the outsole region 380 with the insole region 360.

The upper 304, as shown in FIGS. 6-8, extends upwardly from the sole structure 302 and defines the interior cavity 306 that receives and secures a foot of a user. The upper 304 may be defined by a foot region 500 and an ankle region 502, as shown in FIGS. 6 and 7. In general, the foot region 500 extends upwardly from the sole structure 302 and through the forefoot region 310, the midfoot region 312, and the heel region 314. The ankle region 502 is primarily located in the heel region 516; however, in some embodiments, the ankle region 502 may partially extend into the midfoot region 514.

Figure 9:
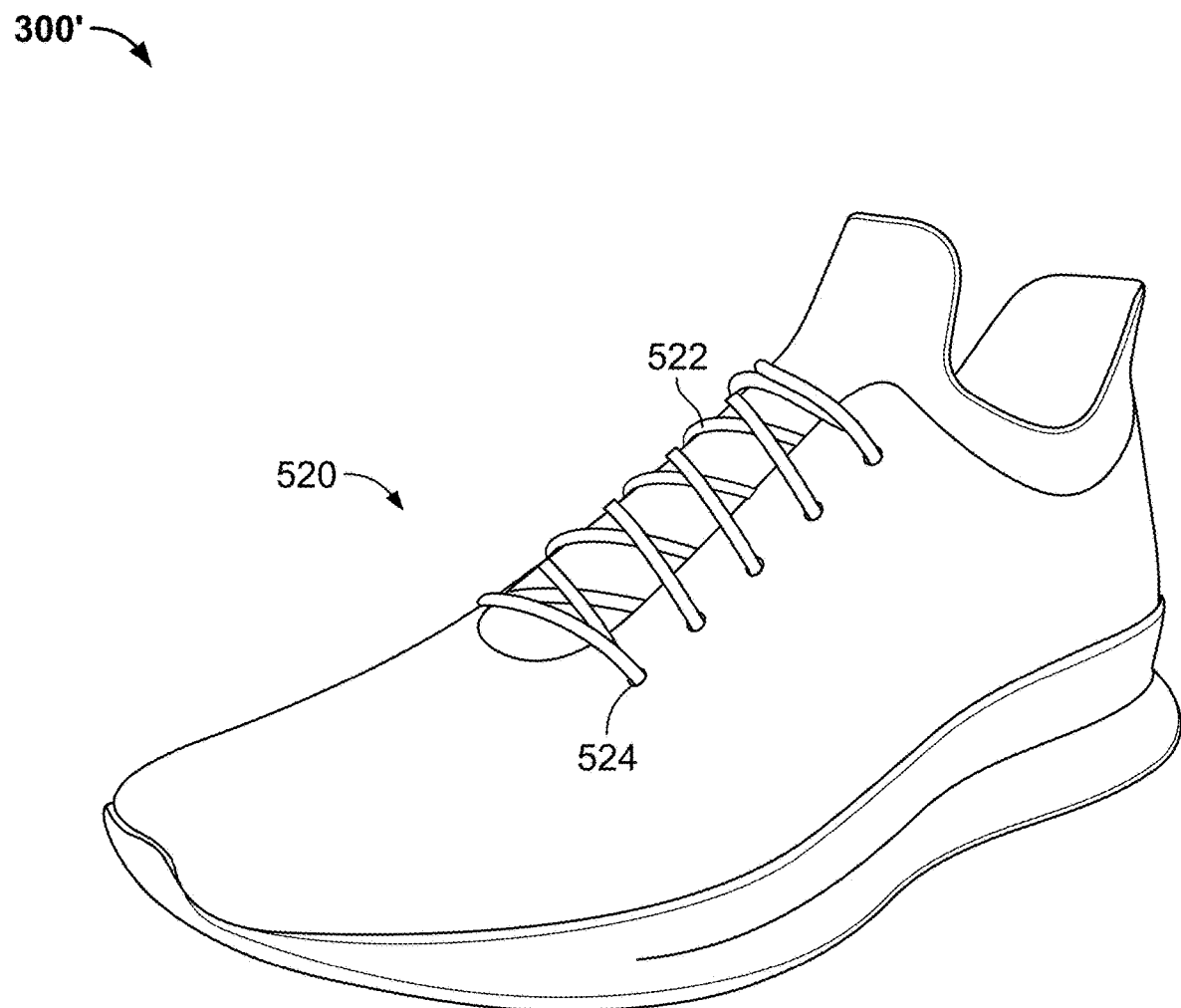

The article of footwear 300 may also have a tightening system 520 (see FIG. 9, for example, which depicts another aspect of the article of footwear) that includes a lace 522, a plurality of apertures 524, and a plurality of bands or lacing straps (not shown). For example, lacing straps may extend from the apertures 524 and the lace 522 may extend through loops or eyelets of the lacing straps. Further, in some embodiments, the lacing straps may be elastic bands. The tightening system 520 may allow a user to modify dimensions of the upper 304, e.g., to tighten or loosen portions of the upper 304, around a foot as desired by the wearer. The tightening system 520 may also include a band (not shown) that runs along a center of the upper 304 and includes one or more loops through which the lace 522 may be guided. In other embodiments, the tightening system 520 may be a hook-and-loop fastening system, such as Velcro®. For example, in some embodiments, the tightening system 520 may include one or more hook-and-loop fastening straps. In further embodiments, the tightening system 520 may be another laceless fastening system known in the art.

With continued reference to FIGS. 6-8, the upper 304 may extend along the lateral side 352 and the medial side 350, and may extend across the forefoot region 310, the midfoot region 312, and the heel region 314 to house, enclose, or encase a foot of a user. The upper 304 may also include an apex, which in some embodiments, is the longitudinal, central axis 354 that defines the boundary between the lateral side 352 and the medial side 352 of the upper 304. In instances where the longitudinal, central axis 354 defines the apex of the upper 304, the lateral side 352 of the upper 304 may be the outside portion of the upper 304 that extends from the apex and the medial side 350 of the upper may be the inside portion of the upper 304 that extends from the apex.

In this particular embodiment, the upper 304 also includes an interior surface 540 and an exterior surface 542. The interior surface 540 faces inward and generally defines the interior space 306, and the exterior surface 542 of the upper 304 faces outward and generally defines an outer perimeter of the upper 304. The upper 304 also includes an opening 544 that is at least partially located in the heel region 314 of the article of footwear 300, that provides access to the interior space 306 and through which a foot may be inserted and removed. In some embodiments, the upper 304 may also include an instep area 546 that extends from the opening 544 in the heel region 314 over an area corresponding to an instep of a foot to an area adjacent the forefoot region 310.

In the embodiment shown in FIG. 7, the upper 304 comprises an outer layer 548, an instep layer 550, and a collar layer 552. More particularly, the outer layer 548 extends upwardly from the sole structure 302 along the forefoot region 310, the midfoot region 312, and the heel region 314 to a boundary 554. In this embodiment, the boundary 554 defines a transition point, at which point, the upper 304 transitions from the outer layer 548 to the instep layer 550 and/or the upper 504 transitions from the outer layer 548 to the collar layer 552. More particularly, the boundary 554 defines a portion of the upper 304 where the instep layer 550 begins to extend upward from the outer layer 548, or defines a portion of the upper 304 where the collar layer 552 begins to extend upward from the outer layer 548. In some embodiments, the instep layer 550 and the collar layer 552 may be both generally referred to as a second layer 550, 552.

The boundary 554 may extend around a periphery of the upper 304; through each of the forefoot region 310, the midfoot region 312, and the heel region 314; and/or across the medial side 350 and the lateral side 352 of the article of footwear 300. Therefore, portions of the instep layer 550 may be within the forefoot region 310, the midfoot region 312, and the heel region 314, and along the medial side 350 and/or the lateral side 352. Further, portions of the collar layer 552 may be within the heel region 314 and/or partially within the midfoot region 312.

In the particular embodiment shown in FIGS. 6-8 and 10, the instep layer 550 extends from the forefoot region 310 and through the midfoot region 312, and the collar layer 552 is located in the ankle region of the heel region 314. In other embodiments, the instep layer 550 may extend partially or fully into and through the forefoot region 310, and/or partially or fully into and through the heel region 314. Further, in some embodiments, the collar layer 552 may extend at least partially into the midfoot region 312.

As discussed hereinafter, in some embodiments, the boundary 554 may define a portion of the upper 304 where the properties associated with the instep layer 550 and/or the collar layer 552, e.g., a stitch type, a yarn type, or characteristics associated with different stitch types or yarn types, such as elasticity, aesthetic appearance, thickness, air permeability, or scuff-resistance, may be varied from the outer layer 548 or other portions of the upper 304. For example, the upper 304, and the individual components thereof (e.g., the outer layer 548, the instep layer 550, and the collar layer 552) may be individually formed using a variety of elements, textiles, polymers (including foam polymers and polymer sheets), leather, synthetic leather, etc. Further, the upper 304, and the individual components thereof, may be joined together through bonding, stitching, or by a seam to create the upper 304.

In one aspect, as will be further discussed herein, the upper 304 of the article of footwear 300 may be formed from one or more knitted structures or knitted components. In such aspects, the knitted components may include various types of yarn, or other textile material, that may provide a variety of different properties to the upper 304. For example, one area of the upper 304 may be formed or constructed from a first type of yarn or material that imparts or instills a first set of properties, and another area of the upper 304 may be formed from a second type of yarn or material that imparts or instills a second set of properties. As such, particular portions of the upper 304 may include a variety of distinct properties. As an example, in one embodiment, the outer layer 548 may include the composite material 100 and, thereby, may include a biologically active agent and a material that degrades or biodegrades; however, the instep layer 550 and/or the collar layer 552 may include a material that does not degrade or biodegrade when exposed to the biologically active agent.

In the particular embodiment shown in FIGS. 6-8, the outer layer 548 is a uniform structure that continuously circumscribes an entire upper perimeter of the sole structure 302. However, in other embodiments, the outer layer 548 may include a plurality of sections, such as a forefoot outer layer, a midfoot outer layer, and/or a heel outer layer that may be connected to form the outer layer 548. For example, in these embodiments, the forefoot outer layer, the midfoot outer layer, and the heel outer layer may be connected by one or more seams to form the outer layer 548.

As illustrated in FIG. 10, the upper 304 may also include a plurality of layers, including a top layer 600, an intermediate layer 602, and a base layer 604. In the present embodiment, an inner surface (not shown) of the base layer 604 is the interior surface 540 that defines the interior space 306, and the intermediate layer 602 is positioned on the base layer 604 and between the top layer 600 and the base layer 604. The base layer 604 may extend from the sole structure 302 on both the lateral side 352 and the medial side 350, and/or across the instep region 546. In particular aspects, the base layer 602 may extend upwardly from the sole structure 302 along the forefoot region 310, the midfoot region 312, and/or the heel region 314, and across the instep region 546 and/or into an ankle region 502.

In another aspect, as discussed herein, the base layer 604 may extend upwardly from the sole structure 302 along the forefoot region 310, the midfoot region 312, and the heel region 314 to a boundary 554. In this embodiment, the boundary 554 defines a transition point, at which point, a material of the base layer 604 transitions. For example, the boundary 554 may define a transition point, at which point, the material of the upper 304 transitions from a material that degrades or biodegrades to a material that does not degrade or biodegrade. The boundary 554 may extend around a periphery of the upper 304; through each of the forefoot region 310, the midfoot region 312, and the heel region 314; and/or across the medial side 350 and the lateral side 352 of the article of footwear 300. Therefore, portions of the instep layer 550 and/or the collar layer 552, which comprise at least a first material (e.g., a material that does not degrade or undergo biodegradation when exposed to a biologically active agent), may be within the forefoot region 310, the midfoot region 312, and the heel region 314, and along the medial side 350 and/or the lateral side 352.

The material used to construct the base layer 604 may be selected based on the particular properties desired therefor. Further, as will be discussed further herein, a material used to construct the base layer 604 may be a material similar to the substrate 106 of the composite material 100 and may provide a base to which a biodegradable portion or material, such as the biodegradable portion 108, may be applied.

In particular embodiments, the base layer 604 is constructed from a non-biodegradable material or fabric, a material incapable of being decomposed by a bacteria or other living organism, or a material that does not breakdown organically when exposed to a microorganism, such as a bacteria, fungi, or other biologically active agent previously discussed herein. In particular aspects, the base layer 604 may include a non-biodegradable breathable fabric substrate, such as a polyester; a woven, knitted, braided, or non-woven polyester textile; or a polyester mesh material (such as Tulle) that provides a hydrophobic, durable material for the upper 304. In other embodiments, the base layer 604 may include an elastane and/or stretch polyester that may provide the base layer 604, and the upper 304, with a desired degree of elasticity and recovery. In further embodiments, the base layer 604 may include a nylon-based textile material that provides the upper 304 with a durable material that is abrasion-resistant. In even further embodiments, the base layer 604 may include a cotton-based textile to provide a soft fabric or a natural aesthetic to the base layer 604. The base layer 604 may also include a polyurethane or a polyurethane leather, a rubber, an open cell foam, a closed cell foam, polyethylene, and/or combinations thereof.

In some aspects, as discussed herein, the base layer 604 may be selected based on the particular microorganism or biologically active microorganism incorporated into the article of footwear 300. For example, in instances where the article of footwear 300 incorporates a microorganism selected from a group consisting of *Pseudomonas fluorescens* B-22, *P. putida* AJ, *P. chlororaphis; Ochrobactrum* TD, and/or *Aspergillus niger*, the base layer 604 may comprise a material other than polyvinyl chloride, which degrades or biodegrades when exposed to *Pseudomonas fluorescens* B-22, *P. putida* AJ, *P. chlororaphis; Ochrobactrum* TD, and/or *Aspergillus niger* (see Table 1 herein).

Still referencing FIG. 10, the intermediate layer 602 is disposed between the base layer 604 and the top layer 600. More particularly, the intermediate layer 602 is received by (or conforms to) the base layer 604 and extends from the insole region 360 of the sole structure 302, on the lateral side 352 and the medial side 350 of the article of footwear 300, to the instep layer 550, where it ceases along the boundary 554. More particularly, the intermediate layer 602 may extend upwardly from the sole structure 302 along the forefoot region 310, the midfoot region 312, and the heel region 314 to a boundary 554. In this embodiment, the boundary 554 defines a transition point, at which point, the intermediate layer 602 ceases.

In certain aspects, the intermediate layer 602 may be strategically located along discrete portions of the upper 304. For example, the intermediate layer 602 may, individually, include discrete portions thereof on the forefoot portion 310, the midfoot portion 312, and/or the heel portion 314 along the medial side 350 and/or lateral side 352. Further, as will be further discussed herein, the intermediate layer 602 may be initially hidden, obstructed, or covered by the top layer 600, but visual, unobstructed, or partially or fully uncovered when the top layer 600 degrades or biodegrades. Therefore, once the top layer 600 either partially or fully degrades or biodegrades, the pattern (an ornamental or visually pleasing pattern, an image, a geometric shape, a trademark, a brand mark, a bar code, a QR code, a pattern that provides apertures for optimal or desired airflow through the article of footwear 300, a pattern that provides a visual indication as to a condition of the article of footwear 300, and/or combinations thereof) of the intermediate layer 602 may be visible.

For example, as shown in FIG. 10, the intermediate layer 602 may be provided as a pattern and, more particularly, as a pattern of small patches 606. The intermediate layer 602 may also include the biodegradable material 108 (not shown) and the small patches 606 may comprise the biodegradable material 108, for example. As previously noted above, the biodegradable material 108 may be applied to, bonded to, positioned within, or positioned on a substrate in a way that is ornamental or visually pleasing (such as a pattern, an image, a geometric shape, etc.). Alternatively, as shown in FIG. 13B, an intermediate layer 602 may be a uniform layer with the biodegradable material coated therein or therein, as will be further discussed herein.

In other embodiments, such as that shown in FIG. 10 herein, the intermediate layer 602 may be constructed from a non-biodegradable material or fabric, a material incapable of being decomposed by a bacteria or other living organism, or a material that does not breakdown organically when exposed to a microorganism, such as a bacteria, fungi, or other biologically active agent previously discussed herein. In these particular embodiments, the intermediate layer 602 may include a non-biodegradable breathable fabric substrate, such as a polyester or polyester textile that provides a hydrophobic, durable material for the upper 304, an elastane and/or stretch polyester that provides a desired degree of elasticity and recovery, a nylon-based textile material that provides a durable material that is abrasion-resistant, a cotton-based textile to provide a soft fabric or a natural aesthetic, a polyurethane or a polyurethane leather, a rubber, an open cell foam, a closed cell foam, polyethylene, and/or combinations thereof. Further, in these particular embodiments, the intermediate layer 602 may still be provided as a pattern, such as that shown in FIG. 10, or as a uniform layer, such as that shown in FIG. 11, which will be further discussed herein.

The top layer 600 may be positioned over the intermediate layer 602 and the base layer 604, and may extend from the sole structure 302 on both the lateral side 352 and the medial side 350, and/or across the instep region 546. In particular aspects, the top layer 600 fully encases or surrounds the intermediate layer 602 and/or the base layer 604 of the article of footwear 300.

In particular embodiments, the top layer 600 may be constructed from a material similar to the composite material 100 and, as such, the top layer 600 may include a substrate 106, a biodegradable material 108 that includes at least one biologically active agent, and/or a material layer 104. In some embodiments, the microorganism may be incorporated into the top layer 600 as a biofilm. In other embodiments, such as an embodiment wherein the intermediate layer 604 comprises the biodegradable material 108, the top layer 604 may only include the material layer 104.

In certain aspects, the biodegradable material 108, the biologically active agent, and/or the material layer 104 of the top layer 600 may be strategically located along discrete portions of the upper 304 and, more particularly, discrete portions of the top layer 600. For example, the top layer 600 may, individually, include discrete portions thereof on the forefoot portion 310, the midfoot portion 312, and/or the heel portion 314, and along the medial side 350 and/or the lateral side 352. Further, as previously discussed herein, the intermediate layer 602 may also include discrete portions that are initially hidden, obstructed, or covered by the top layer 600, but visual, unobstructed, or partially or fully uncovered when the top layer 600 degrades or biodegrades. As such, in some embodiments, the biodegradable material 108, the biologically active agent, and/or the material layer 104 of the top layer 600 may be strategically located along portions of the top layer 600 that overlay the discrete portions of the intermediate layer 602. As a result, these discrete portions of the top layer 600 may selectively degrade or biodegrade to expose the discrete portions of the intermediate layer 602, but other portions of top layer 600 may remain biologically, chemically, or structurally intact. In one aspect, a user may also desire an upper having discrete portions that are more flexible that other portions of the upper. In such an embodiment, discrete portions of the top layer 600 may selectively degrade or biodegrade to increase the flexibility or stretchability of a particular region of the upper.

Figure 11:
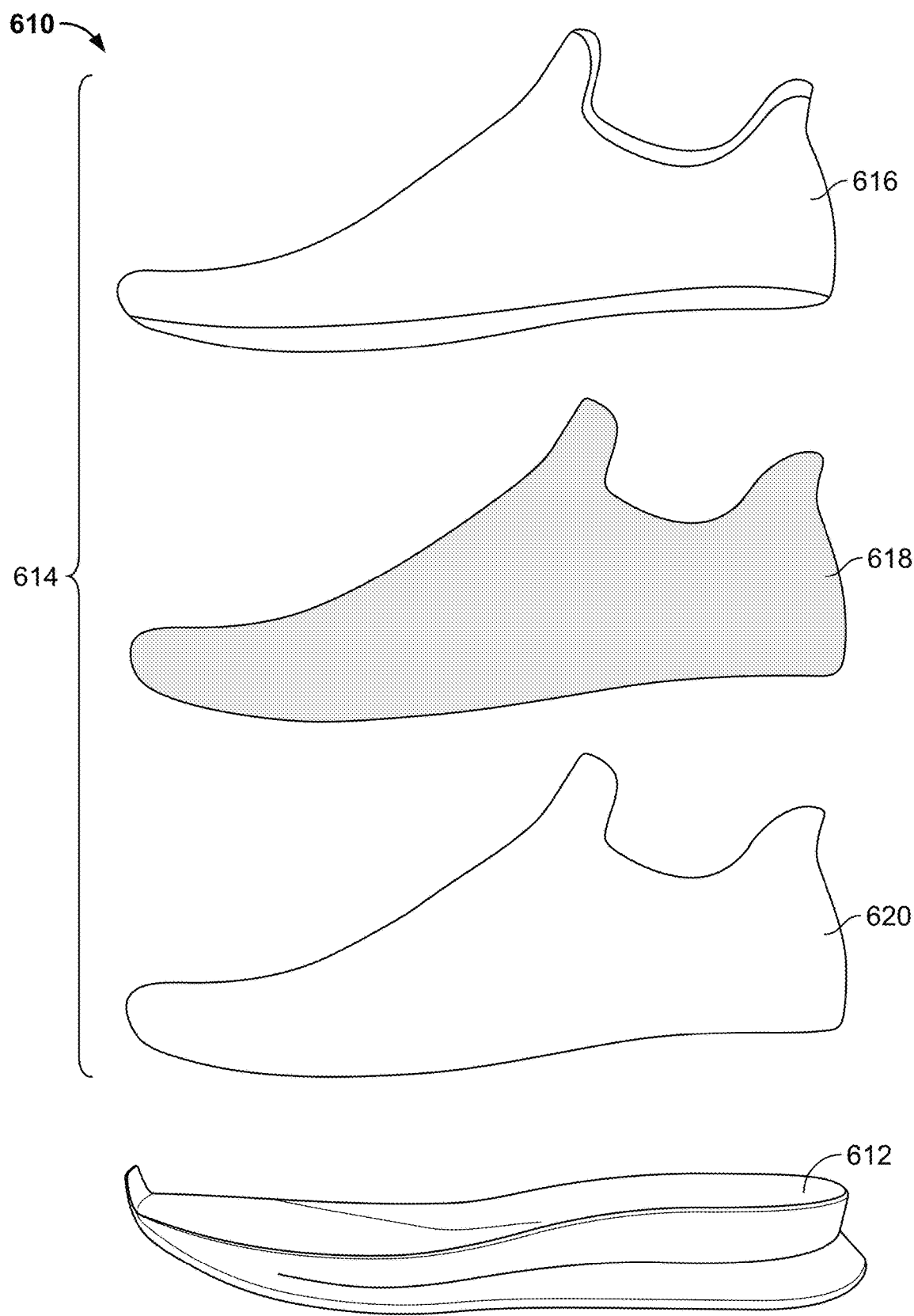

FIG. 11 depicts an article of footwear 610 having a sole structure 612 and an upper 614. Further, similar to the article of footwear 300, the upper 614 may include a plurality of layers, including a top layer 616, an intermediate layer 618, and a base layer 620. However, as noted above, the intermediate layer 618 is provided as a uniform layer and may be a layer that generally conforms to the top layer 616 and/or the base layer 620. Further, in particular embodiments, the intermediate layer 618 is a different material, a different color, a different texture, or otherwise different in appearance from the top layer 616. As such, in one particular example, the article of footwear 610 may change color or a shade of color once the top layer 616 degrades or biodegrades.

Figure 12:
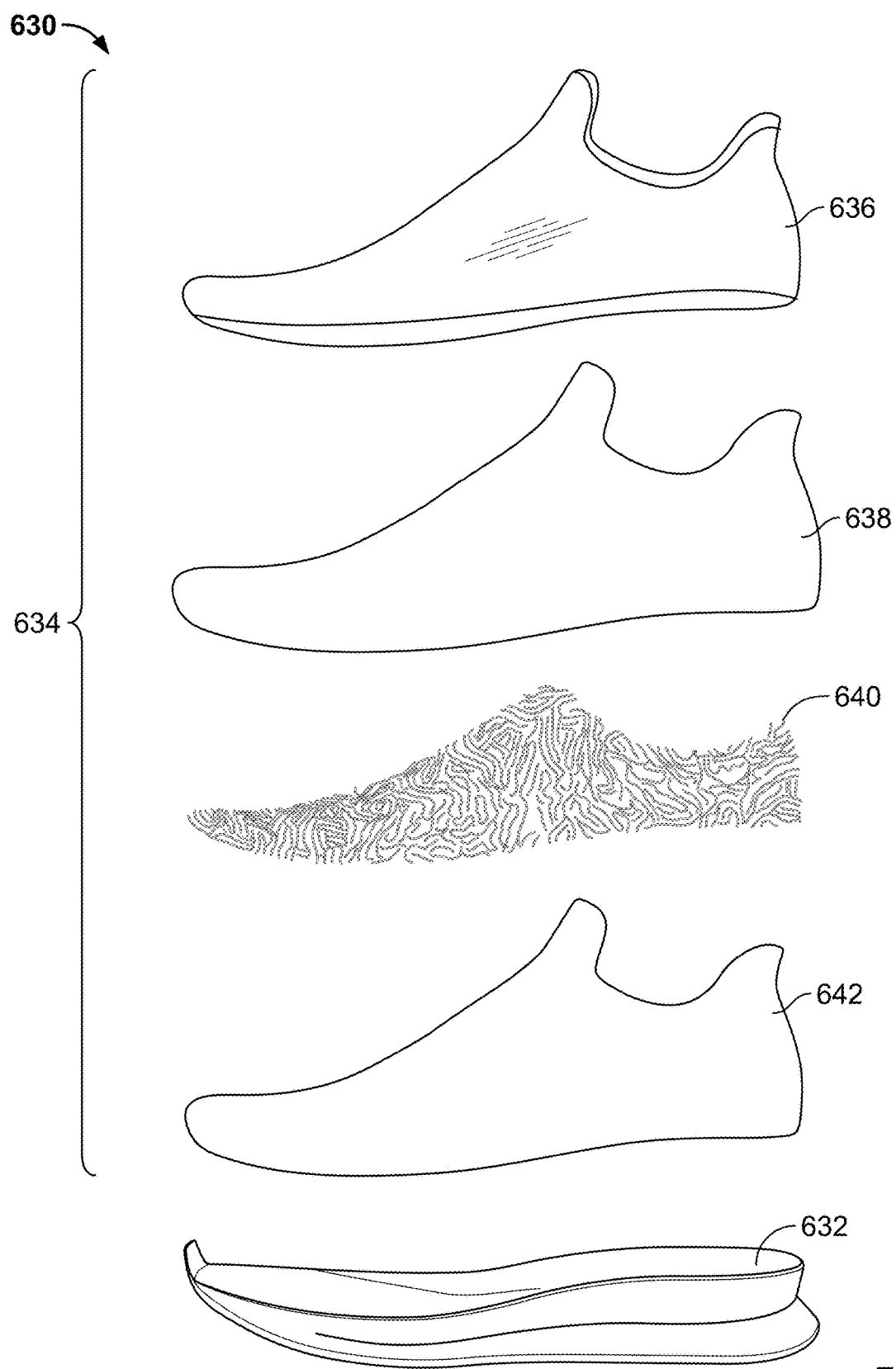

FIG. 12 depicts an article of footwear 630 having a sole structure 632 and an upper 634. Further, similar to the article of footwear 300, the upper 634 may include a plurality of layers, including a top layer 636, a first intermediate layer 638, a second intermediate layer 640, and a base layer 642. In this particular embodiment, the top layer 636 and the first intermediate layer 638 may each include a composite material 100, such that the article of footwear 630 undergoes multiple states of degradation or biodegradation and, as such, the article of footwear 630 transitions between at least a first initial state (i.e., a state without any portion of the article of footwear 630 being degraded), a second intermediate state (e.g. a state where the top layer 636 has degraded/biodegraded or partially degraded/biodegraded), and a third final state (e.g., a state where the top layer 636 and the first intermediate layer 638 have degraded/biodegraded or partially degraded/biodegraded).

Alternatively, with continued reference to FIG. 12, the first intermediate layer 638 may include a composite material 100 and the top layer 636 may be constructed from a material incapable of being degraded or biodegraded by a bacteria or other living microorganism previously discussed herein. For example, the top layer 636 of the present embodiment may be a protective outer layer that encases the degradable or biodegradable intermediate layer 638. In these embodiments, the top layer 636 may include a non-biodegradable breathable fabric substrate, such as a polyester or polyester textile or mesh material (such as Tulle) that provides a hydrophobic, durable material for the upper 634. In other embodiments, the top layer 636 may include an elastane and/or stretch polyester that may provide the top layer 636, and the upper 634, with a desired degree of elasticity and recovery. In further embodiments, the top layer 636 may include a nylon-based textile material that provides the upper 634 with a durable material that is abrasion-resistant. In even further embodiments, the top layer 636 may include a cotton-based textile to provide a soft fabric or a natural aesthetic to the top layer 636. The top layer 636 may also include a polyurethane or a polyurethane leather, a rubber, an open cell foam, a closed cell foam, a foam having a plurality of beads or particles, polyethylene, and/or combinations thereof. In further embodiments, as shown in FIG. 12, the top layer 636 may also be transparent, semi-transparent, or translucent. For example, the top layer 636 may be transparent such that degradation or biodegradation of the first intermediate layer 638 is visible and, as a result, the second intermediate layer 640 is visible after the first intermediate layer 638 degrades or biodegrades. In particular embodiments, as will be further discussed herein, portions of the first intermediate layer 638 may degrade or biodegrade to provide the article of footwear 630 with increased aeration or airflow. In such embodiments, the top layer 636 may be a non-biodegradable breathable fabric substrate, such as a polyester or polyester textile or mesh material, to ensure increased aeration is achieved. Optionally, in these embodiments, the article of footwear 630 may not include the second intermediate layer 640, but, rather, the article of footwear 630 simply includes the top layer 636, the first intermediate layer 636, and the base layer 642.

Using the configurations discussed herein, the top layers 600, 616, 636, 638 or the individual portions thereof (i.e., the substrate 106, the biodegradable material 108, and/or the material layer 104), may be configured to degrade or biodegrade after a predetermined amount of time or after coming into contact with a stimulus or stimuli that prompts or accelerates degradation or biodegradation. For example, in some aspects, the stimulus or stimuli used to prompt or accelerate degradation or biodegradation may include, but are not limited to, variations in temperature (such as increases or decreases in heat), sweat, light, UV light, a change in pressure, a change in humidity, a change in pH, exposure to a liquid (e.g., water, salt water, acidic solution, basic solution, alcohol, benzol, gasoline), exposure to a gas (e.g., $CO_2$, $NH_3$, $O_2$), or a solvent.

After degradation or biodegradation, a user may also wish to replace one or more of the top layers 600, 616, 636, 638. As such, in particular embodiments, the top layers 600, 616, 636, 638 may be replaceable components of the upper (e.g., a top layer 600 may be attached to the upper 304 after a top layer 600 has degraded) and may be manufactured separate from the upper of the article of footwear. As a result, if desired, a user may "restart" the degradation or biodegradation process.

Figure 13A:
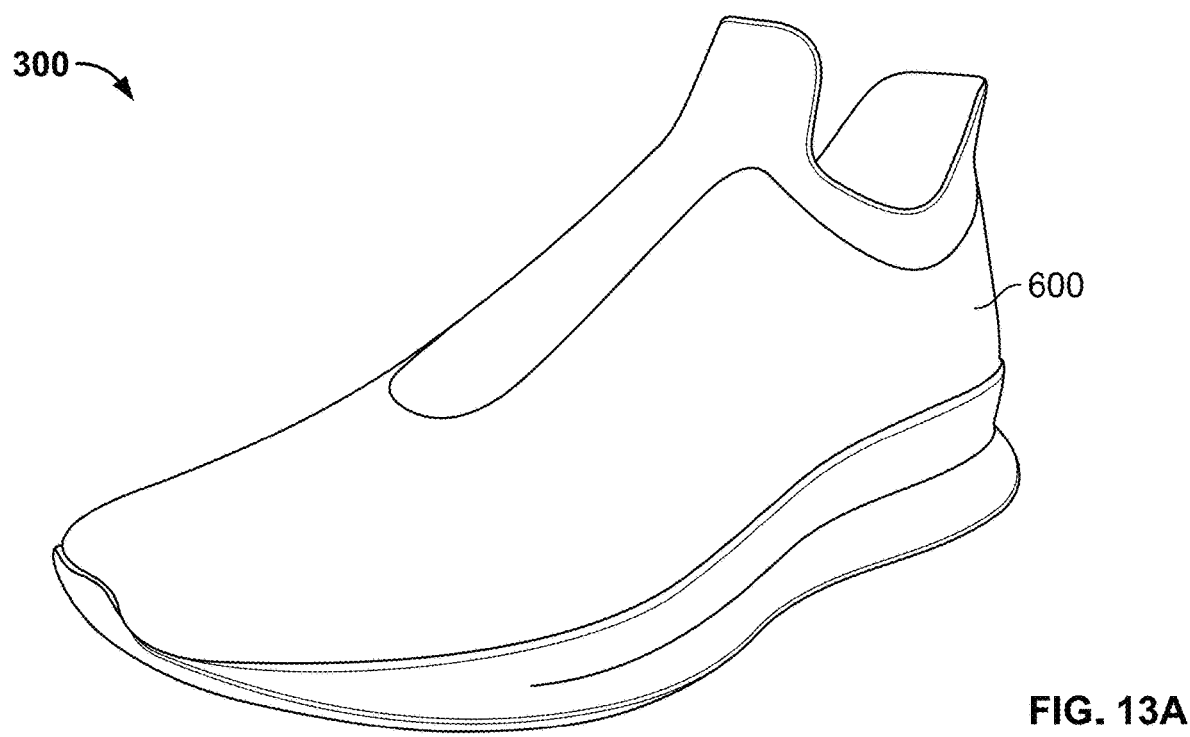
Figure 13B:
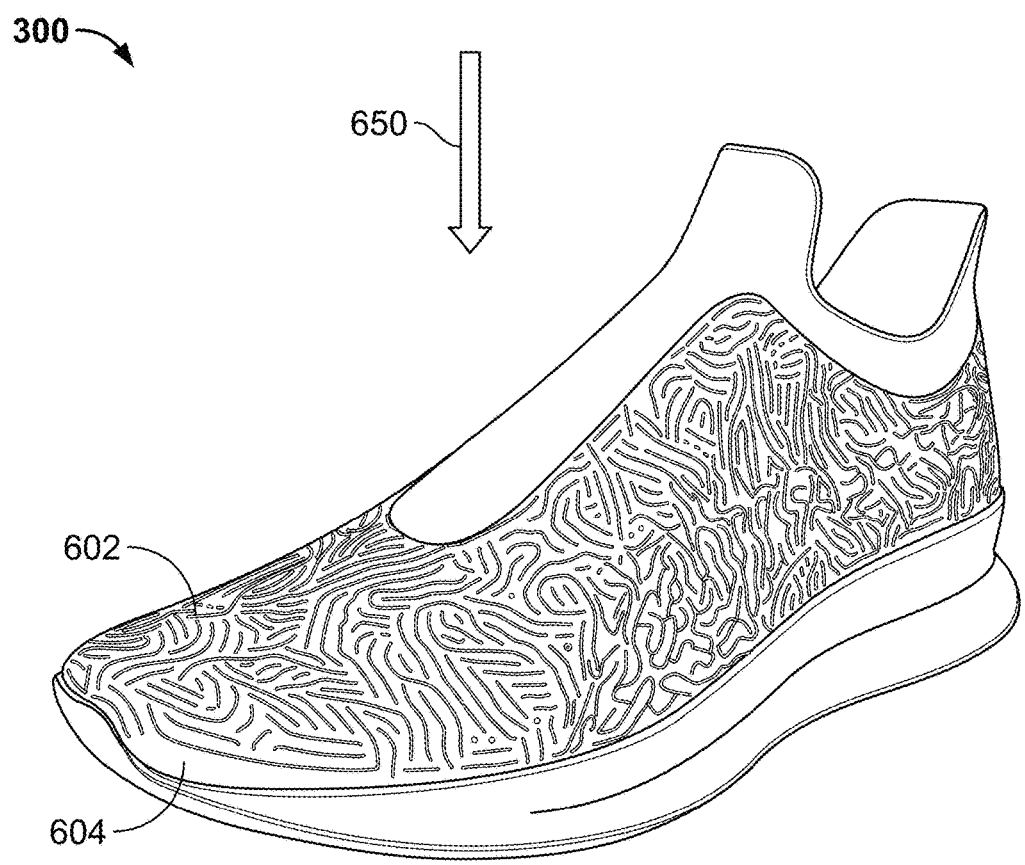

FIG. 13A illustrates a perspective view of the article of footwear 300 in an initial state, i.e., before a stimulus or stimuli is applied to the article of footwear 300. FIG. 13B illustrates a perspective view of the article of footwear 300 after the article of footwear 300 has been exposed to a stimulus or stimuli 650 and, because of such exposure, the top layer 600 has partially or fully degraded or biodegraded. As a result of the biodegradation (or partial biodegradation) of the top layer 600, the intermediate layer 602 and/or the base layer 604 may therefore be visible. Further, as previously discussed herein, the biodegradable material 108, the biologically active agent, and/or the material layer 104 of the top layer 600 may be strategically located along portions of the top layer 600 that overlay the discrete portions of the intermediate layer 602. For example, as shown in FIGS. 10, 13A, and 13B, the intermediate layer 602 may extend across the outer layer 548 of the base layer 642 of the article of footwear 300 and, as such, top layer 600 may only have the biodegradable material 108, the biologically active agent, and/or the material layer 104 around the outer layer 548 of the top layer 600. In such embodiments, the intermediate layer 602 may at least partially define a shape of the top layer 600 and/or a location of the biodegradable material 108, the biologically active agent, and/or the material layer 104 on the top layer 600.

Figure 14A:
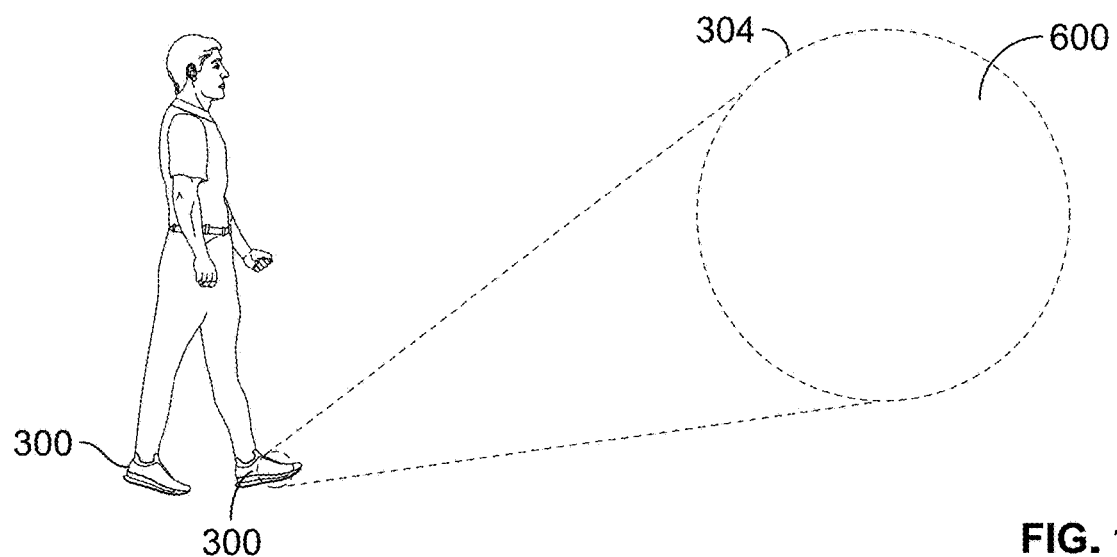
Figure 14B:
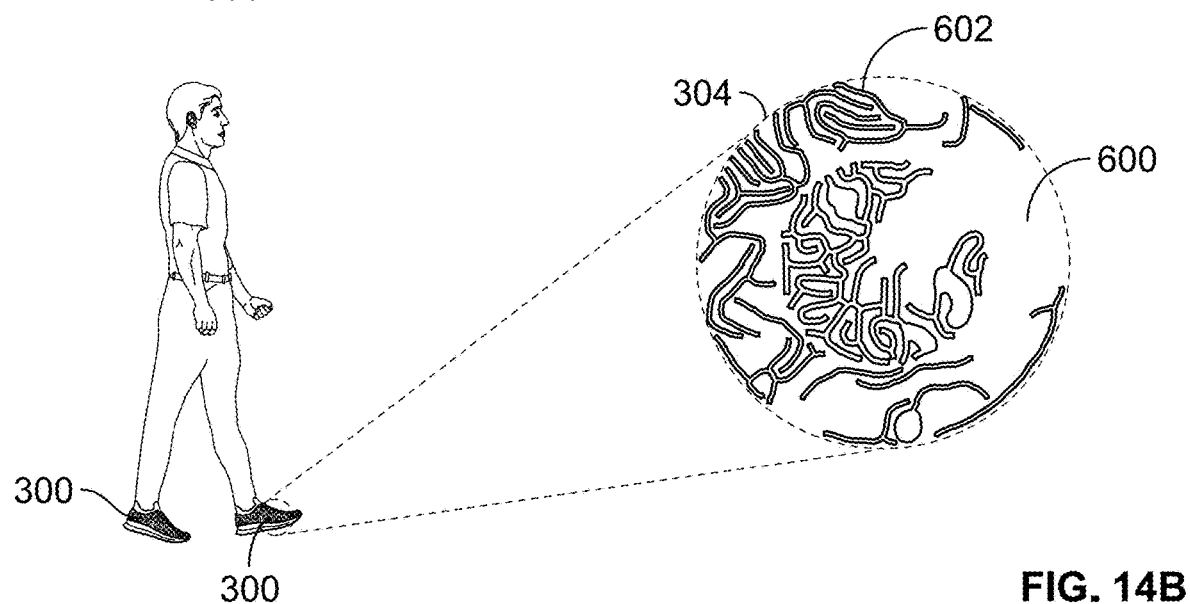
Figure 14C:
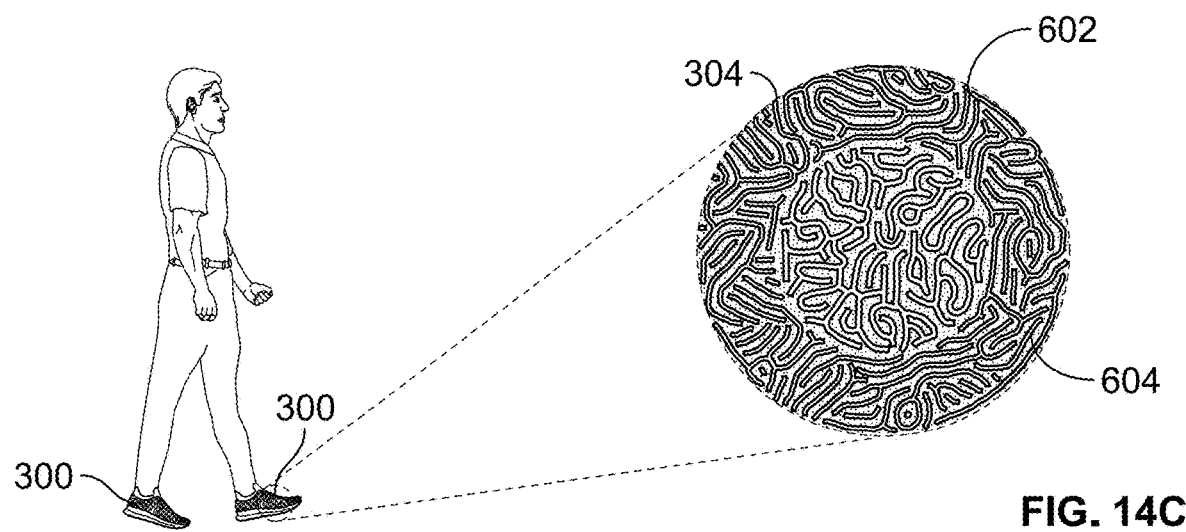

Referring to another example, FIGS. 14A-14C illustrates side views of a user wearing the article of footwear 300 during multiple states of degradation or biodegradation. FIG. 14A depicts the user and the article of footwear 300 at an initial state, FIG. 14B depicts the user and the article of footwear 300 at a first intermediate state of biodegradation, after the article of footwear 300 has been exposed to a stimulus or stimuli (e.g., sweat from the user, sunlight or UV light, the user's body heat, etc.), and FIG. 14C depicts the user and the article of footwear 300 at a second intermediate state of biodegradation, after the article of footwear has been further exposed to a stimulus or stimuli.

As previously discussed herein, in some embodiments, the biodegradable material 108 may be applied to, bonded to, positioned within, or positioned on the substrate 106 as a pattern and, in particular, a pattern of small patches. In a similar manner, such as that shown in FIG. 10, the intermediate layer 602 may be applied to, bonded to, positioned within, or positioned on the base layer 604 as a pattern and, in particular, a pattern of small patches. Further, as discussed herein, the intermediate layer 602 may be applied to, bonded to, positioned within, or positioned on the base layer 604 in a way that is ornamental or visually pleasing (such as a pattern, an image, a geometric shape, etc.), in a way that forms a particular shape (such as a trademark, brand mark, bar code, general geometric shape, etc.), or in a way that provides a particular function once degraded (such as a pattern that provides apertures for optimal or desired airflow through the article to which the composite material is applied, a pattern that provides a visual indication as to a condition of the article to which the composite material is applied, a pattern that alters a state of the article to which the composite material is applied to provide an indication as to a condition of the article to which the composite material is applied, etc.), and/or combinations thereof.

Figure 15A:
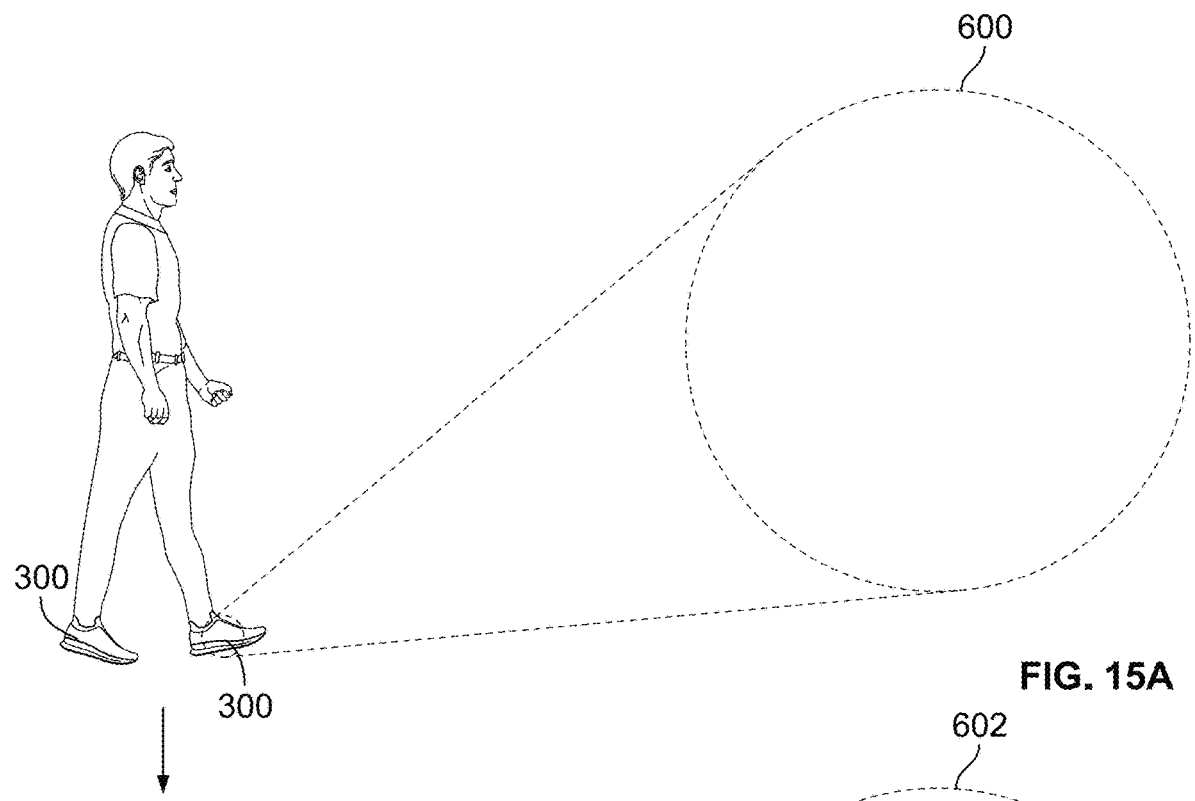
Figure 15B:
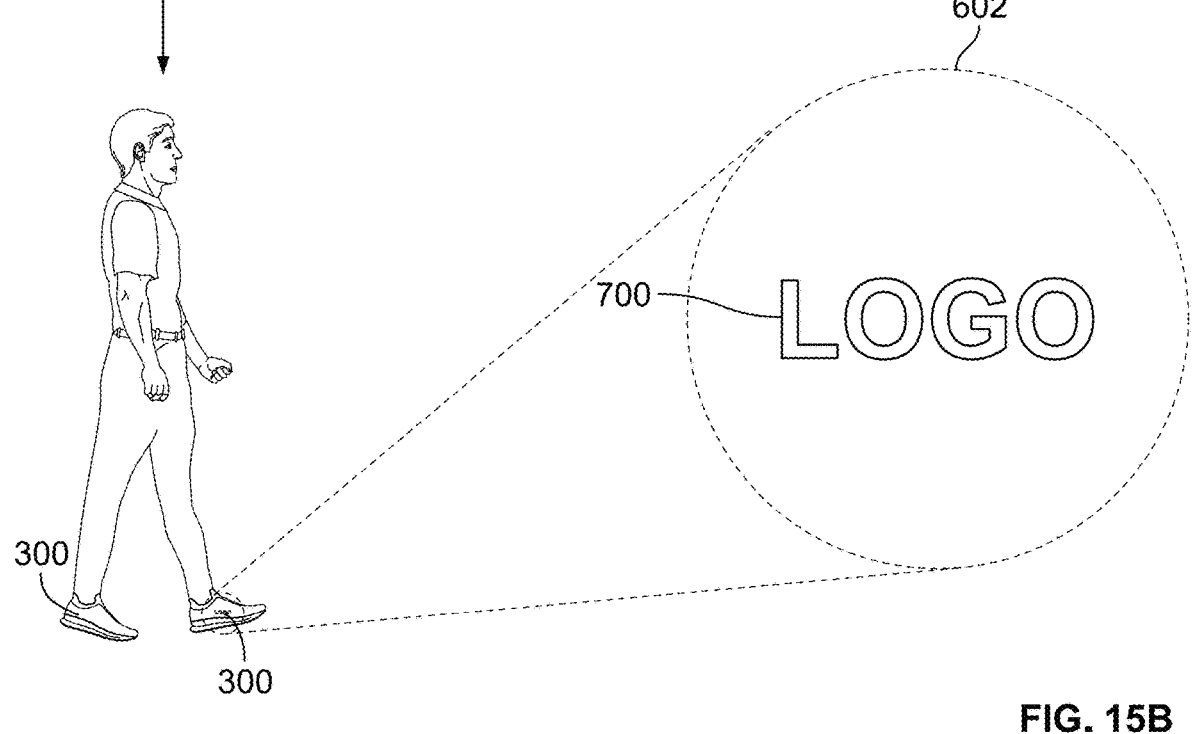

In one aspect of the present disclosure, as shown in FIGS. 15A and 15B, the intermediate layer 602 may include a logo, a trademark, or a brand mark 700. As such, in an initial state, such as that shown in FIG. 15A, the top layer 600 may cover or block the logo 700 so that the logo is not visible; however, once the top layer 600 degrades or biodegrades (as shown in FIG. 15B), the logo, trademark, or brand mark 700 may be visible.

Figure 16A:
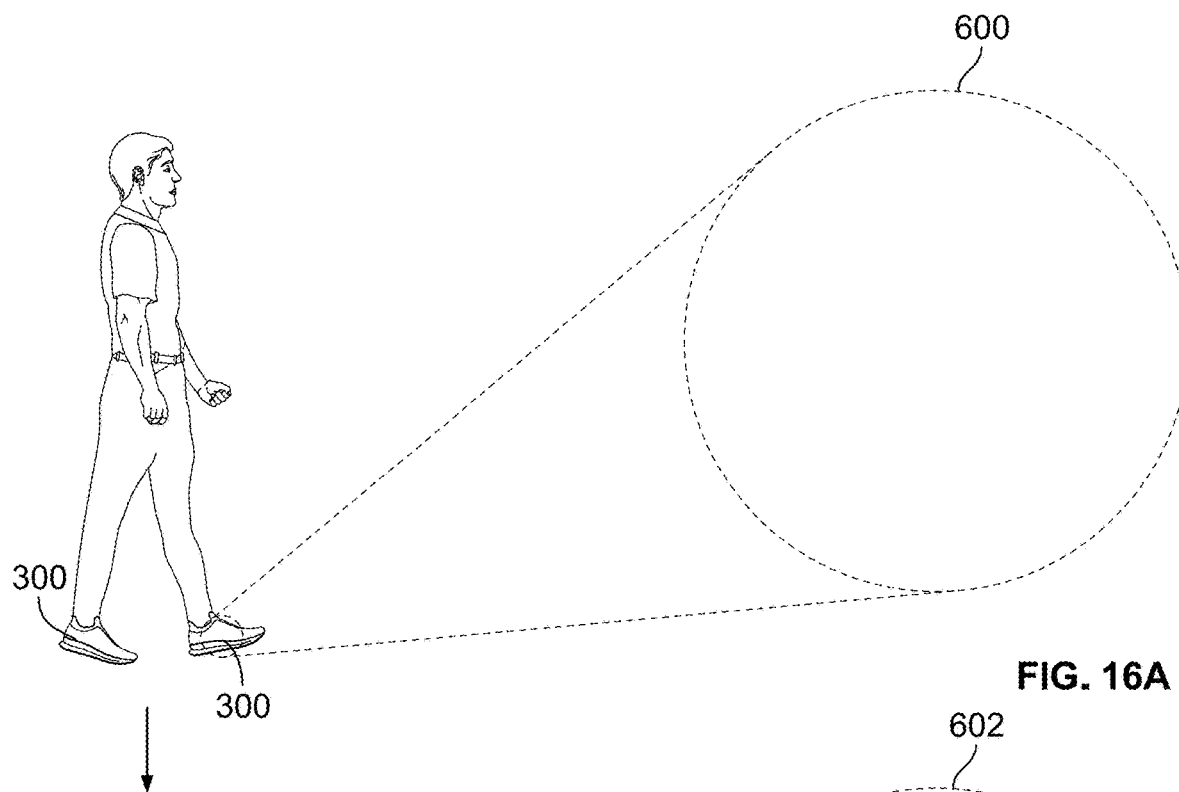
Figure 16B:
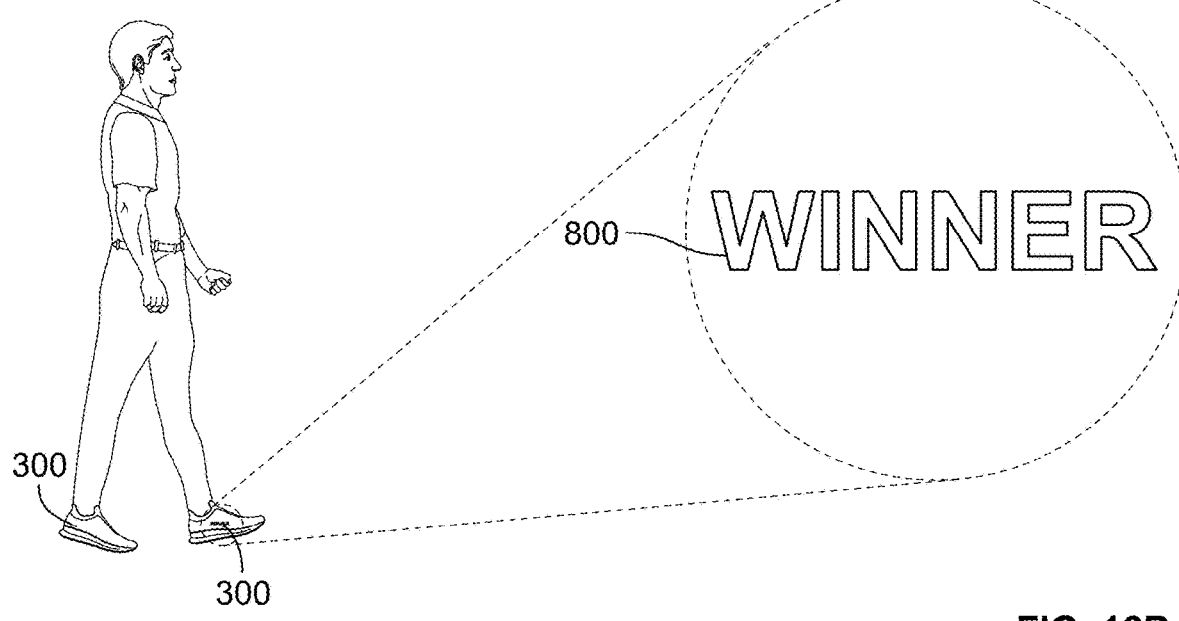

Referring to FIGS. 16A and 16B, the intermediate layer 602 may include a visual indication 800, such as a visual indication that the article of footwear 300 is a winner or that the user of the article of footwear 300 receives a prize or wins a contest (e.g., a sweepstakes). As such, in an initial state, such as that shown in FIG. 16A, the top layer 600 may cover up or block the visual indication 800 so that the visual indication is not visible; however, once the top layer 600 degrades or biodegrades (as shown in FIG. 16B), the visual indication 800 may be visible.

Figure 17A:
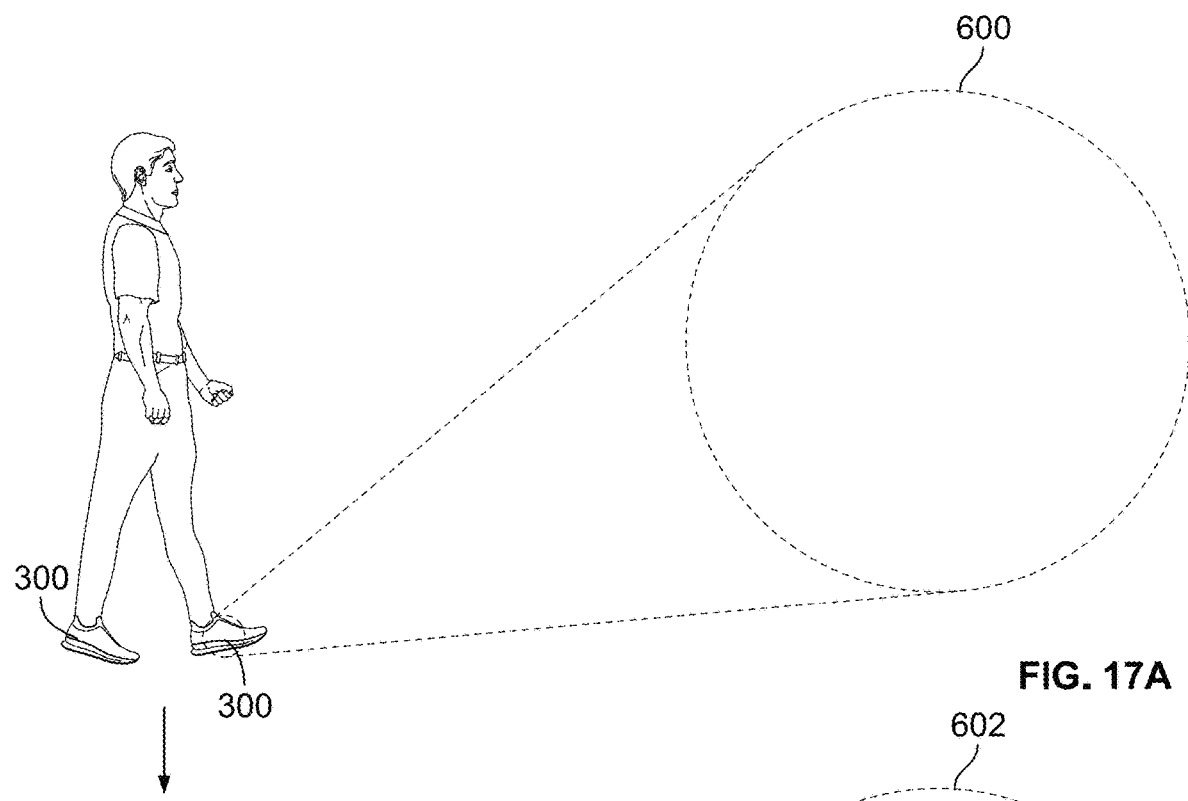
Figure 17B:
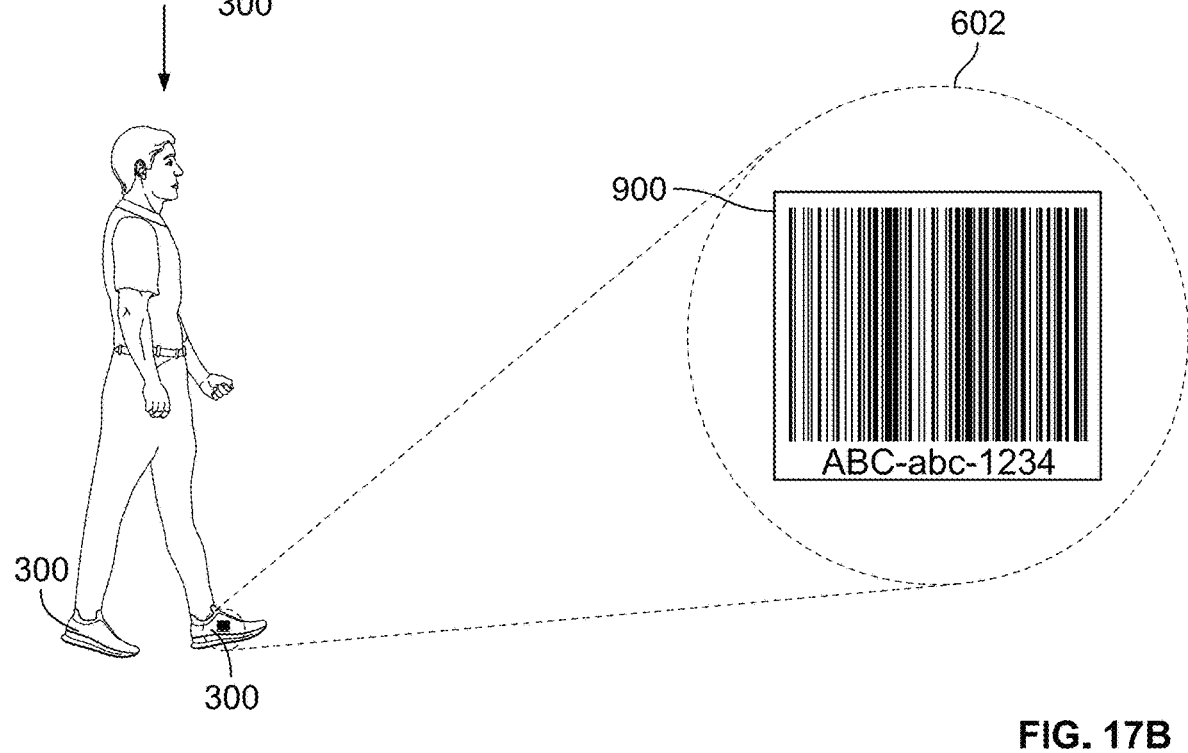

In yet another aspect of the present disclosure, as shown in FIGS. 17A and 17B, the intermediate layer 602 may include a bar code, a QR code, or a coupon 900. As such, in an initial state, such as that shown in FIG. 17A, the top layer 600 may cover or block the bar code 900 so that the bar code is not visible; however, once the top layer 600 degrades or biodegrades (as shown in FIG. 17B), the bar code 900 may be visible.

As further shown in FIGS. 14A-14C, regions of the top layer 600 may degrade or biodegrade quicker or at a faster pace than other regions of the top layer 600. For example, as best shown in FIG. 14B, portions of the intermediate layer 602 may be visible before other portions of the intermediate layer 602 are visible. In particular, in these embodiments, the portions of the top layer 600 that degrade or biodegrade at a quicker or faster rate are portions of the top layer 600 that are exposed to a higher degree of the stimulus or stimuli (or, put differently, are portions that have higher degrees of exposure to the stimulus or stimuli). For example, as will be further discussed herein, particular areas of a user's foot may be have heightened body temperatures or particular areas of a user's foot may have heightened degrees of perspiration, and, as such, these particular areas or locations along the top layer 600 may degrade quicker or at a faster rate than other areas or locations along the top layer 600.

Figure 18:
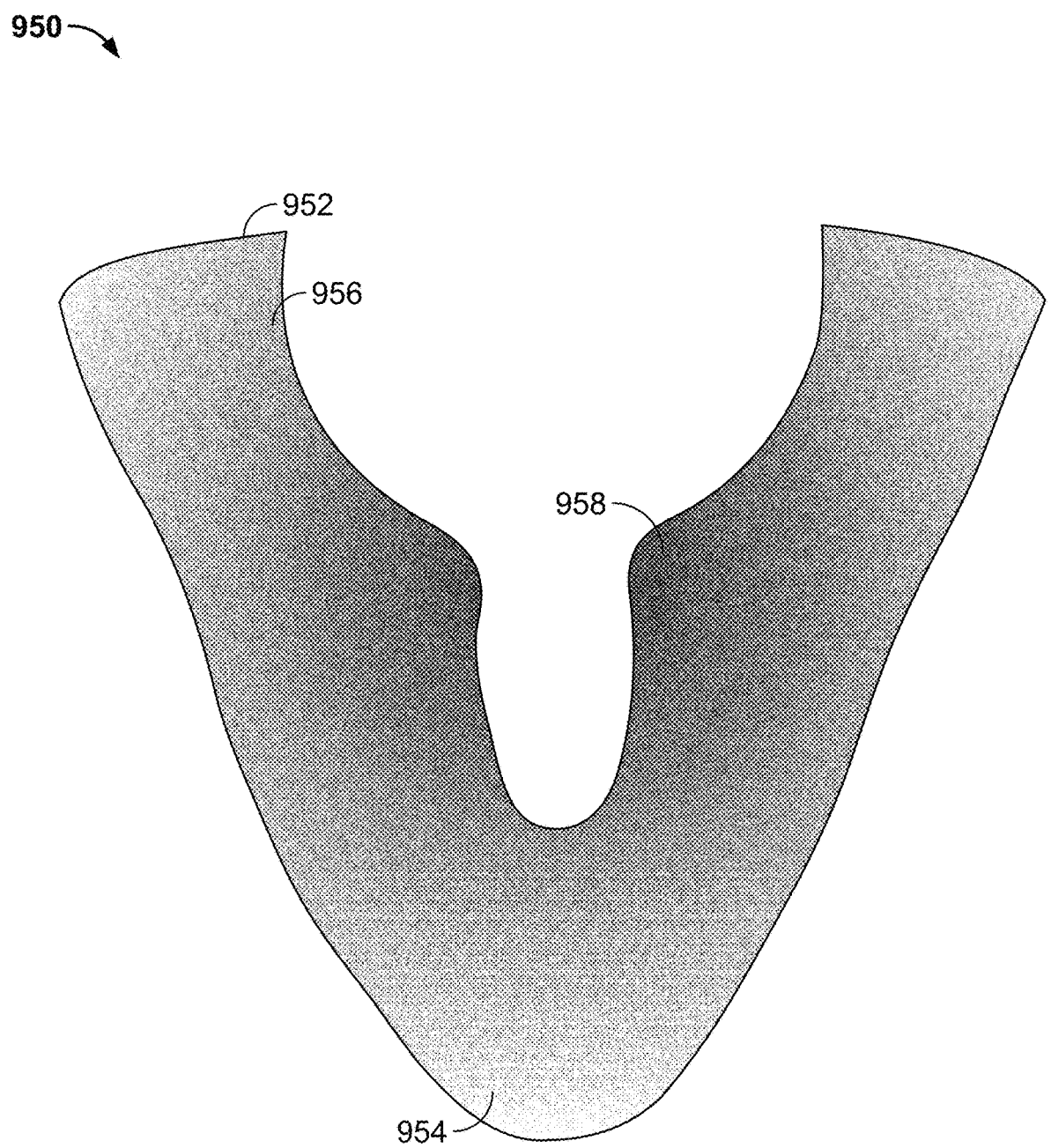
Figure 19A:
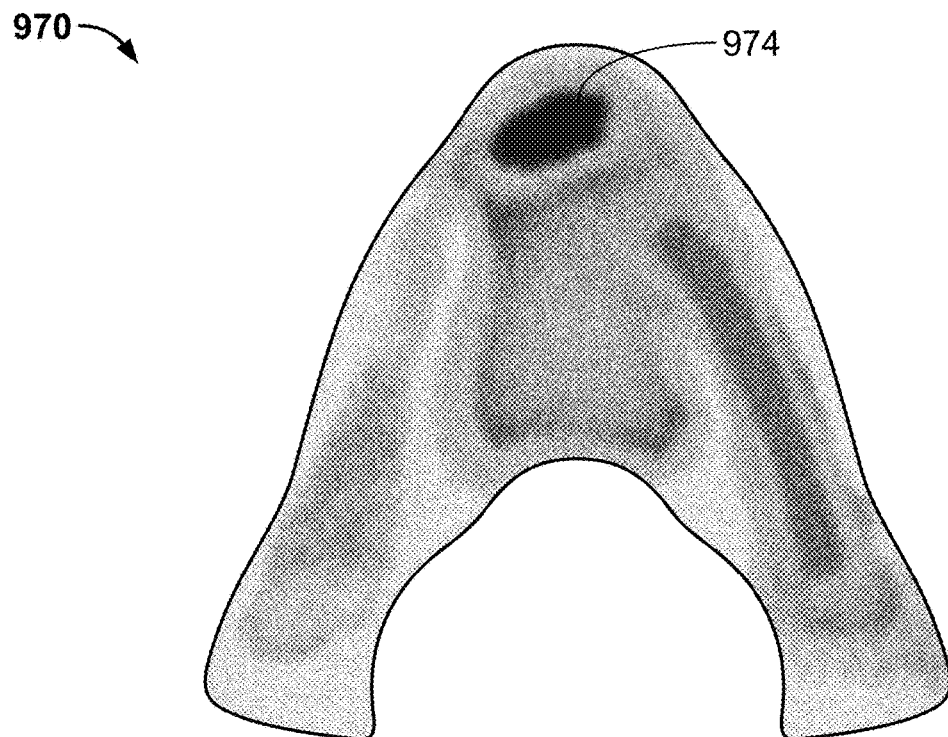
Figure 19B:
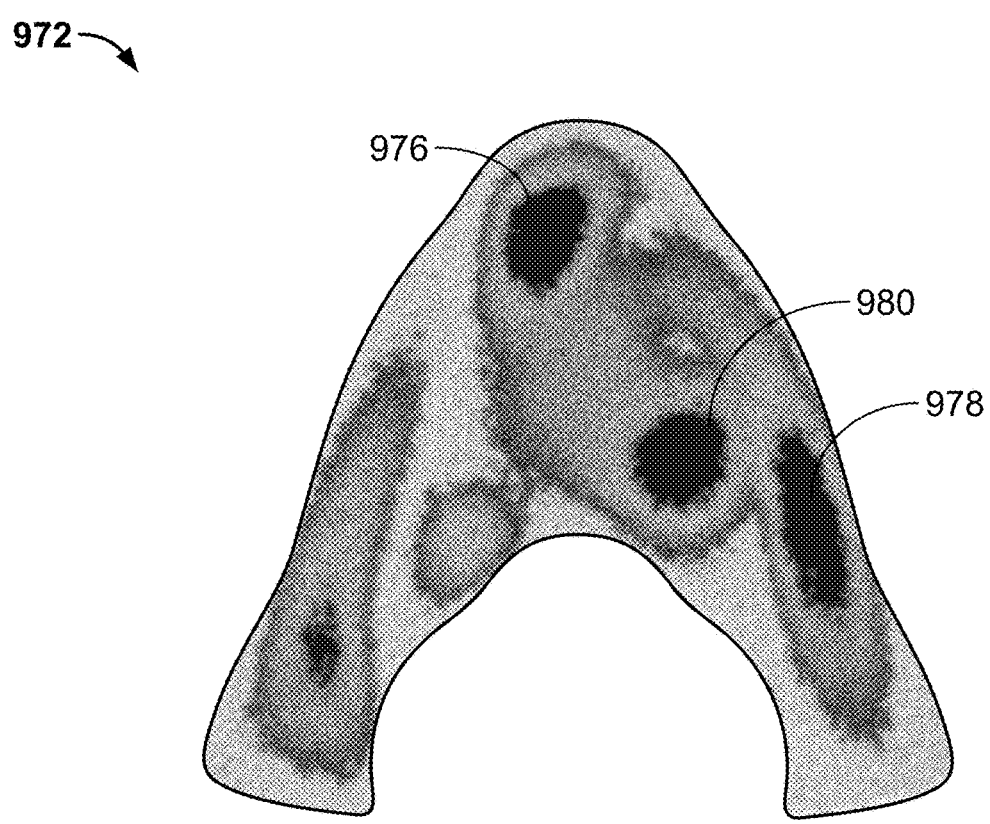

For example, FIG. 18 illustrates an exemplary heat map 950 of an upper 952 of an article of footwear. As shown in this particular embodiment, the upper 952 may include areas or regions of low thermal activity or low perspiration (i.e., region 954), areas or regions of medium thermal activity or medium levels of perspiration (i.e., region 956), and/or areas or regions of high thermal activity or high levels of perspiration (i.e., region 958). Further, as should be appreciated by those skilled in the art, these regions may vary between users or individuals. For example, as shown in FIGS. 19A and 19B, which are top plan views of exemplary heat maps 970, 972 for an upper of an article of footwear for a first and second individual, one individual may have regions of high thermal activity or high levels of perspiration proximate a forefoot or toe region 974 of an upper (such as that shown in FIG. 19A), while another individual may have regions of high thermal activity or high levels of perspiration proximate a forefoot region 976, a lateral side region 978, and a lateral instep region 980 (such as that shown in FIG. 19B). As such, in particular embodiments, portions of the top layer 600, 616, 636, 638 may degrade differently based on the particular user of the article of footwear.

Figure 20A:
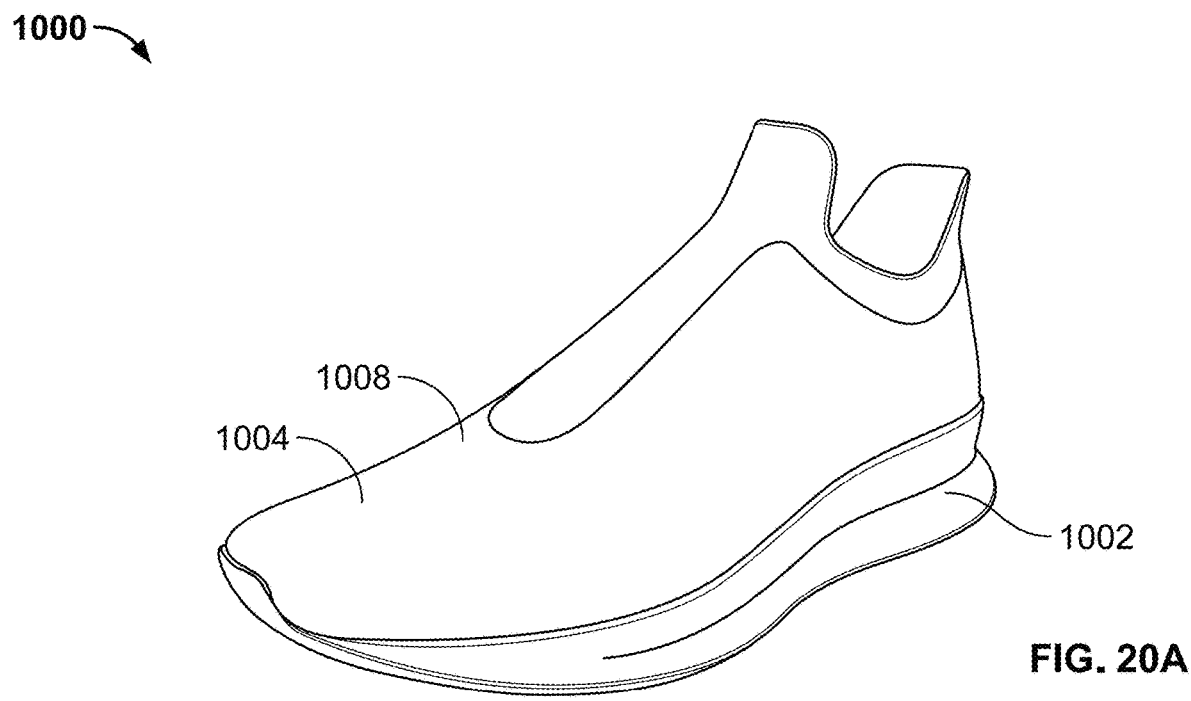
Figure 20B:
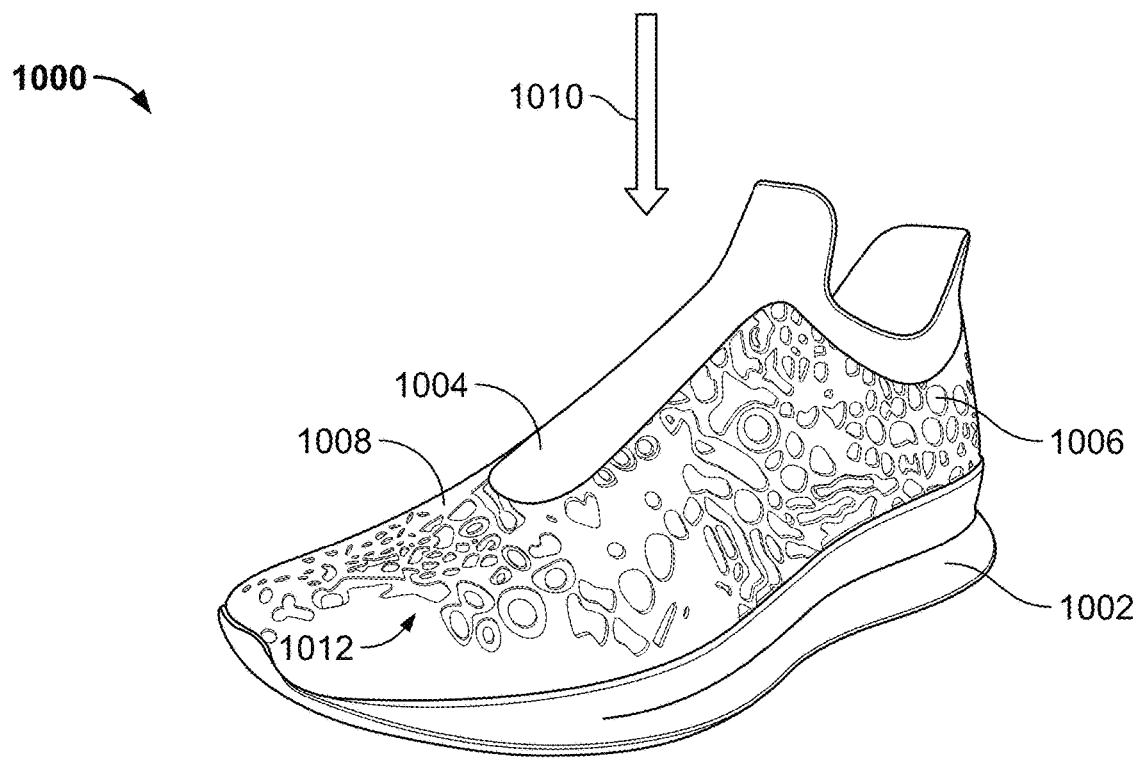

FIGS. 20A and 20B illustrate another article of footwear 1000 according to another aspect of the present disclosure that may include a sole structure 1002 and an upper 1004 attached to the sole structure 1002. Further, similar to the article of footwear 300, the upper 1004 may include a base layer 1006 and a top layer 1008 and, in some embodiments, an intermediate layer (not shown). As discussed in connection with FIG. 12, the article of footwear 1000 may also include a top layer that encases the top layer 1008, which may act as a protective outer layer. The top layer 1008 may also include the composite material 100 (or individual portions thereof). Using this configuration, the top layer 1008 or any individual portion thereof (e.g., the substrate 106, the biodegradable material 108, and/or the material layer 104), may be configured to degrade or biodegrade after a predetermined amount of time or after coming into contact with a stimulus or stimuli 1010 that prompts or accelerates degradation or biodegradation. For example, as previously discussed herein, the stimulus or stimuli used to prompt or accelerate degradation or biodegradation may include, but are not limited to, variations in temperature (such as increases or decreases in heat), sweat, light, UV light, a change in pressure, a change in humidity, a change in pH, exposure to a liquid (e.g., water, salt water, acidic solution, basic solution), exposure to a gas (e.g., $CO_2$, $NH_3$, $O_2$), or a solvent. In this particular aspect, the stimulus or stimuli may be variations in temperature or thermal heat, as well as an exposure to sweat.

More particularly, certain regions of the top layer 1008 may degrade or biodegrade and thereby form apertures 1012 when subjected to the stimulus or stimuli 1010. The apertures 1012 may expose portions of the base layer 1006 and, as a result, may provide a region with increased ventilation or aeration, as the openings or apertures 1012 allow air to flow through the top layer 1008 of the article of footwear 1000 and across the base layer 1006. For example, FIG. 20A illustrates the article of footwear 1000 before the upper 1004 is subjected to the stimulus 1010 and FIG. 20B illustrates the article of footwear 1000 after the upper 1004 is subjected to the stimulus 1010 and after at least one aperture 1012 extends through the top layer 1008. As previously discussed herein, the formation of apertures (such as the apertures 1012) may be an indication of degradation or biodegradation. In these particular embodiments, the apertures 1012 may have an area between about 1 $mm^2$ and about 20,000 $mm^2$, between about 100 $mm^2$ and about 10,000 $mm^2$, or between about 200 $mm^2$ and about 1,000 $mm^2$, for example.

As also previously discussed herein, the medium containing the biologically active microorganism may be remote from an article and may be applied to the article by a user. For example, as shown in FIGS. 21A and 21B, the medium containing the biologically active microorganism may be a fluid spray or aerosol composition 1050 and, when desired, may be applied, sprayed, or otherwise distributed on an article, such as an article of footwear 1052, by a user 1054. In this embodiment, the application of the fluid spray or aerosol composition 1050 on the article of footwear 1052 may cause an upper 1056 of the article of footwear 1052 to degrade or biodegrade and, in particular embodiments, may cause the formation of apertures 1058 through the upper 1056. In other embodiments, the upper 1056 may still require a stimulus 1060 to activate the biologically active microorganism within the fluid spray or aerosol composition 1050.

In addition to footwear, particular concepts described herein may also be applied and incorporated in other types of apparel or other athletic equipment, including articles of clothing (e.g., shirts, shorts, pants, hats, socks, calf sleeves, headbands, wristbands, arm sleeves, gloves, etc.), insoles, helmets, padding or protective pads, and shin guards. Even further, particular concepts described herein may be incorporated in cushions, backpack straps, golf clubs (e.g., a golf club grip), or other consumer or industrial products. Accordingly, concepts described herein may be utilized in a variety of products.

Figure 22:
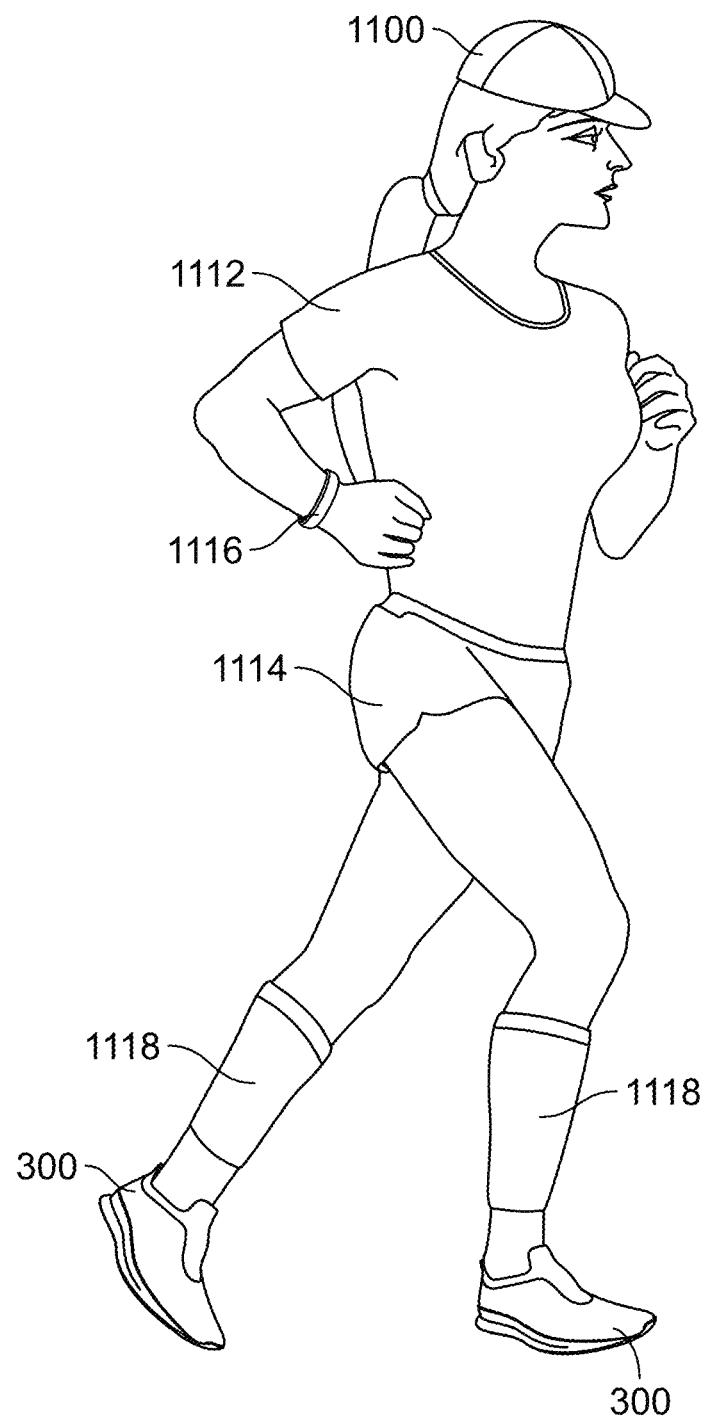

For example, as shown in FIG. 22, the composite material 100 (or individual components thereof) may be incorporated into any article of clothing, such as a hat 1100, a shirt 1112, a pair of shorts or pants 1114, a wristband 1116, and/or socks or calf sleeves 1118.

In one aspect, as shown in FIGS. 23-25, the composite material 100 (or individual components thereof) may be incorporated into an article of clothing 1150, 1160, 1170. In such embodiments, similar to the article of footwear 300, the article of clothing 1150, 1160, 1170 may include a base layer, an intermediate layer, and a top layer.

Figure 23A:
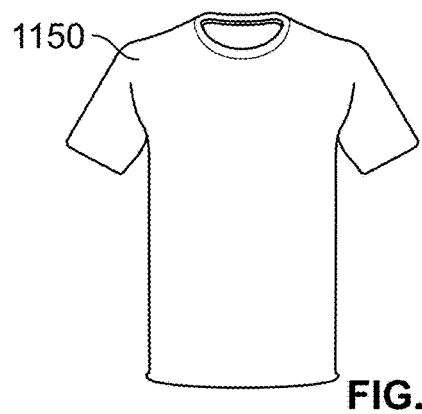
Figure 23B:
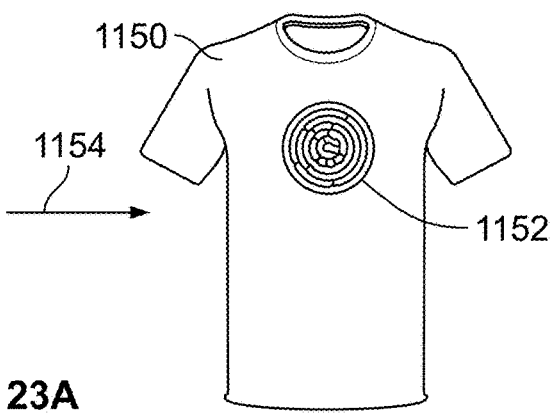
Figure 24A:
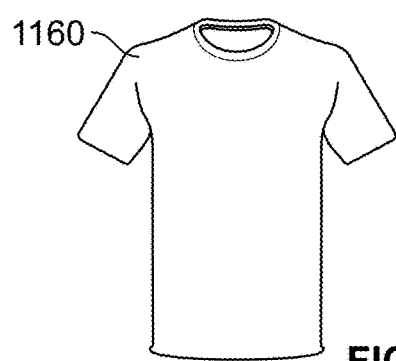
Figure 24B:
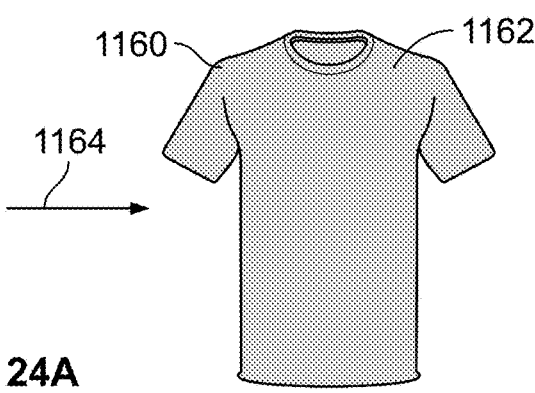
Figure 25A:
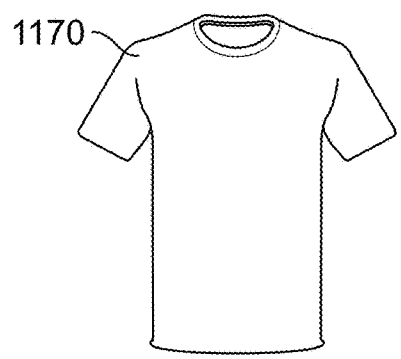
Figure 25B:
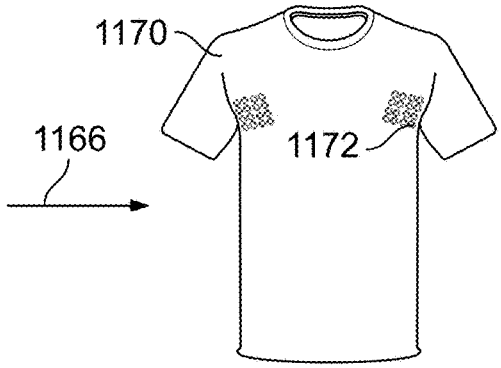

For example, FIGS. 23A and 23B depict an article of clothing 1150 that may include the composite material 100 within or on a top layer of the article of clothing 1150, such that a pattern, or a portion of the intermediate layer or base layer thereof 1152, may form on an exterior surface, or may be visible from an exterior of the article of clothing 1150 after a stimulus or stimuli 1154 are applied thereto. As another example, FIGS. 24A and 24B depict an article of clothing 1160 that may include the composite material 100 within or on a top layer, such that an exterior 1162 of the article of clothing 1160 alters (e.g., changes color) after a stimulus or stimuli 1164 are applied thereto. As yet another example, FIGS. 25A and 25B depict an article of clothing 1170 that may include the composite material 100 within or on a top layer of the article of clothing 1170, such that one or more apertures 1172 form after a stimulus or stimuli 1174 are applied thereto.

Figures 26A, 26B:
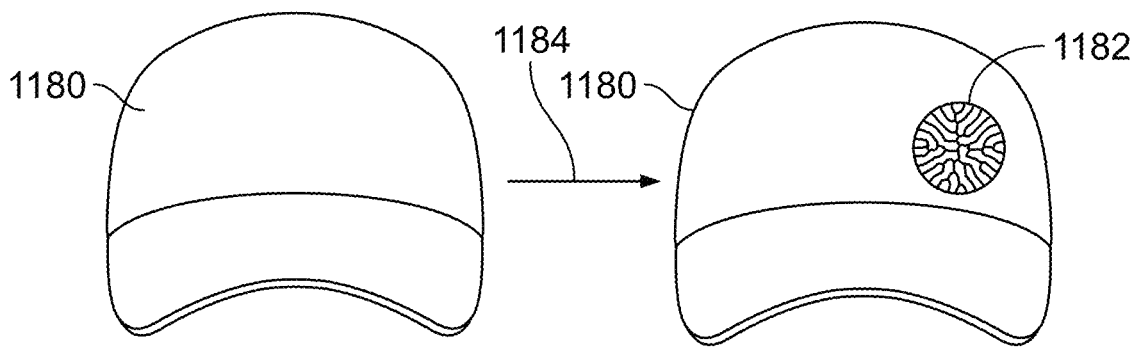
FIG. 26B is a front view of the article of FIG. 26A after the article has undergone biodegradation.
Figures 27A, 27B:
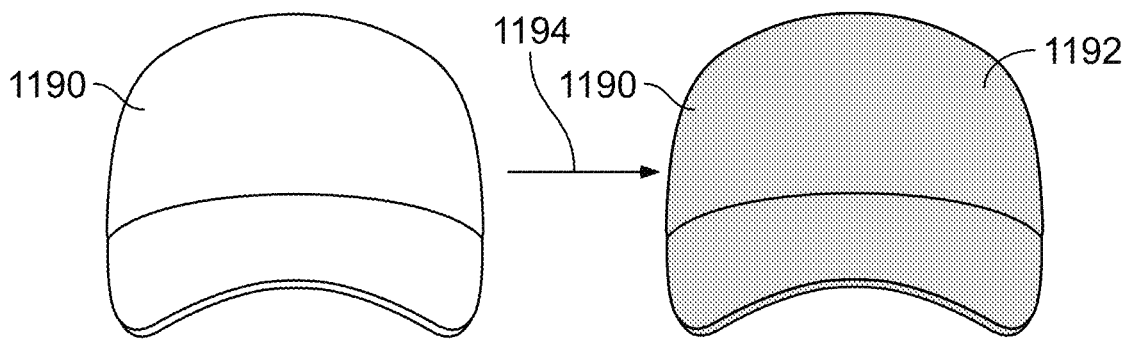
FIG. 27A is a front view of an article incorporating the composite material of FIG. 1, according to another embodiment of the present disclosure.
FIG. 27B is a front view of the article of FIG. 27A after the article has undergone a first amount of biodegradation.
Figures 28A, 28B:
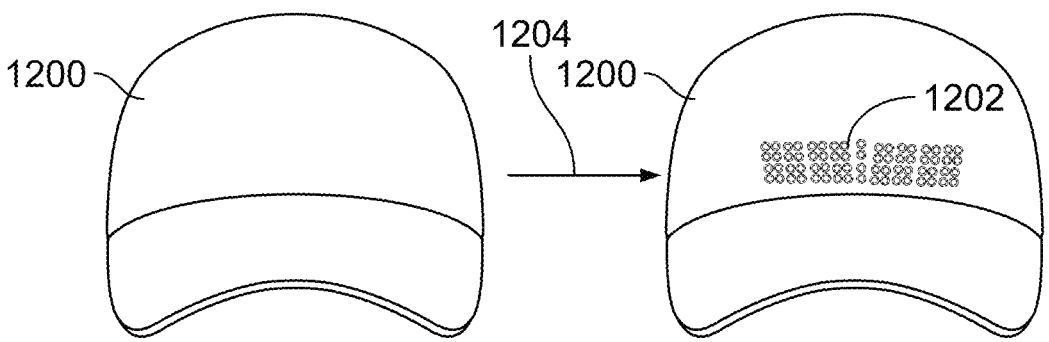
FIG. 28A is a front view of an article incorporating the composite material of FIG. 1, according to yet another embodiment of the present disclosure.
FIG. 28B is a front view of the article of FIG. 28A after the article has undergone a first amount of biodegradation.

In another aspect, as shown in FIGS. 26-28, the composite material 100 (or individual components thereof) may be incorporated into a hat 1180, 1190, 1200. FIGS. 26A and 26B depict a hat 1180 that may include the composite material 100 within or on a top layer of the hat 1180, such that a pattern, or a portion of the intermediate layer or base layer thereof 1182, may form on an exterior surface thereof, or may be visible from an exterior of the hat 1182 after a stimulus or stimuli 1184 are applied thereto. As another example, FIGS. 27A and 27B depict a hat 1190 that may include the composite material 100 within or on a top layer, such that an exterior 1192 of the hat 1190 alters (e.g., changes color) after a stimulus or stimuli 1194 are applied thereto. As yet another example, FIGS. 28A and 28B depict a hat 1200 that may include the composite material 100, such that one or more apertures 1202 form after a stimulus or stimuli 1204 are applied thereto.

Figure 29A:
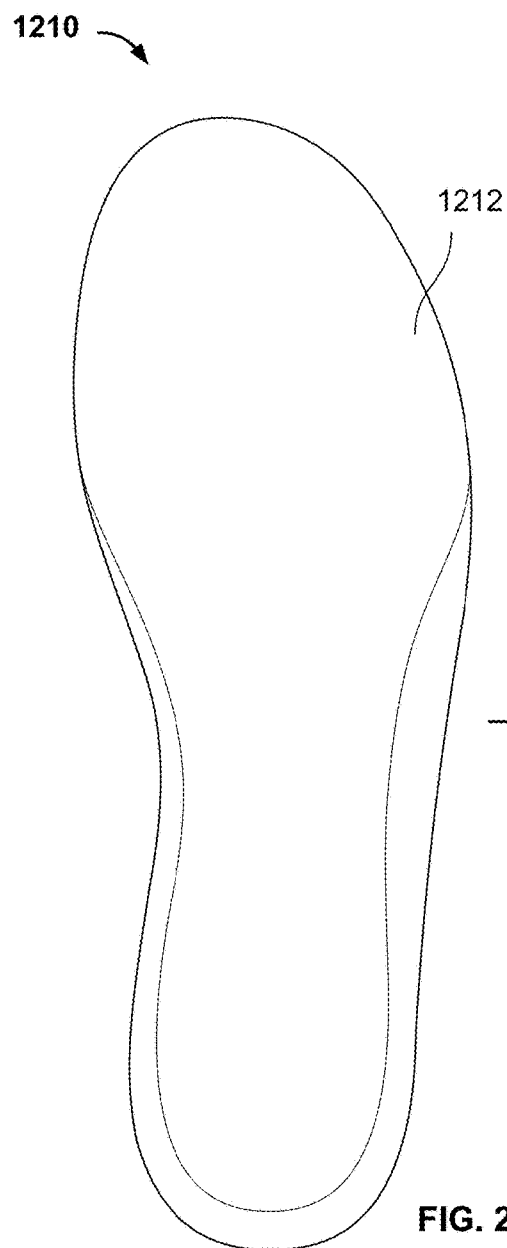
FIG. 29A is a top elevational view of an insole for an article of footwear, wherein the insole includes the composite material of FIG. 1.
Figure 29B:
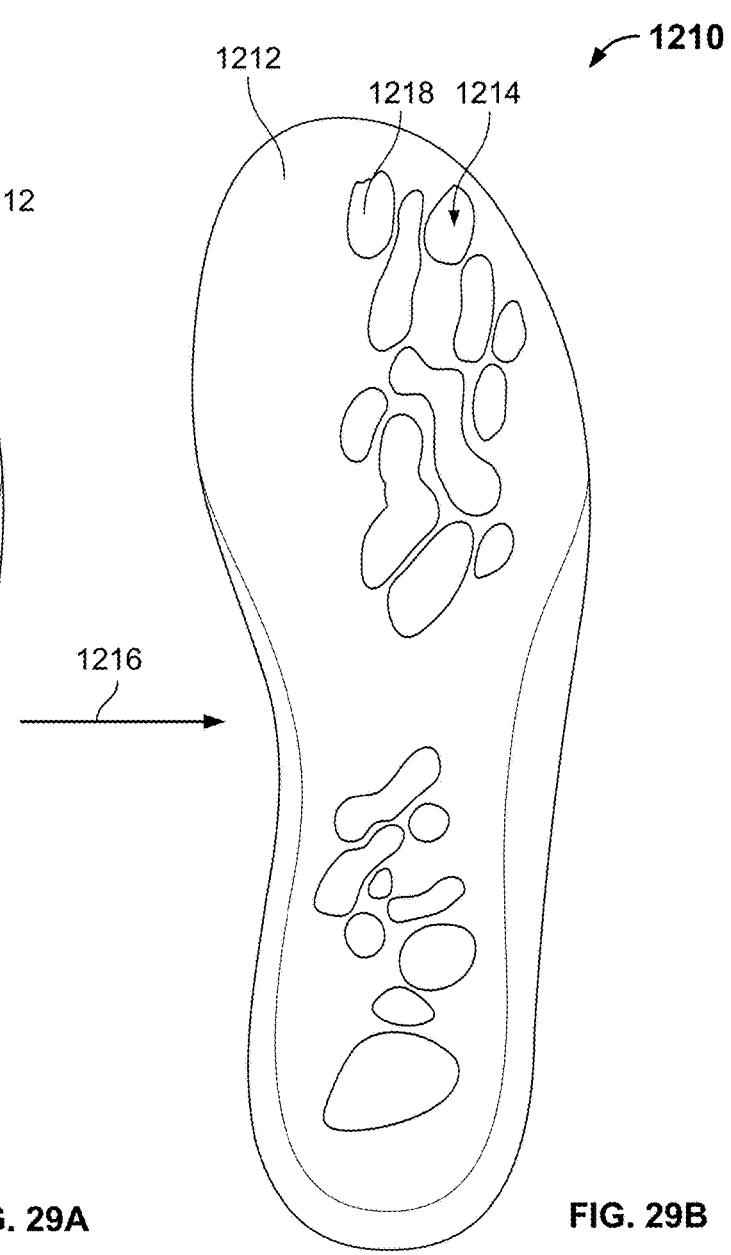
FIG. 29B is a top elevational view of the insole of FIG. 29A after the insole has undergone a first amount of biodegradation.

In a further aspect, as shown in FIGS. 29A and 29B, the composite material 100 (or individual components thereof) may be incorporated into an insole 1210. FIGS. 29A and 26B depict an insole 1210 that may include the composite material 100 within or on a top layer 1212 of the insole 1210, such that one or more apertures 1214 form through the top layer 1212 of the insole 1210 after a stimulus or stimuli 1216 has been applied thereto to expose a base layer 1218.

In further embodiments, articles of footwear or articles of clothing may incorporate a composite material 100 (or individual components thereof) that visualizes biofilm formation and growth as a change in color of the composite material 100. In such embodiments, the biological active agent of the biodegradable material 108 may biologically or chemically alter the material layer 104 and, thereby, change a visual appearance of the material layer 104 once subjected to a stimuli. For example, an article of footwear or an article of clothing may be constructed from a composite material 100 having the aforementioned properties and may resultantly alter the physical appearance (e.g., a color, a shade of color, a reflectivity) of the article of footwear or the article of clothing after being subjected to a stimulus or stimuli. For example, in some aspects previously discussed herein, an article may include a biodegradable portion or biodegradable medium 108 containing a dye and, upon activation by a stimulus or stimuli, the dye may be released from the biodegradable portion or biodegradable medium 108 and into or onto a surrounding environment. For example, the biodegradable medium 108 may be a sealed encapsulation that includes a biologically active agent and a dye and, upon activation by a stimulus or stimuli, may release the dye to a surrounding substrate or fabric (e.g., the substrate 106) and alter the color or appearance of the surrounding substrate or fabric.

Figure 30:
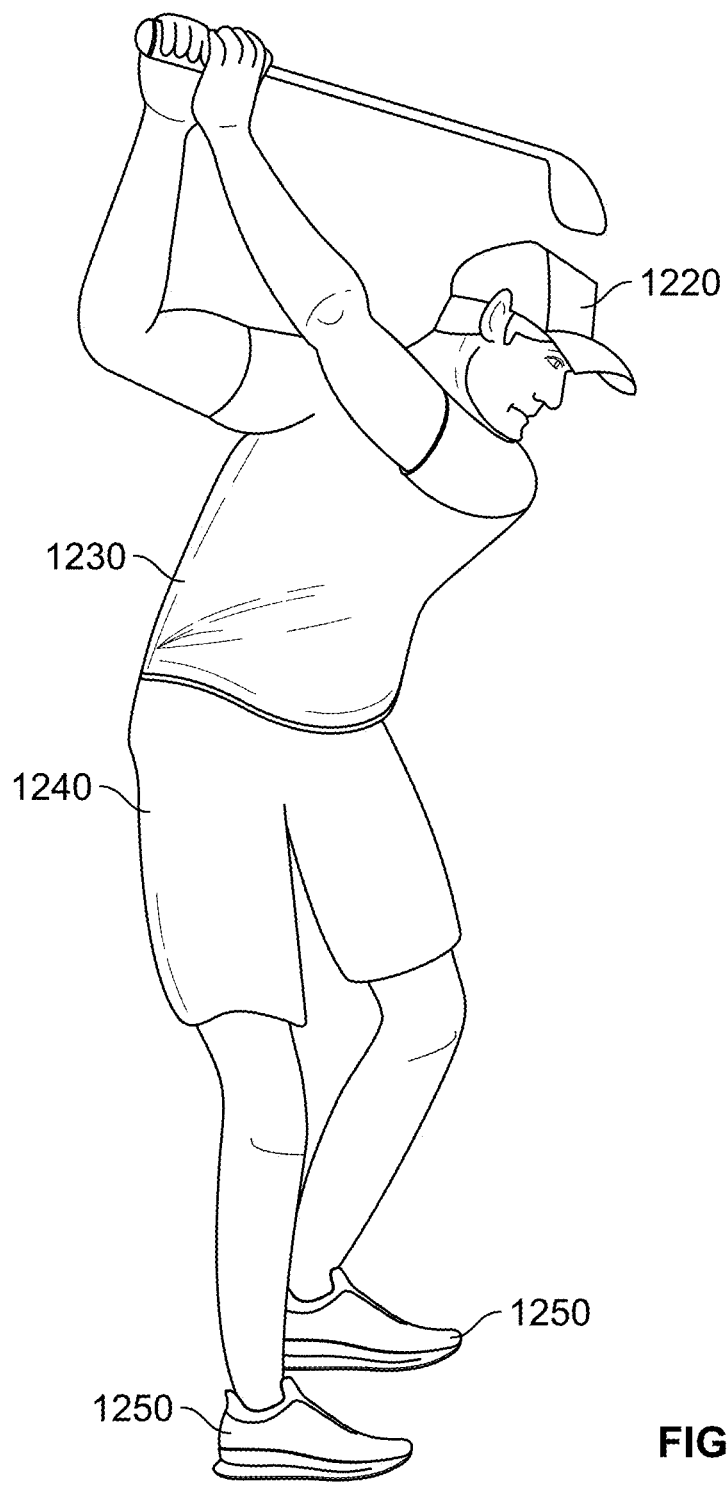
FIG. 30 is a rear view of an user wearing one or more articles incorporating the composite material of FIG. 1.

For example, as shown in FIG. 30, the aforementioned composite material 100 having a dye (or individual components thereof) may be incorporated into any article of clothing, such as a hat 1220, a shirt 1230, a pair of shorts or pants 1240, or an article of footwear 1250.

Figure 31A:
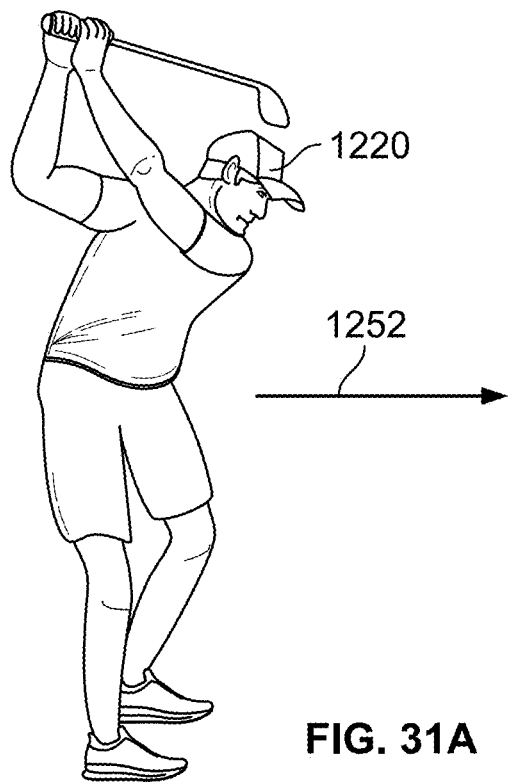
FIG. 31A is a front elevational view of the user of FIG. 30, wherein the user is wearing an article incorporating the composite material of FIG. 1.
Figure 31B:
FIG. 31B is a front elevational view of the article of FIG. 31A after the article has undergone a first amount of biodegradation.

Referencing FIGS. 31A and 31B, in one aspect, the aforementioned composite material 100 (or individual components thereof) may be incorporated into a hat 1220 and a visual appearance (e.g., a color) of the hat 1220 may alter after being subjected to a stimulus or stimuli 1252.

Figure 32A:
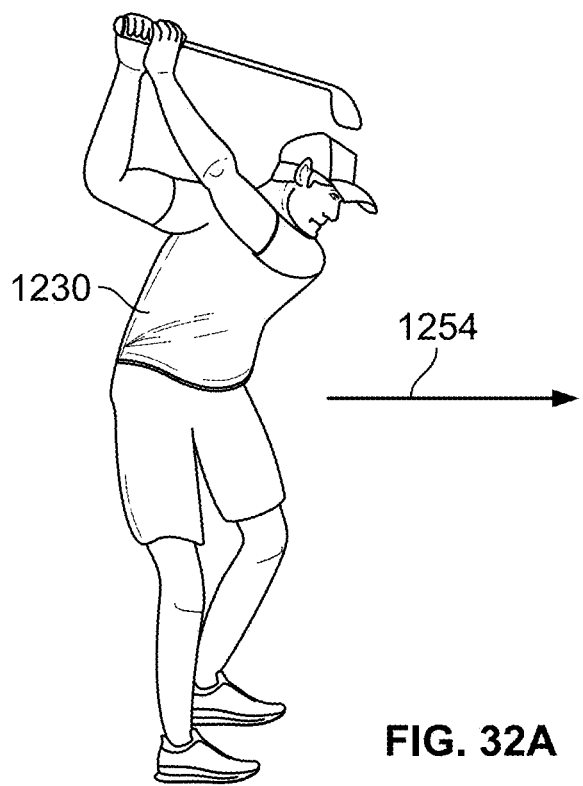
FIG. 32A is a front elevational view of the user of FIG. 30, wherein the user is wearing an article incorporating the composite material of FIG. 1.
Figure 32B:
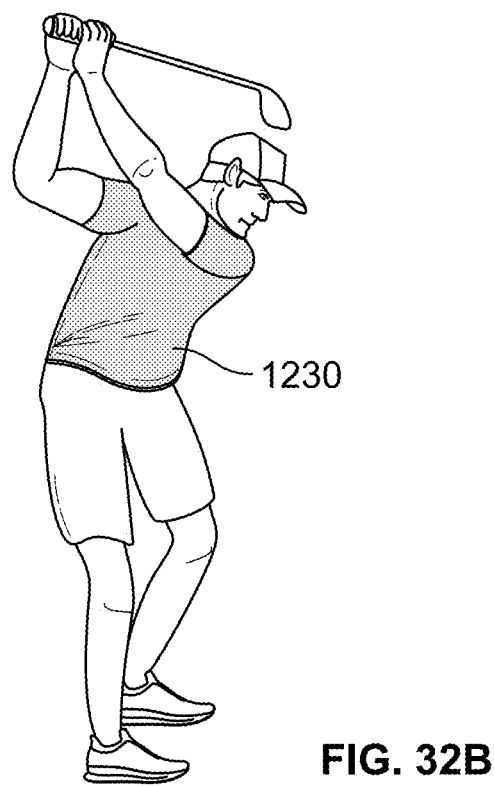
FIG. 32B is a front elevational view of the article of FIG. 32A after the article has undergone a first amount of biodegradation.

In another aspect, and referencing FIGS. 32A and 32B, the aforementioned composite material 100 (or individual components thereof) may be incorporated into a shirt 1230 and a visual appearance (e.g., color) of the shirt 1230 may alter after being subjected to a stimulus or stimuli 1254.

Figures 33A, 33B:
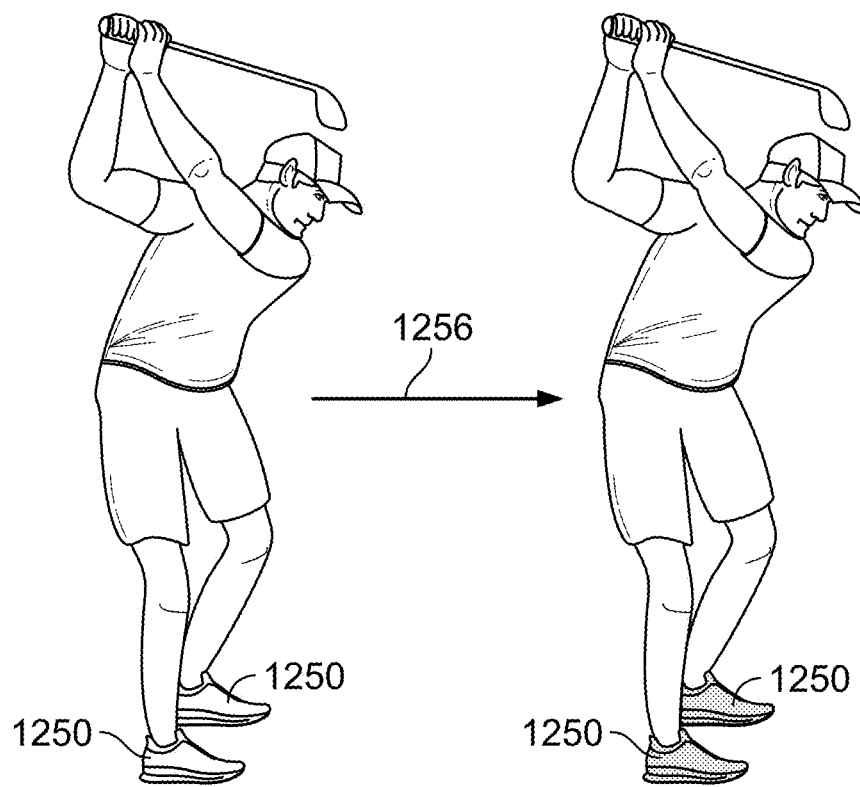
FIG. 33A is a front elevational view of the user of FIG. 30, wherein the user is utilizing an article having the composite material of FIG. 1.
FIG. 33B is a front elevational view of the article of FIG. 33A after the article has undergone a first amount of biodegradation.

Now referencing FIGS. 33A and 33B, in a further aspect, the aforementioned composite material 100 (or individual components thereof) may be incorporated into an article of footwear 1250 and a visual appearance (e.g., color) of the article of footwear 1250 may alter after being subjected to a stimulus or stimuli 1256.

In addition to footwear, particular concepts described herein may also be applied and incorporated in other types of apparel or other athletic equipment, including articles of clothing (e.g., shirts, shorts, pants, hats, socks, calf sleeves, headbands, wristbands, arm sleeves, gloves, etc.), helmets, padding or protective pads, and shin guards. Even further, particular concepts described herein may be incorporated in cushions, backpack straps, golf clubs (e.g., a golf club grip), or other consumer or industrial products. Accordingly, concepts described herein may be utilized in a variety of products.

Figure 34:
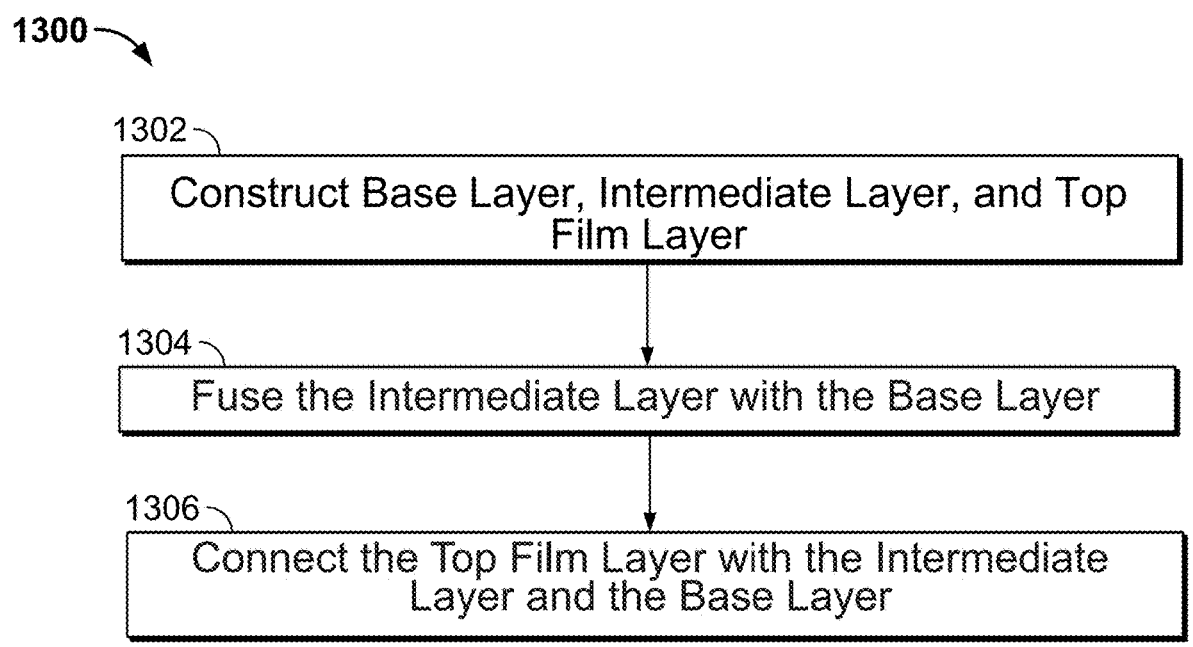
FIG. 34 is a process flow chart of an exemplary methodology for producing an article of footwear having the composite material of FIG. 1.
Figure 35:
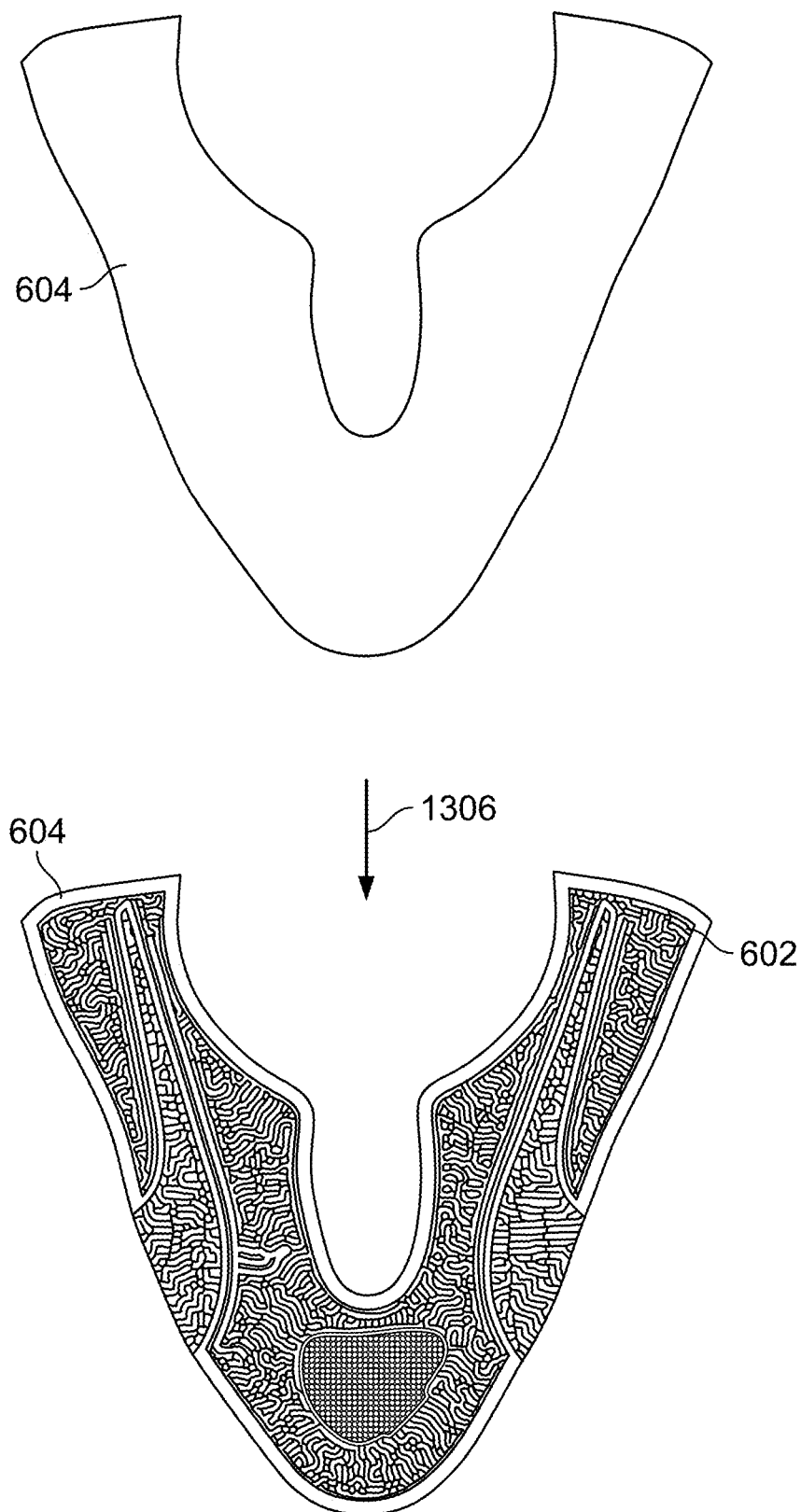
FIG. 35 is a top plan view of an upper of an article of footwear during a step of the process depicted in FIG. 34.

FIG. 34 illustrates a process flow chart of an exemplary methodology or process 1300 for producing the article of footwear 300 having the composite material of FIG. 1. In this embodiment, the methodology 1300 may include steps 1302, 1304, and 1306. First, in step 1302, the base layer, e.g., the base layer 604, the intermediate layer, e.g., the intermediate layer 602, and the top layer, e.g., the top layer 600, may be constructed by a standard means in the art. Next, in step 1304, the intermediate layer, e.g., intermediate layer 602, may be fused with or onto the base layer, e.g., the base layer 604. For example, FIG. 35 depicts step 1304 of the process 1300, wherein an intermediate layer 602 is fused with or onto a base layer 604. Once the intermediate layer is fused with the base layer, a top layer, e.g., top layer 600, may be connected to the intermediate layer and the base layer in the step 1306.

Although the description below is in connection with an article of footwear, it would be understood that the methodology discussed herein may be used to produce other articles, including, but not limited to, shirts, shorts, pants, hats, socks, calf sleeves, headbands, wristbands, arm sleeves, gloves, or any other article previously discussed herein.

Any of the embodiments described herein may be modified to include any of the structures or methodologies disclosed in connection with different embodiments. Further, the present disclosure is not limited to articles of footwear of the type specifically shown. Still further, aspects of the articles of footwear of any of the embodiments disclosed herein may be modified to work with any type of footwear, apparel, or other athletic equipment.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:
1. A garment, comprising:
 a composite material having at least one material layer and a separate base layer, wherein in a first state of the composite material a first portion of the at least one material layer obscures a first portion of one or more other layers of the composite material located underneath the at least one material layer;
 wherein the base layer comprises a plurality of receiving spaces that form enclosed cavities in which microorganisms are located, and wherein the microorganisms are selected to corrode the first portion of the at least one material layer such that, in a second state, the first portion of the one or more other layers of the composite material is not obscured by the at least one material layer.

2. The garment of claim 1, wherein in addition to the microorganisms, a gelatinous media is arranged in the receiving spaces.

3. The garment of claim 2, wherein the gelatinous media is a gelatinous gel.

4. The garment of claim 1, wherein the material layer is selected from the group consisting of polyethylene terephthalate and polyurethane.

5. The garment of claim 1, wherein the garment is a shoe.

6. The garment of claim 5, wherein the shoe comprises an upper and a sole, wherein the composite material is a portion of the upper.

7. The garment of claim 5, wherein the shoe comprises an upper and a sole, wherein the composite material is a portion of the sole.

8. The garment of claim 1, wherein the garment is selected from the group consisting of a sports shoe, a sports suit, a sports jacket, a sports trouser, and a sports shirt.

9. The garment of claim 1, wherein the receiving spaces have a rectangular, round, or hexagonal shape.

10. The garment of claim 1, wherein the material layer extends along an upper surface of the base layer.

11. The garment of claim 1, wherein the microorganisms are configured to corrode the material layer to create an aperture in the material layer.

12. The garment of claim 1, wherein the microorganisms are a bacteria.

13. A garment, comprising:
a composite material having at least one material layer and a separate base layer;
wherein the composite material has a first state in which the at least one material layer is not eroded;
wherein the base layer comprises a plurality of receiving spaces in which microorganisms and a gelatinous media are placed, the microorganisms being configured to erode the at least one material layer partially; and
wherein, in a second state of the composite material, apertures are created in the at least one material layer, the apertures being created by the microorganisms.

14. The garment of claim 13, wherein the gelatinous media is a gelatinous gel.

15. The garment of claim 13, wherein the receiving spaces are defined by enclosed cavities formed within a structure of the base layer, the microorganisms and gelatinous media contained within each enclosed cavity being isolated from the microorganisms and gelatinous media contained within an adjacent enclosed cavity by a portion of the structure of the base layer.

16. The garment of claim 13, wherein the microorganisms are a bacteria.

17. The garment of claim 13, wherein the garment is a shoe.

18. The garment of claim 17, wherein the shoe comprises an upper and a sole, wherein the composite material is a portion of the upper.

19. The garment of claim 17, wherein the shoe comprises an upper and a sole, wherein the composite material is a portion of the sole.

20. The garment of claim 13, wherein the material layer is selected from the group consisting of polyethylene terephthalate and polyurethane.

21. A garment, comprising:
a composite material having at least one material layer and a separate base layer, wherein in a first state of the composite material, a first portion of one or more other layers of the composite material located underneath a first portion of the at least one material layer is not visible;
wherein the base layer comprises a plurality of receiving spaces that form enclosed cavities in which microorganisms are located; and
wherein the microorganisms are selected to at least partially degrade the first portion of the at least one material layer such that, in a second state, the first portion of the one or more other layers of the composite material is at least partially visible.

* * * * *